(12) United States Patent
Harris

(10) Patent No.: US 9,885,859 B2
(45) Date of Patent: Feb. 6, 2018

(54) STRUCTURED ILLUMINATION MICROSCOPY APPARATUS AND METHOD

(71) Applicant: Martin Russell Harris, Heidelberg West (AU)

(72) Inventor: Martin Russell Harris, Heidelberg West (AU)

(*) Notice: Subject to any disclaimer, the term of this patent is extended or adjusted under 35 U.S.C. 154(b) by 363 days.

(21) Appl. No.: 14/412,987

(22) PCT Filed: Jul. 5, 2013

(86) PCT No.: PCT/AU2013/000743
§ 371 (c)(1),
(2) Date: Jan. 5, 2015

(87) PCT Pub. No.: WO2014/005195
PCT Pub. Date: Jan. 9, 2014

(65) Prior Publication Data
US 2015/0168702 A1   Jun. 18, 2015

Related U.S. Application Data

(60) Provisional application No. 61/803,598, filed on Mar. 20, 2013, provisional application No. 61/668,291, filed on Jul. 5, 2012.

(51) Int. Cl.
*G02B 21/00* (2006.01)
*G02B 21/08* (2006.01)
(Continued)

(52) U.S. Cl.
CPC .......... *G02B 21/0032* (2013.01); *B82Y 20/00* (2013.01); *B82Y 35/00* (2013.01); *G01Q 60/18* (2013.01); *G01Q 60/22* (2013.01); *G02B 21/006* (2013.01); *G02B 21/08* (2013.01); *G02B 21/16* (2013.01); *G02B 21/26* (2013.01); *G02B 21/367* (2013.01); *G02B 23/2461* (2013.01); *G02B 23/2469* (2013.01); *G02B 23/26* (2013.01);
(Continued)

(58) Field of Classification Search
CPC .. G02B 21/0032; G02B 23/26; G02B 21/367; G02B 27/58; G02B 21/16; G02B 23/2461; G02B 21/26; G02B 23/2469; G02B 21/006; G02B 21/08; G02B 1/002; G01Q 60/18; G01Q 60/22; B82Y 20/00; B82Y 35/00
USPC .............................. 850/24, 30, 32
See application file for complete search history.

(56) References Cited

U.S. PATENT DOCUMENTS

| | | | | |
|---|---|---|---|---|
| 4,927,254 A | * | 5/1990 | Kino | G02B 21/0044 359/235 |
| 2003/0223536 A1 | * | 12/2003 | Yun | B82Y 10/00 378/45 |
| 2007/0053204 A1 | * | 3/2007 | Krohne | A61B 5/0068 362/574 |

\* cited by examiner

*Primary Examiner* — Michael Maskell
(74) *Attorney, Agent, or Firm* — Wolf, Greenfield & Sacks, P.C.

(57) ABSTRACT

A microscope or endoscope, comprising a light condenser (such as an objective lens), and an array of micro-lenses (such as supported on a transparent plate), wherein the micro-lenses are arranged spatially to correspond in enlarged form to respective sub-resolution objects or point observational fields on or within a specimen that are separated from one another by an optically resolvable distance and to receive light from the sub-resolution objects or point observational fields, and each of the micro-lenses is arranged to converge light from the respective corresponding sub-resolution object or point observational field to a diffraction limited spot at an image plane.

13 Claims, 66 Drawing Sheets

(51) Int. Cl.
  *B82Y 20/00* (2011.01)
  *B82Y 35/00* (2011.01)
  *G01Q 60/22* (2010.01)
  *G01Q 60/18* (2010.01)
  *G02B 21/16* (2006.01)
  *G02B 21/26* (2006.01)
  *G02B 23/24* (2006.01)
  *G02B 21/36* (2006.01)
  *G02B 23/26* (2006.01)
  *G02B 27/58* (2006.01)
  *B82Y 10/00* (2011.01)
  *G02B 1/00* (2006.01)
  *G02B 3/00* (2006.01)
  *G02B 6/04* (2006.01)

(52) U.S. Cl.
  CPC .............. *G02B 27/58* (2013.01); *B82Y 10/00* (2013.01); *G02B 1/002* (2013.01); *G02B 3/0037* (2013.01); *G02B 6/04* (2013.01)

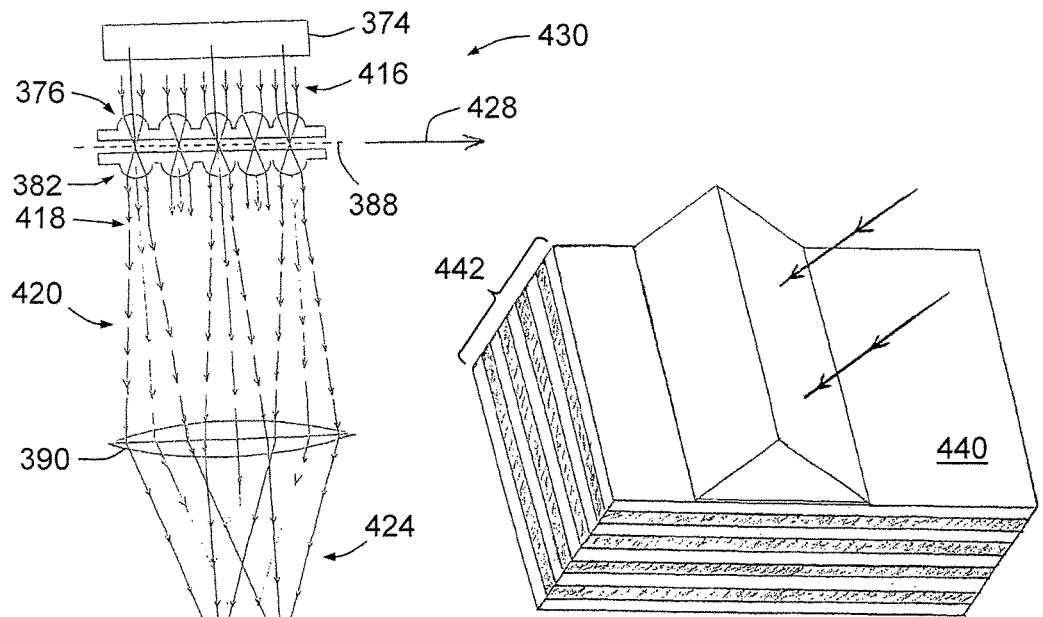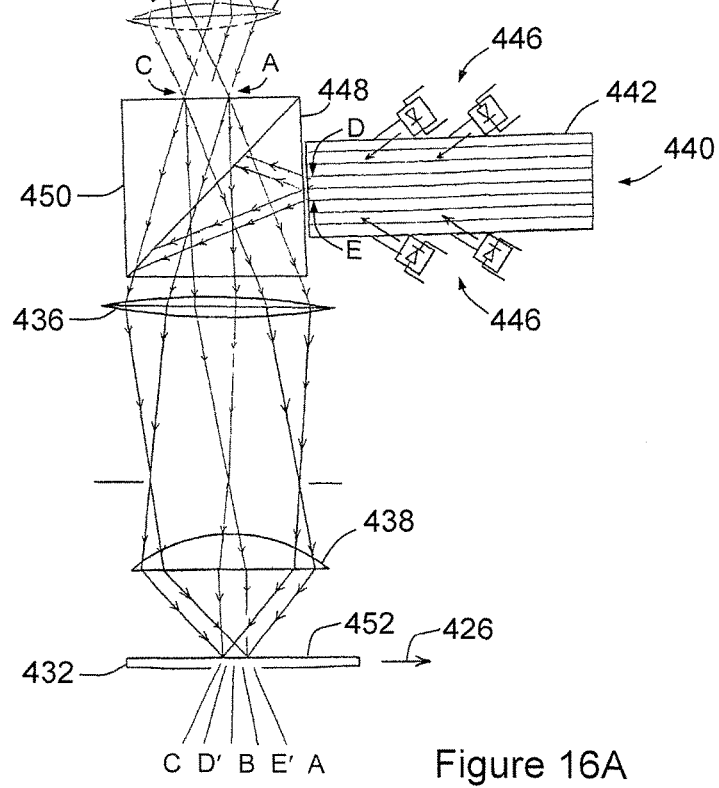
Figure 16B
Figure 16A

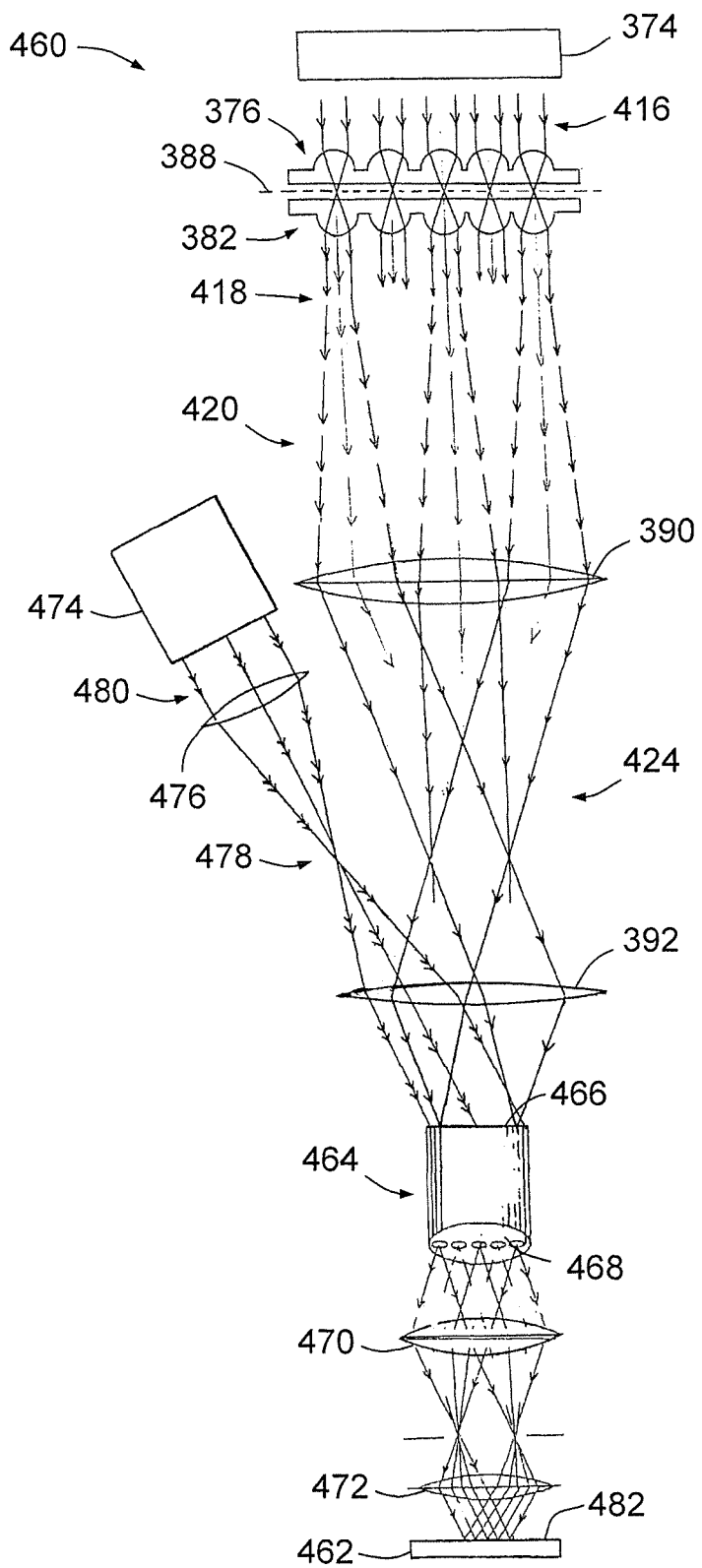
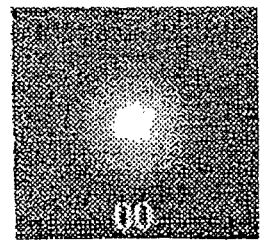
Figure 17B
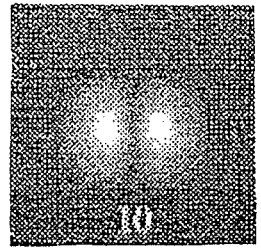
Figure 17C
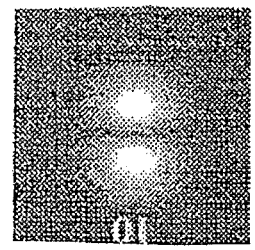
Figure 17D
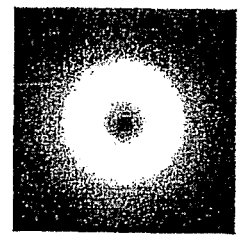
Figure 17E
Figure 17A

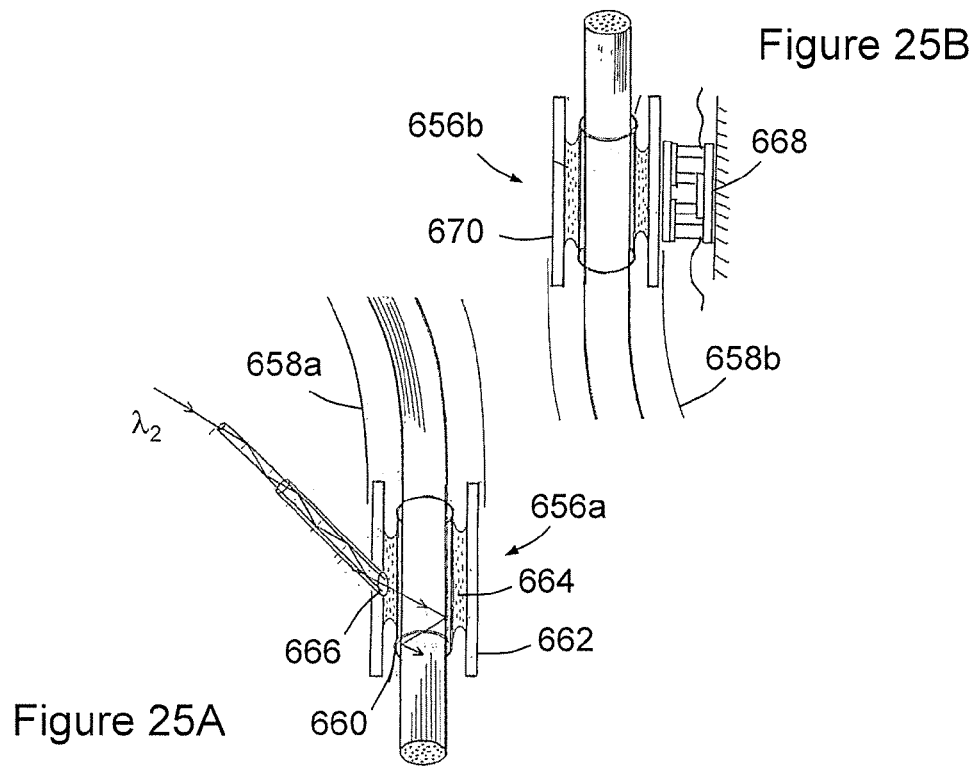
Figure 25B
Figure 25A
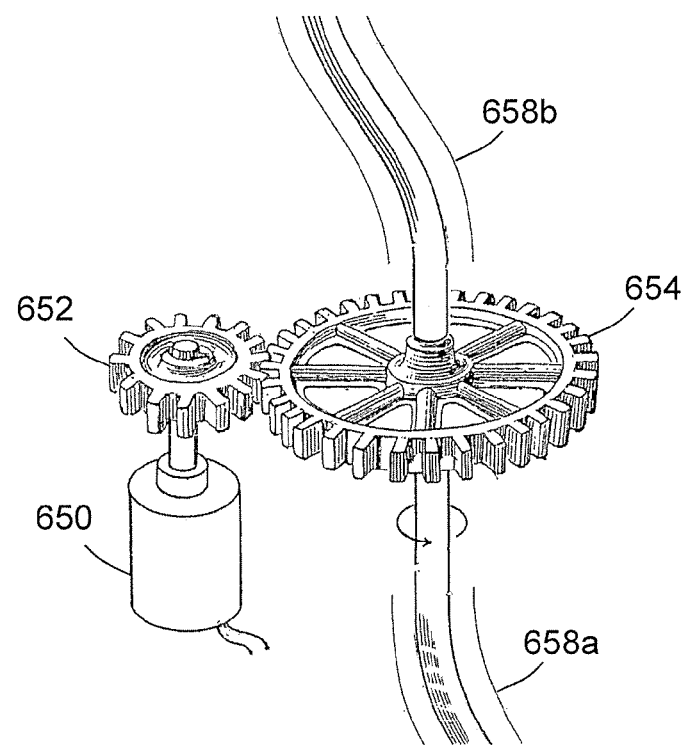
Figure 25C

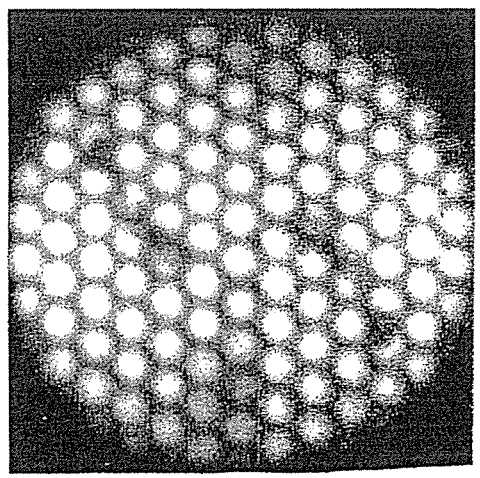
Figure 50A
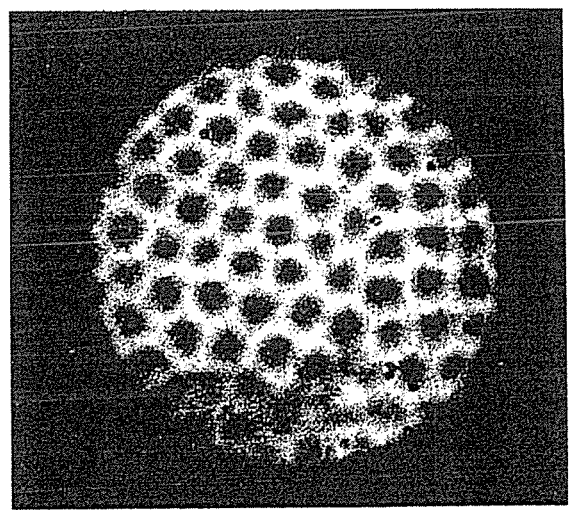
Figure 50B
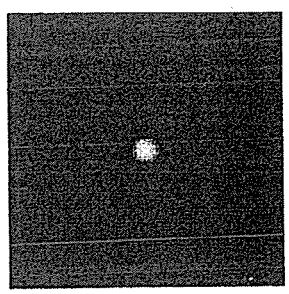 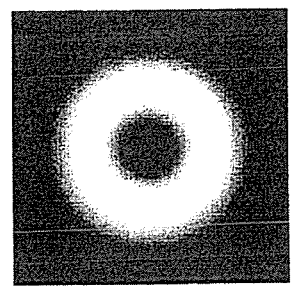 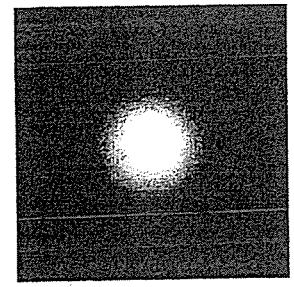
Figure 50E    Figure 50D    Figure 50C

STRUCTURED ILLUMINATION MICROSCOPY APPARATUS AND METHOD

RELATED APPLICATIONS

This application is a national stage filing under 35 U.S.C. §371 of international application PCT/AU2013/000743, filed Jul. 5, 2013, and claims the benefit under 35 U.S.C. §119(e) of U.S. provisional application Ser. No. 61/668,291, filed Jul. 5, 2012, and provisional application Ser. No. 61/803,598, filed Mar. 20, 2013, the disclosures of which are incorporated by reference herein in their entireties.

FIELD OF THE INVENTION

The present invention relates to an apparatus and method for performing structured illumination microscopy (SIM), of particular but by no means exclusive application in observing intensity patterns within a specimen formed by light emitted from the tip of an optic fibre bundle or in conducting oblique illumination phase contrast microscopy or endoscopy, and to a microscopy apparatus and method for obtaining images that can exceed the Abbé resolution limit, and in particular that employs STED/RESOLFT/GSD principles to provide the (generally optical) illumination, that make it possible to view a super-resolution image directly without electronic transduction, that may be applied to optical data storage devices and for photolithography where very fine structures are to be written in, for example, a photoresist material, and that may be applied to massively parallel near field scanning optical microscopy. The invention also relates to such principles applied to endoscopy, high throughput histopathology and nano-fabrication.

BACKGROUND OF THE INVENTION

Structured illumination microscopy (SIM) illuminates a specimen with structured or patterned light, which excites fluorescence in the specimen according to that pattern. A plurality of images are collected with the illumination shifted between each image collection. Analysis of a plurality of such images is used generate a super-resolution image.

Stimulated emission depletion (STED) microscopy is also a type of super-resolution microscopy, that operates by exciting fluorescence in a specimen, while de-exciting fluorophores to generate a super-resolution image.

Localization microscopy provides super-resolution by isolating emitters and fitting their images with the point spread function (PSF), thereby solving the problem that the width of the point spread function limits resolution. A sparse subset of emitters is activated at the same time, these emitters are localized precisely and they are then deactivated. The process is then repeated. with another subset. The collected photons (emitted, for example, during a fluorescent phase) are collected camera and the resulting image of the fluorophore is fitted. The process is repeated several thousand times so that all fluorophores can go through the bright state and be recorded. A computer is then used to reconstruct a super-resolved image.

Jerome Mertz (Dept. Biomedical Engineering, Boston University, MA) has described a method for phase contrast endoscopic imaging in thick biological tissues, termed Oblique Illumination Phase Contrast Endoscopy. This involves modifying an endoscope, such as that made by Muana Kea Technologies (trade mark) by adding two 1-mm wide LED illumination fibres to the central 2.8 mm optical fibre core detector. This configuration allowed Mertz to use Monte Carlo modelling to reveal a virtual oblique light source deep within the illuminated tissue. Subtraction of the left and right images generates a phase image. This technique was tested using 45-µm beads in agarose, and is said to have revealed good phase images at a depth of about 150 µm. Mertz also reports examining chick embryos and detecting red blood cells flowing in capillaries.

FIG. 1 shows a single sided scanning disc confocal microscope (see U.S. Pat. No. 4,927,254 to Kino and Xiao). Light from a broad area excitation source 1 is collimated by lens 2 as a beam 3 that is reflected by the dichroic layer of beamsplitter cube 4 and is converged by lens 5 to the surface of a spinning disk 6. This disk is perforated by a multitude of very small holes 7. The disc is spun rapidly on an axle 8. The light then passes through these holes indicated by beam 9 and is converged by lenses 10 and 11 to produce a series of focused spots in the specimen 12. Fluorescence generated at these spots returns back through the holes in the plate to the beam splitter. Since the fluorescence is of a longer wavelength than the excitation light it passes through the dichroic beamsplitter cube and is focused by lens 13 to form an image on the CCD chip 14. The signal from this chip forms a display image on the screen 15.

FIG. 2 is a schematic view of a Petran spinning disc confocal microscope (Petran, Hadraysky, Egger and Galambos, Tandem Scanning Reflected Light Microscope, Journal of the Optical Society of America, 58 (1968) pp. 661-664), also referred to as a tandem scanning Nipkow disc confocal. Light from light source 1 passes through lens 2 and is reflected by mirror 3 onto the surface of a spinning disk 4. The disk is perforated with a multitude of very small holes 5. Light passes through these holes and is collimated by lens 6, reflected by mirror 7 and passes through a dichroic beams splitter 8 the light then passes through lenses 9 and 10 of the microscope objective to form a focus within the specimen 11. Light generated within the specimen passes through the lenses and beam splitter and through inversion optics 12. These allow the lens 13 to produce a mirror image of the specimen. This mirror image passes through a matching set of holes 14 in the disc that are on the side of plate 180 degrees from the illumination holes. A lens 15 collects this light and brings it to a focus on a CCD 16 to form an image. During image observation the disc rotates around axis 17. The holes make up a few per cent of the disc area, and are also not truly in a Nipkow configuration as at least 100 holes are in the field of view at any one time.

FIG. 3 is a schematic view of a super resolution system as described by Stefan Hell using STED/RESOLFT/GSD principles. A TEMoo excitation wavelength light source 1 emits a beam of light which is focused by lens 2 and passed through a pinhole 3. The beam is collimated by lens 4 and passes as a Gaussian beam 5 and is reflected by beams splitter 62 scanning mirrors 7 and telecentric lenses 8 and 9 then passes through lens 10 which focuses it into the specimen 11. A de-excitation source 12 emits light 13 which passes through a phase filter 14 emerging as a doughnut mode beam 15. This beam is reflected from beam splitter cube 16 and is also reflected by mirror scanner 7 it also passes through the telecentric lenses 8 and 9 and is focused into the specimen 11 by lens 10. At the focus in the specimen light source 1 produces a Gaussian spot a magnified view of which is given in 17 the spot is surrounded by the doughnut mode image of the de excitation beam the cross section of which is shown in 18. This partly overlaps and erases the peripheral areas of the central spot. The resulting excited region remaining is shown in 19. Fluorescence from this spatially reduced region passes through the optical system and is focused by lens 20 through pinhole 21 and generates a signal in photomultiplier tube 22.

FIGS. 4A and 4B are reproductions of, respectively, FIGS. 10 and 11 of U.S. Pat. No. 7,755,063, entitled Super Resolution in Micro-Lithography and Fluorescence Microscopy to Stephen C. Baer. FIG. 4A shows a super resolution system operating by STED/RESOLFT/GSD in which the excitation light is delivered by one optical fibre and the de-excitation light is delivered via four or six individual discrete optical fibres whose tips surround the tip of the first fibre.

FIG. 5 is a reproduction of FIG. 12 of U.S. Pat. No. 7,755,063, and illustrates a system for photolithography of silicon wafers with ultrahigh resolution using a multiplicity of separate optical fibres to deliver the de activating light. U.S. Pat. Nos. 7,864,314, 7,782,457, 7,710,563, 7,626,703, 7,626,695, 7,626,694 and 7,535,012 disclose systems for optical microscopy using phototransformable optical labels.

SUMMARY OF THE INVENTION

According to a first broad aspect of the invention, there is provided a microscope or endoscope, comprising:
  a light condenser (such as an objective lens); and
  an array of micro-lenses (such as supported on a transparent plate or disposed in apertures in a possibly opaque plate);
  wherein the micro-lenses are arranged spatially to correspond in enlarged form to respective sub-resolution objects or point observational fields on or within a specimen that are separated from one another by an optically resolvable distance and to receive light from the sub-resolution objects or point observational fields, and each of the micro-lenses is arranged to converge light from the respective corresponding sub-resolution object or point observational field to a diffraction limited spot at an image plane.

Thus, the micro-lenses array matches the pattern of the sub-resolution light emitting entities in the specimen, and each micro-lens converges the light from its own individual collimated ray bundle to a diffraction limited spot at a final image plane.

The microscope or endoscope may further comprise an imaging photodetector array (such as an sCMOS chip) at the image plane.

The array of micro-lenses may be optically spaced from the light condenser at a sufficient distance that bundles of light transmitted from the sub-resolution objects or point observational fields to the respective micro-lenses do not overlap.

The microscope or endoscope may further comprise a light source for providing excitation light for illuminating the specimen.

The microscope or endoscope may further comprise a specimen stage for supporting the specimen, wherein the specimen stage is movable relative to excitation (whether by light, a focussed electron beam, X-rays, an ion beam, a neutral atom beam, a neutron beam or otherwise) by a sub-resolution distance so that a new set of sub-resolvable the sub-resolution objects or point observational fields is activated, the array of micro-lenses being maintained in registration with the excited sub-resolution objects or point observational fields.

The microscope or endoscope may, in this embodiment, be configured to move the array of micro-lenses by a correspondingly enlarged distance in its plane relative to movement of the specimen stage to maintain a position of an image of the illuminated sub-resolution objects or point observational fields stationary relative to the array.

The motions in this process may be continuous rather than stepped.

In one embodiment, the microscope or endoscope comprises a lens to render parallel light bundles from the sub-resolution objects or point observational fields before the light bundles encounter the micro-lenses.

In another embodiment, the microscope or endoscope comprises a mechanism for producing an array of sub-resolution spots, objects or point observational fields.

The microscope or endoscope may comprise a fused fibre optic bundle for delivering an excitation beam to the sub-resolution objects or point observational fields via cores of the fused fibre optic bundle, wherein the fibre optic bundle is arranged to receive the excitation beam and transmit de-excitation light to the specimen via cladding of the fused fibre optic bundle.

In another embodiment, the microscope or endoscope comprises a coherent fibre optic bundle of optical fibres, the bundle being located between the specimen and the light condenser and, in use, in contact with the specimen, and arranged to collect return light from the sub-resolution objects or point observational fields, wherein each of the optical fibres collects light from one of the respective sub-resolution objects or point observational fields and return light emitted by the bundle.

The microscope or endoscope may comprise a metamaterial lens to produce multiple sub-resolution sampling points or point observational fields within the specimen.

This aspect also provides a far field GSD or STED microscope, comprising the microscope described above.

This aspect also provides a near field GSD or STED microscope, comprising the microscope described above.

A scanning near field optical microscope, comprising:
  the microscope described above;
  an opaque web (such as a film) having a plurality of apertures; and
  a drive;
  wherein the sub-resolution objects or point observational fields are defined by the apertures, the opaque member is configured to be adjacent to the specimen in use, and the drive is configured to provide relative motion between the opaque web and the specimen.

According to a second broad aspect of the invention, there is provided a method of microscopy or endoscopy, comprising:
  arranging a plurality of micro-lenses spatially to correspond in enlarged form to respective sub-resolution objects or point observational fields on or within a specimen, the sub-resolution objects or point observational fields being separated from one another by an optically resolvable distance;
  exciting the sub-resolution objects or specimen portions at the point observational fields;
  receiving light from the sub-resolution objects or point observational fields with the plurality of micro-lenses, each of the micro-lenses converging light from the respective corresponding sub-resolution object or point observational field to a diffraction limited spot at an image plane.

According to a third broad aspect of the invention, there is provided a photolithography or nano-fabrication apparatus, comprising:
  a target stage for supporting a target (such as a silicon wafer) comprising a target material;

a first light source for activating the target material;
at least one second light source for de-activating the target material or inhibiting activation of the target material;
a mask with an array of apertures; and
a light condenser (such as an objective lens);
wherein the apertures are arranged spatially to correspond in enlarged form to a desired pattern on the target of respective sub-resolution structures or volumes that are separated by one another by an optically resolvable distance, and the apparatus is configured to direct light from the first light source and the at least one second light source to the target and perform either STED or GSD so as to create the desired pattern on or in the target.

The apparatus may comprise an array of micro-lenses arranged in registration with the apertures to focus light from the light source passing through the respective apertures.

According to a fourth broad aspect of the invention, there is provided a photolithography or nano-fabrication method, comprising:
activating a target material of a target with a first light source;
de-activating the target material or inhibiting activation of the target material with at least one second light source;
providing a mask with an array of apertures arranged spatially to correspond in enlarged form to a desired pattern on the target of respective sub-resolution structures or volumes that are separated by one another by an optically resolvable distance; and
performing either STED or GSD so as to create the desired pattern on or in the target.

According to a fifth broad aspect of the invention, there is provided an imaging device, configured to produce optically super-resolved image of structures revealed by fluorescence imaging in a sample caused by x-rays, electron beam spots or atomic beams.

According to a sixth broad aspect of the invention, there is provided an imaging apparatus configured to produce a plurality of images by generating two different patterns of light in a specimen by separate illumination pulses delivered through different channels within an optic fibre bundle modes.

The different channels may comprise core and cladding modes, respectively.

Light from the specimen that returns to form the images may travel within the cores of the bundle. In one embodiment, light from the specimen that returns to form the images travels within the cores of another optic fibre bundle; the bundles may be conjugate bundles.

According to a seventh broad aspect of the invention, there is provided an imaging method, comprising producing a plurality of images by generating two different patterns of light in a specimen by separate illumination pulses delivered through different channels within an optic fibre bundle modes.

According to a eighth broad aspect of the invention, there is provided an apparatus for optical scanning in which light from sub-resolution objects or point observational fields are projected into a visual field and distinguished as separate points even though the distance between them is well below the Abbé limit.

The apparatus may be adapted to provide microscopy for obtaining images that can exceed the Abbé resolution limit, such as employing STED/RESOLFT/GSD principles to provide the (generally optical) illumination, that make it possible to view a super-resolution image directly without electronic transduction, that may be applied to optical data storage devices and for photolithography where very fine structures are to be written in, for example, a photoresist material, that may be applied to massively parallel near field scanning optical microscopy, to endoscopy, high throughput histopathology or nano-fabrication.

According to a ninth broad aspect of the invention, there is provided a method for optical scanning in which images of sub resolution sized objects can be projected into the visual field and distinguished as separate points even though the distance between them is well below the Abbé limit.

The method may be adapted to perform microscopy for obtaining images that can exceed the Abbé resolution limit, such as employing STED/RESOLFT/GSD principles to provide the (generally optical) illumination, for viewing a super-resolution image directly without electronic transduction, for optical data storage, for photolithography, for massively parallel near field scanning optical microscopy, for endoscopy, for high throughput histopathology or for nano-fabrication.

According to one broad aspect, the present invention provides a structured illumination microscopy apparatus and method, in which the successive images that are required to isolate the focal plane (using known structured illumination principles) are generated by moving the specimen, the bundle tip or an optical component near the specimen by a small distance (in X, Y or Z directions) between exposures.

According to another broad aspect, there is provided a microscope or endoscope for conducting oblique illumination phase contrast microscopy or endoscopy, and a method of conducting oblique illumination phase contrast microscopy or endoscopy.

It should be noted that these various aspects may be employed in combination.

There are several channels that can readily be accessed to carry light within a single fused bundle. Any pair of these might be illuminated in succession to generate the pattern shift in the focal plane and to generate the two or more images for SIM imaging.

Among these channels are:
Fundamental mode of the few moded cores (or single mode cores)
Higher order modes of "few-moded" cores. Radially symmetrical, elliptical or other geometries
Low order cladding modes of entire bundle matrix
Cladding modes of entire bundle that matching the NA of the cores
Higher order cladding modes of entire bundle matrix
Orthogonal polarisation modes of fundamental mode within each core.

Light may be focussed to a photodetector (such as a CCD), without passing through the cores of a bundle.

The present invention is applicable to a range of techniques, such as GSD microscopy and STED microscopy, in which subtraction can be performed optically rather than in a computer processor. Using this invention super-resolution could also be obtained in fluorescence mode if light intensity is sufficient to saturate the fluorophore (Mats Gustafsson). It is also possible that the invention could be used to facilitate and increase the speed of STORM/PALM imaging by reducing out of focus or near neighbour fluorescent interference.

The addition of a further optical element as described below allows the invention to be applied to ultrahigh density photolithography, directly viewable GSD/STED super-resolution microscopy, nanofabrication and optical data storage.

It is clear that with several available channels within one single fibre bundle to carry light to the specimen and the number of optical configurations of the components that it will not be possible to enumerate all cases.

In general it is preferable to hold the proximal bundle tip stationary. Computation should be easier when the light from each core is always projected onto the same collection of pixel elements of the photodetector array.

Scanning the distal bundle tip or other distal component is used to change the projected pattern in the specimen if the same light delivery channel is used for both exposures. Scanning the distal tip is also used to "fill in" the space between the cores and give proper Nyquist interval sampling. The same scanning mechanism can be used to fulfil both functions.

A number of scanning and positional feedback mechanisms could be employed, including for example the hydraulic actuator of U.S. patent application Ser. No. 12/065,203 which has the advantage of compactness.

The shift in the pattern position between successive image frame acquisitions is desirably a fraction of the core centre spacing. The difference between successive pairs of images would be transferred to an accumulating frame store. As the scanning would typically be continuous and in one direction (simultaneously fulfilling Nyquist sampling criteria), compensation for the continuing lateral shift must be made before the addition to the cumulative image.

The amount of shift required in the frame store could be computed from the outputs of positional feedback mechanisms linked to the bundle tip. Alternatively autocorrelation could be done on the features of successive images, possibly aided by bright reference objects previously applied to the tissue.

For some embodiments it is desirable to scan the light pattern within the specimen (such as by scanning the distal tip of a delivery fibre bundle) and to simultaneously and synchronously scan another component at the proximal end so as to produce a real image with a fixed position on the EMCCD photo-array. The frame acquisition can then be continuous, with no downtime required for CCD readout. A single exposure thus integrates the image.

A number of embodiments are suitable for use in GSD and STED. These can be implemented by software manipulation of the image or by directly viewable techniques.

Software embodiment: In STED and GSD, the light emitting spot is reduced in size. Hence, computer processing may be used to find the centroid of each of the core spots in the image and map the total intensity from that spot into a reduced area at its centroid. These "shrunken" spots would then be mapped into the accumulating frame store to build up a final image.

The invention also provides embodiments of directly viewable GSD/STED systems operating in super-resolution mode, as well as embodiments for photolithography. These employ the synchronised scanning of two components. One embodiment employs a micro-lens scanning plate, which permits the Abbé limit to be exceeded. Visual observation by eye might well be feasible for high brightness specimens. Integration of the image by time accumulation onto a low noise EMCCD would be possible.

According to a first broad aspect of the invention, there are provided apparatuses and methods for providing light and lighting a specimen that is to be examined.

According to a second broad aspect of the invention, there are provided apparatuses and methods for optical scanning in which images of sub resolution sized objects can be projected into the visual field and distinguished as separate points even though the distance between them is well below the Abbé limit.

Apparatuses and methods according to the invention may be adapted to provide microscopy for obtaining images that can exceed the Abbé resolution limit, such as employing STED/RESOLFT/GSD principles to provide the (generally optical) illumination, that make it possible to view a super-resolution image directly without electronic transduction, that may be applied to optical data storage devices and for photolithography where very fine structures are to be written in, for example, a photoresist material, and that may be applied to massively parallel near field scanning optical microscopy. The invention also relates to such principles applied to endoscopy, high throughput histopathology and nano-fabrication.

It should be noted that any of the various features of each of the above aspects of the invention, and of the various features of the embodiments described below, can be combined as suitable and desired.

It should also be noted that the optical arrangements of the embodiments described herein, implemented variously as microscopes or photolithographic apparatuses, may in certain applications be implemented to provide, for example, microscopes, endoscopes, endomicroscopes, photolithographic apparatuses, light sources, apparatuses for trapping Bose-Einstein condensates, and apparatuses for photopolymerisation.

Also, many components of the described embodiments are omitted for clarity, but the characteristics of such omitted components will be readily understood or determined by those skilled in the art, who similarly and be varied will readily understand how these components should be varied for other applications.

BRIEF DESCRIPTION OF THE DRAWING

In order that the invention may be more clearly ascertained, embodiments will now be described, by way of example, with reference to the accompanying drawing, in which:

FIG. 16A is a schematic view of a photolithography apparatus according to an embodiment of the present invention;

FIG. 16B is a schematic view of a structure for directing de-activating light into the beamsplitter cube of the photolithography apparatus of FIG. 16A according to an embodiment of the present invention;

FIG. 17A is a schematic view of a photolithography apparatus according to an embodiment of the present invention;

FIGS. 17B to 17D are schematic representation of various modes in which activating light is transmitted in the cores of the fibre bundle of the photolithography apparatus of FIG. 17A;

FIG. 17E is a schematic representation of the halo effect produced by simultaneously coupling two de-activating laser light sources into the cores of the fibre bundle of the photolithography apparatus of FIG. 17A;

FIG. 25A to 25C are schematic views of various components of the rotating fused fibre bundle system of FIG. 24;

FIG. 50A is an image taken through the tip of a bundle when the cores at the other end are illuminated (viz. in 'normal illumination mode');

FIG. 50B shows 'black holes' at the tip of the bundle when the bundle is exposed to cladding mode illumination;

FIG. 50C shows the illumination intensity distribution from a TEM oo laser;

FIG. 50D shows the illumination intensity distribution from a doughnut mode laser;

FIG. 50E shows the increase in certainty of position/resolution of the spot position that can be obtained with STED when the image of FIG. 50D is subtracted from that of FIG. 50C;

DETAILED DESCRIPTION

Figure 1:
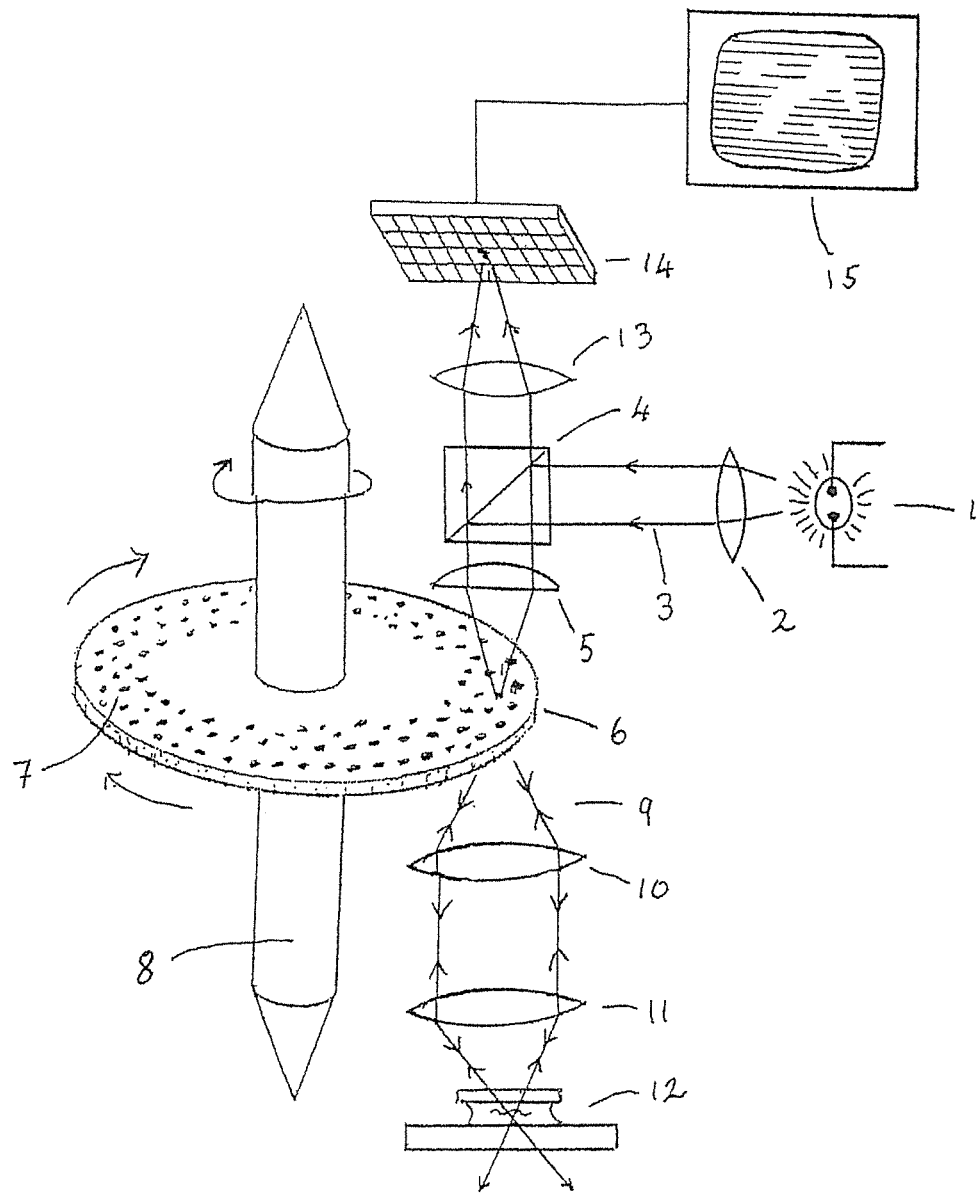
FIG. 1 is a schematic view of a microscope of the background art.
Figure 2:
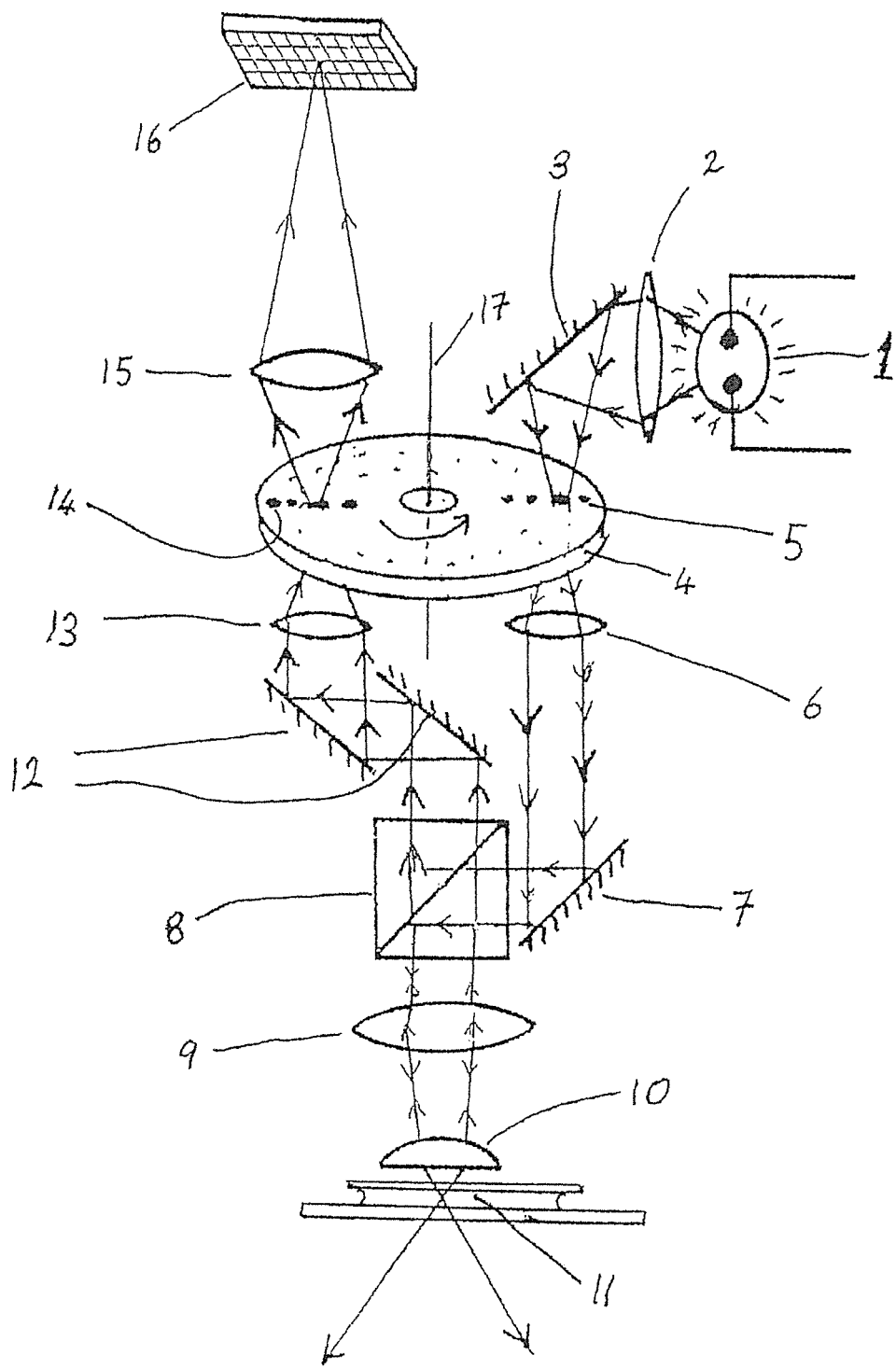
FIG. 2 is a schematic view of a microscope of the background art.
Figure 3:
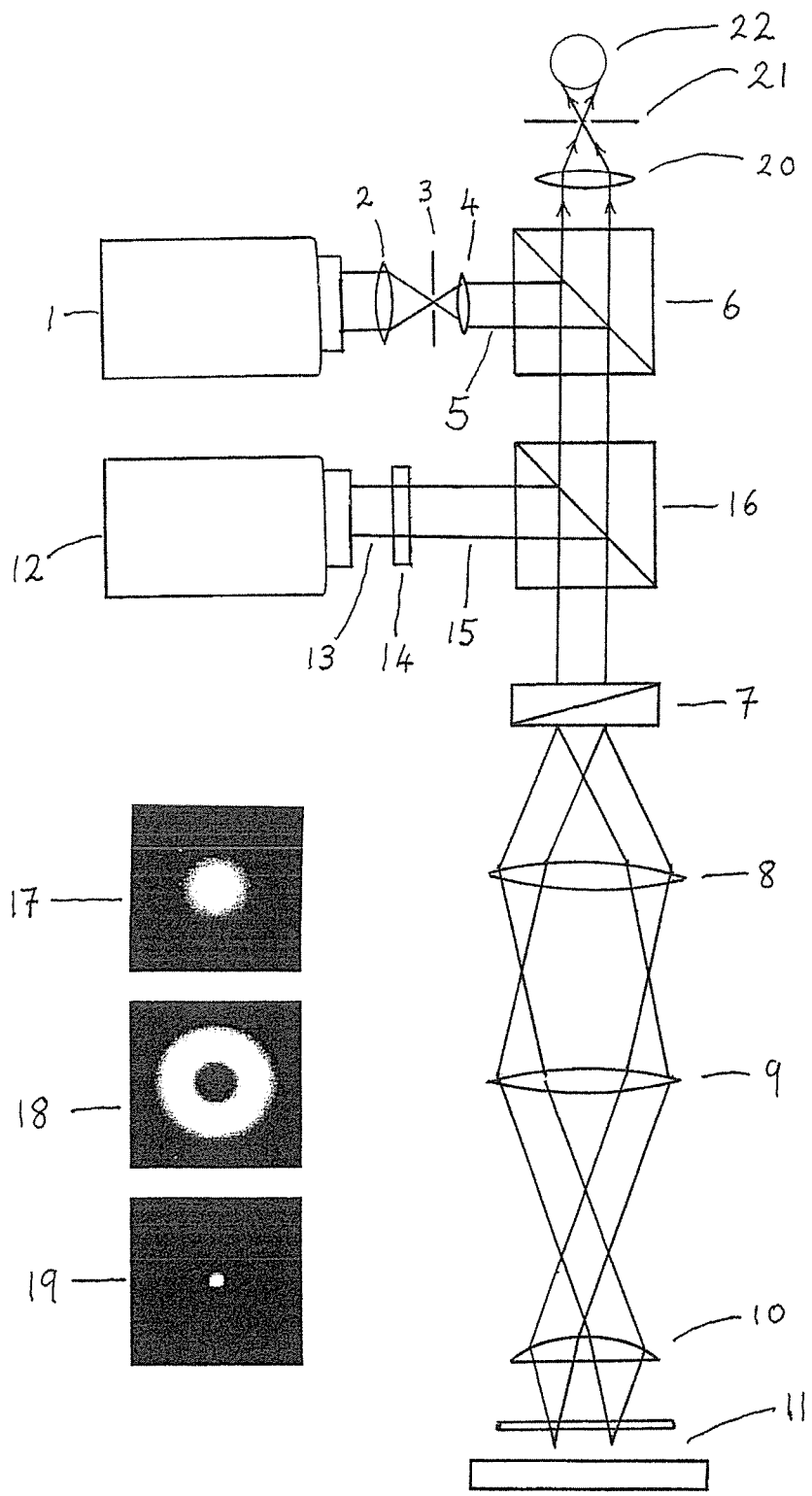
FIG. 3 is a schematic view of a microscope of the background art.
Figure 4:
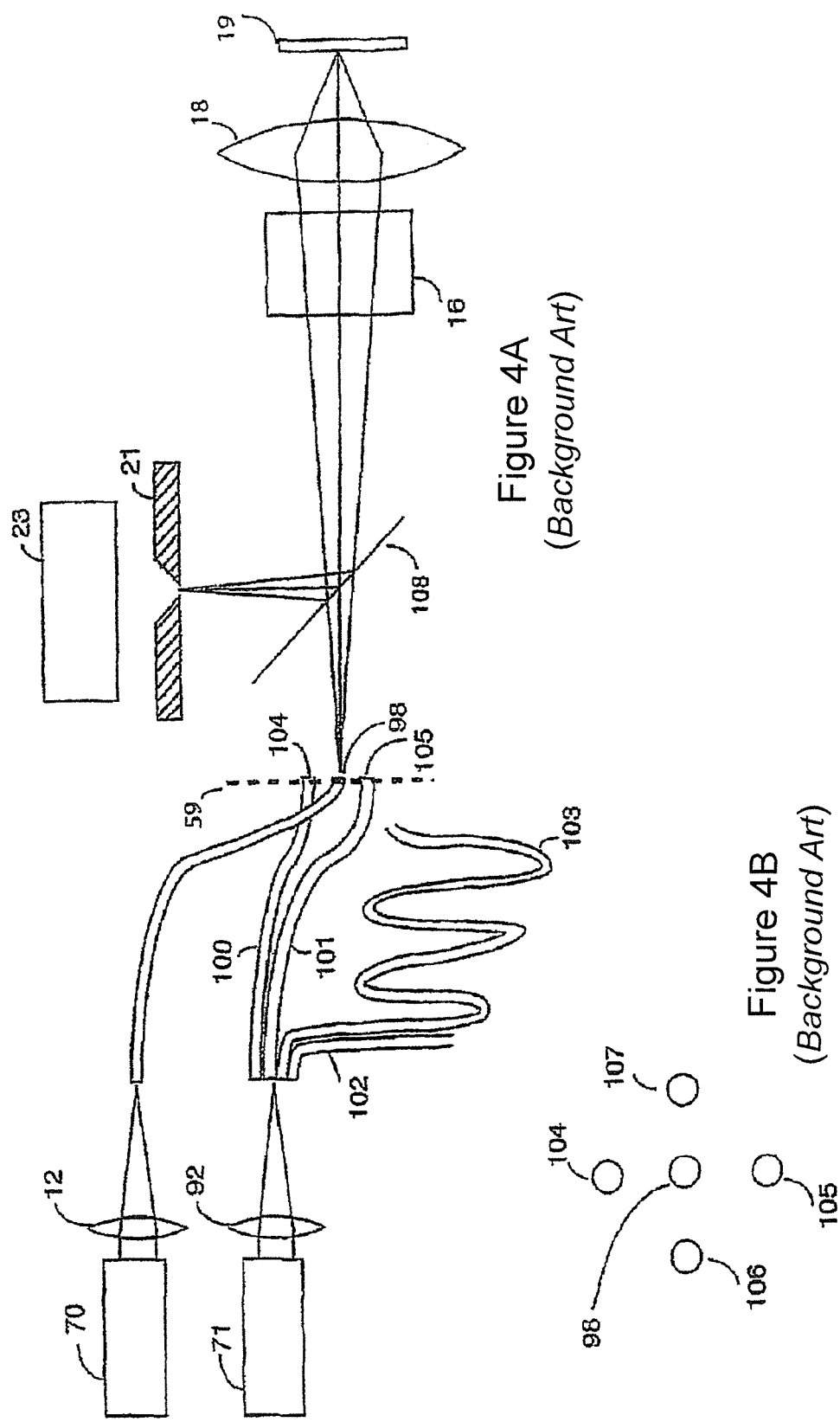
FIGS. 4A and 4B are schematic views of a microscope of the background art.
Figure 5:
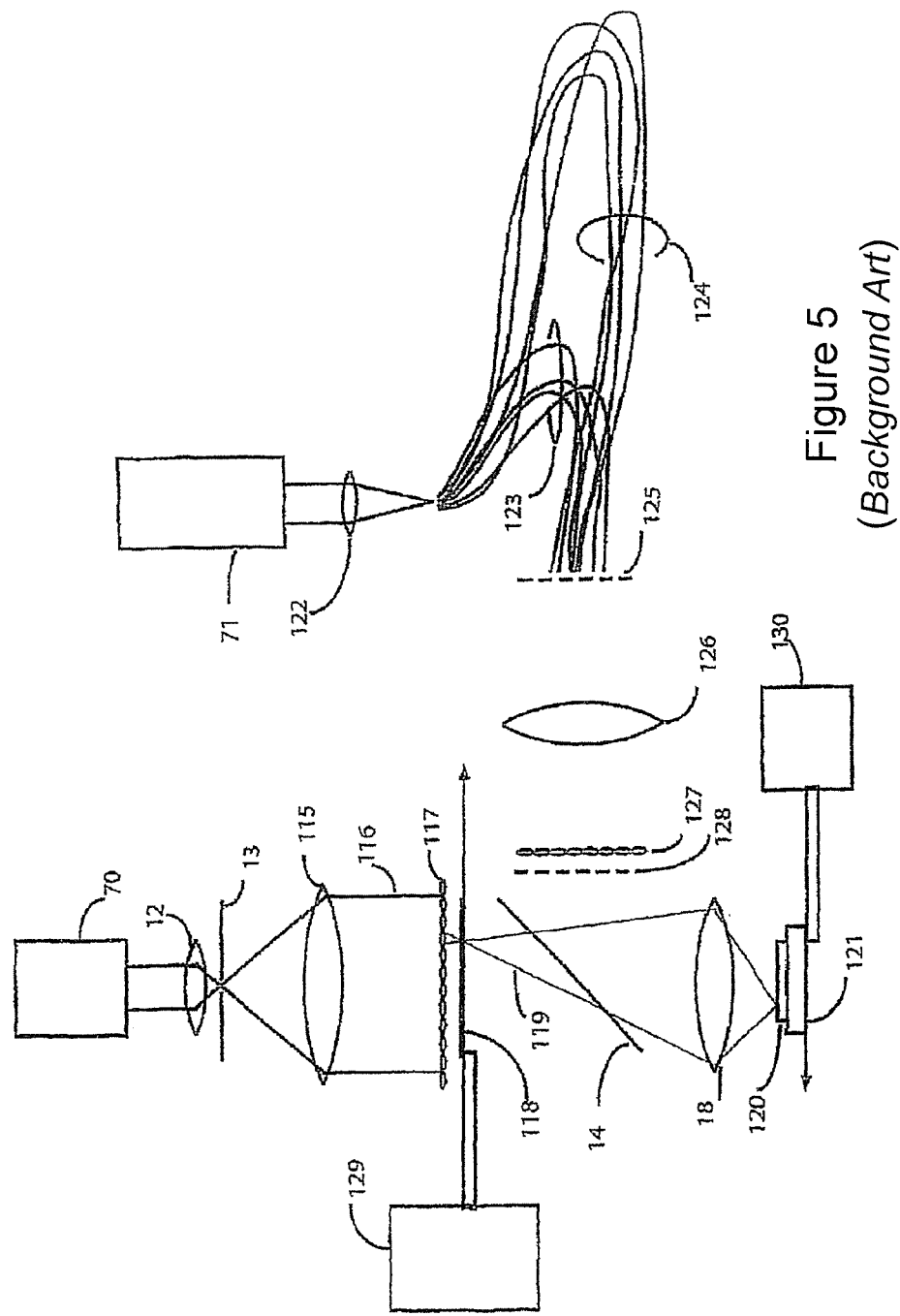
FIG. 5 is a schematic view of a microscope of the background art.
Figure 6:
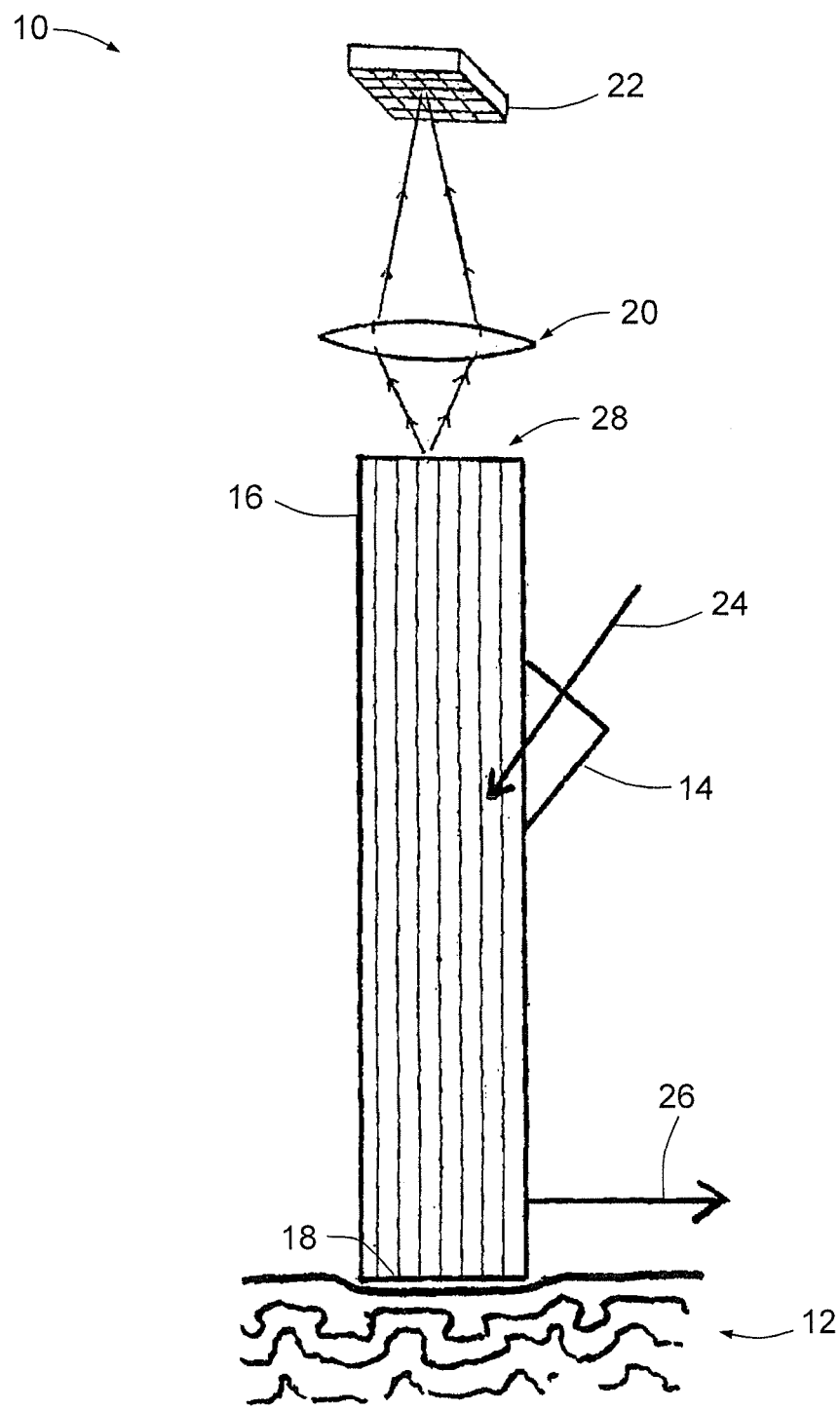
FIG. 6 is a schematic view of a microscope according to an embodiment of the present invention.

FIG. 6 is a schematic view of a microscope 10 according to an embodiment of the present invention, shown with a specimen in the form of a tissue sample 12. Microscope 10 includes a light source (not shown), a prism coupler 14, a fused optic fibre bundle 16 (with a distal tip 18), a focussing lens 20 and a photodetector in the form of a CCD chip 22.

Referring to FIG. 6, in use a light beam 24 from the light source is coupled through prism coupler 14 into the higher order cladding modes of fused optic fibre bundle 16. The light leaves the bundle at distal tip 18 and passes into the tissue sample 12. The distal tip 18 can slide against the tissue sample 12, so—to effect scanning—distal tip 18 is moved relative to tissue sample 12 (by movement of distal tip 18, tissue sample 12 or both) such that distal tip 18 moves in direction 26 relative to tissue sample 12. This movement may be, for example, linear or rotational. Light from within the tissue (being backscatter light, fluorescence or a combination thereof) enters the cores of the bundle 16 and passes to the other end 28 of bundle 16, from which it is emitted. It is then focussed by focussing lens 20 to form an image on CCD chip 22. Two separate exposures are taken, the distal tip 18 being moved relative to the tissue sample 12 therebetween preferably by a fraction of the core centre spacing of the bundle 16.

A differential image is then formed from the two separate exposures. This differential image contains mostly high frequency information, low frequency information being largely removed in the formation (such as by subtraction) of the differential image, and thus provides a greater contrast for structures that are very close to the distal tip 18 of bundle 16.

Figure 7:
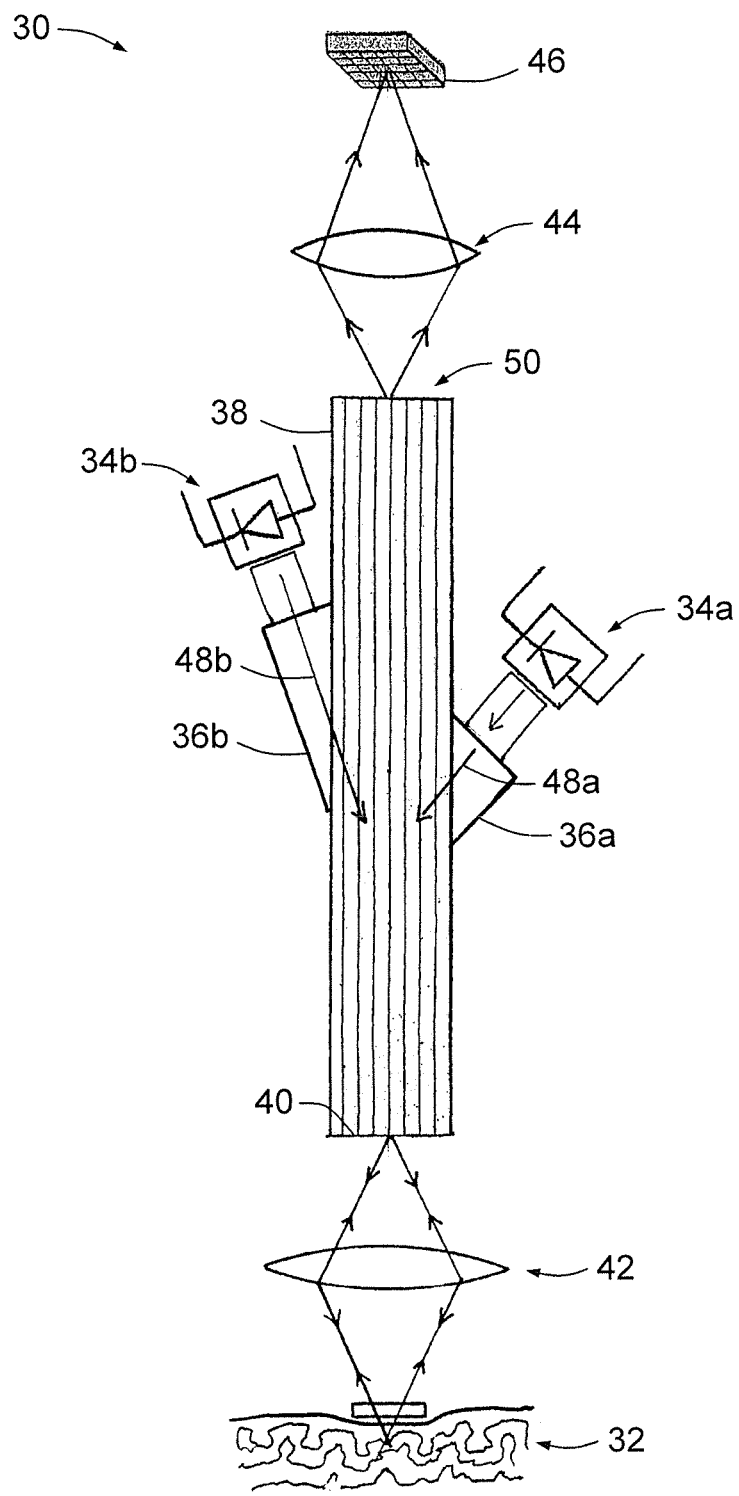
FIG. 7 is a schematic view of a microscope according to an embodiment of the present invention.

FIG. 7 is a schematic view of a microscope 30 according to another embodiment of the present invention, shown with a specimen in the form of a tissue sample 32. Microscope 30 includes two light sources 34a, 34b, respective prism couplers 36a, 36b, a fibre bundle 38 with a polished distal tip 40, a first focussing lens 42, a second focussing lens 44 and a photodetector in the form of a CCD chip 46.

In use, light 48a, 48b from respective light sources 34a, 34b enters the cladding of the bundle 38 as high and low order modes respectively. The light from each source leaves the polished distal tip 40 and is focused by first lens 42 into the tissue sample 32. The focus structure of the two light sources 34a, 34b differs, as the NA of the light from the 38 bundle is not the same. Light from the tissue sample 32 returns to the bundle 38; some of it enters the cores of bundle 38 and emerges from the other end 50 of the bundle 38, and is focused by second lens 44 onto CCD 46 to form an image. Light sources 34a and 34b are flashed alternately to provide the change in the projected light structure so that a differential image can again be formed. Relative movement of distal tip 40 and tissue sample 32 is not required in this embodiment for focal plane isolation but is effected to satisfy Nyquist sampling criteria. With this embodiment the differential image signal may be enhanced by the use of a lens having slight chromatic or spherical aberration.

Figure 8:
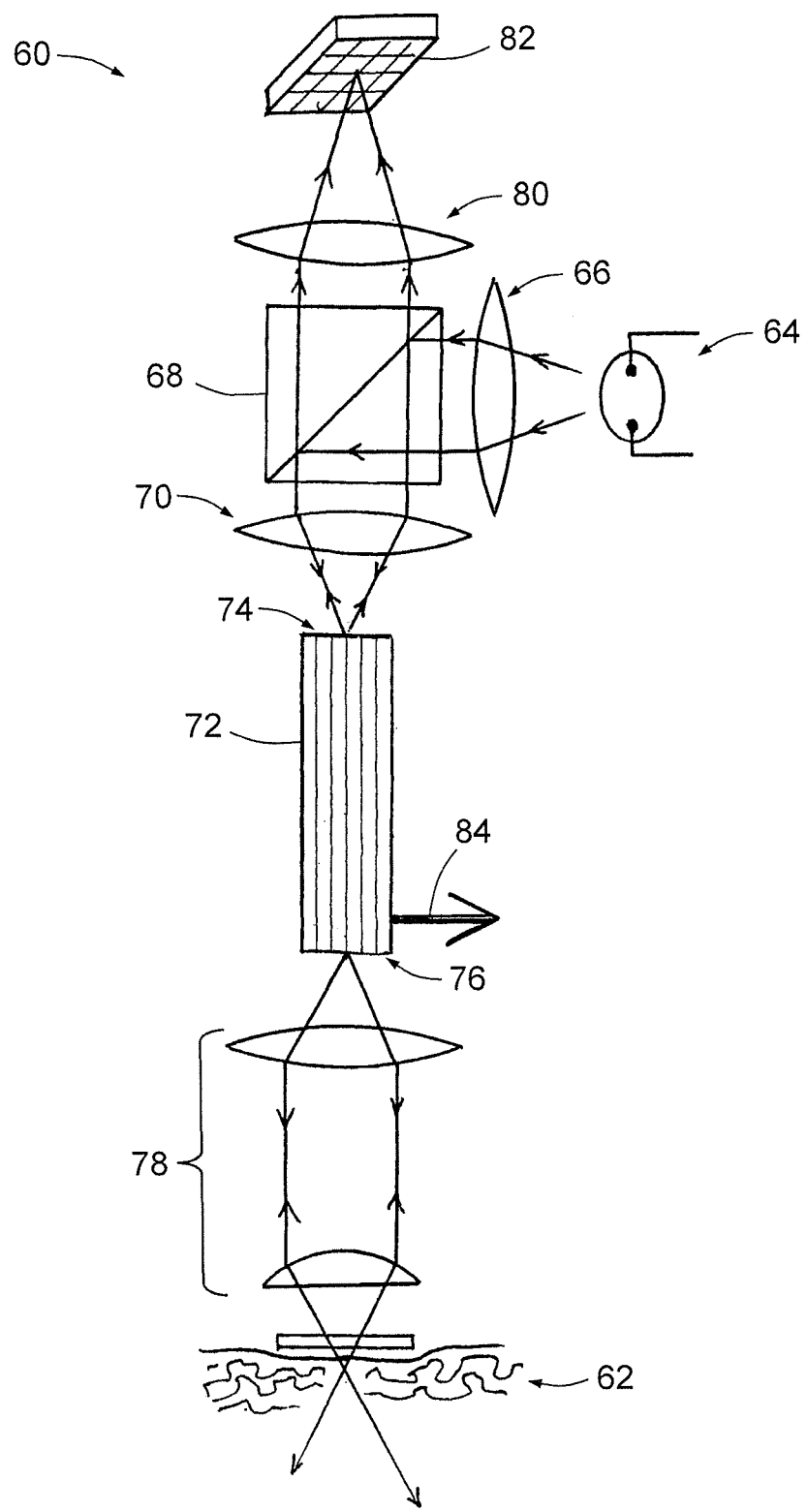
FIG. 8 is a schematic view of a microscope according to an embodiment of the present invention.

FIG. 8 is a schematic view of a microscope 60 according to another embodiment of the present invention, shown with a specimen in the form of a tissue sample 62. Microscope 60 includes a large area source 64, a collimating lens 66, a beamsplitter in the form of a beamsplitter cube 68, a focussing lens 70, a fibre bundle 72 (with a proximal tip 74 and distal tip 76), a lens train 78, a focussing lens 80 and a photodetector in the form of a CCD array 82.

In use, light from large area source 64 is collimated by lens 66 and (partially) reflected by beamsplitter cube 68 towards the cores at the proximal tip 74 of fibre bundle 72. The light is emitted from the cores at the distal tip 76 and focussed by lens train 78 into the tissue sample 62. Fluorescence and/or other return light from the tissue sample passes in the opposite direction through the cores of fibre bundle 72 and is emitted from the proximal tip 74, passes through beamsplitter cube 68 and is focused by focussing lens 80 onto CCD array 82. Differential images are generated from pairs of exposures, including effecting relative movement of distal tip 76 and the tissue sample 62 (in the illustrated example, by moving distal tip 76 in the direction shown by arrow 84). This movement provides the desired shift in the structured light. Alternatively, the lens train 78, or lens train 78 and fibre bundle 72, or tissue sample 62, may be moved to the same effect between exposures. The movement can also function to provide proper sampling intervals.

Figure 9:
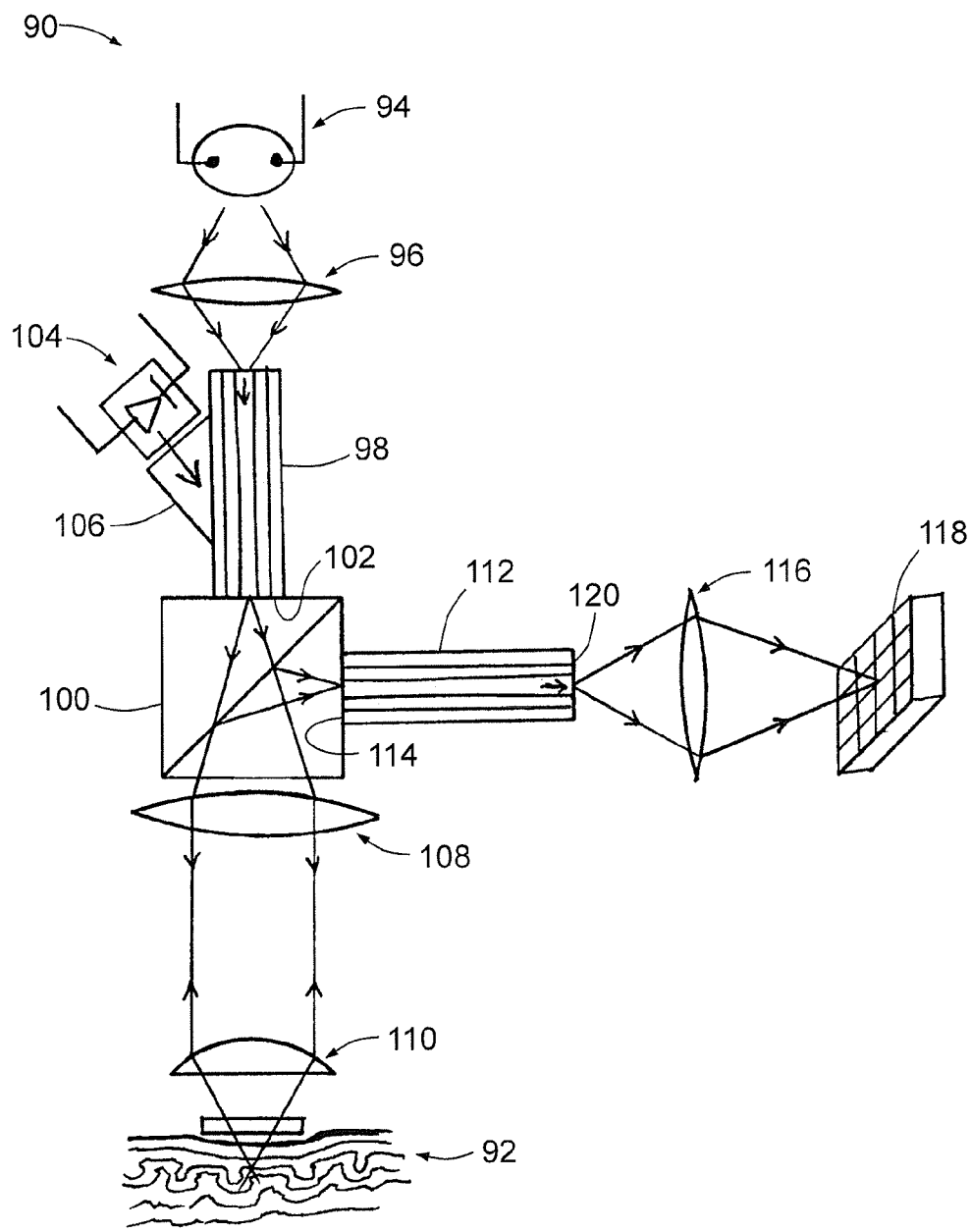
FIG. 9 is a schematic view of a microscope according to an embodiment of the present invention.

FIG. 9 is a schematic view of a microscope 90 according to another embodiment of the present invention, shown with a specimen in the form of a tissue sample 92. Microscope 90 employs two fibre bundles, one to deliver illuminating light and a second 'conjugate' bundle to collect return light. These bundles are oriented so that all the cores are in mirror-image correspondence and advantageously are affixed to the sides of a beamsplitter cube with optical cement, as discussed below.

Referring to FIG. 9, microscope 90 includes a light source 94, a focussing lens 96, a first fibre bundle 98 and a beamsplitter cube 100. The distal tip 102 of first fibre bundle 98 is affixed to one side of beamsplitter cube 100 with optical cement. Microscope 90 also includes a second light source 104 and a coupling prism 106 for coupling light from second light source 104 into the cladding modes of the first fibre bundle 98. Microscope 90 includes a collimating lens 108 optically downstream of beamsplitter cube 100, an objective lens 110 for focussing light to within tissue sample 92, a second 'conjugate' bundle 112 with a proximal tip 114 affixed to another side of beamsplitter cube 100 with optical cement, a converging lens 116 and a photodetector in the form of a CCD 118.

In use, a first light beam from light source 94 is coupled by focussing lens 96 into the cores of first fibre bundle 98. A second light beam, from second light source 104, is coupled by prism 106 into the cladding modes of first fibre bundle 98. Both light beams emerge from the distal tip 102 of first fibre bundle 98 and pass into the glass of beamsplitter cube 100. The light beams pass through beamsplitter cube 100 and, upon emerging, are collimated by collimating lens 108, and pass to objective lens 110 which brings them to a focus within tissue sample 92. Return light from tissue sample 92 is collected by objective lens 110 focussed by collimating lens 108 towards beamsplitter cube 100, and partially reflected by beamsplitter cube 100 to a focus at the proximal tip 114 of second bundle 112. The light that enters the cores of second bundle 112 passes to the other end 120 of second bundle 112, from which it emerges and is converged by converging lens 116 to a focus on CCD 118. A differential image is formed by flashing first light source 94 and then second light source 104, and thereby collecting a pair of exposures. The pixel values from the exposure from second light source 104 are subtracted from the pixel values from the exposure taken with first light source 94. No relative movement—such as by translation or rotation of tissue sample 92—is required between exposures, but translational relative movement is employed to give proper sampling intervals (as discussed above).

Figure 10:
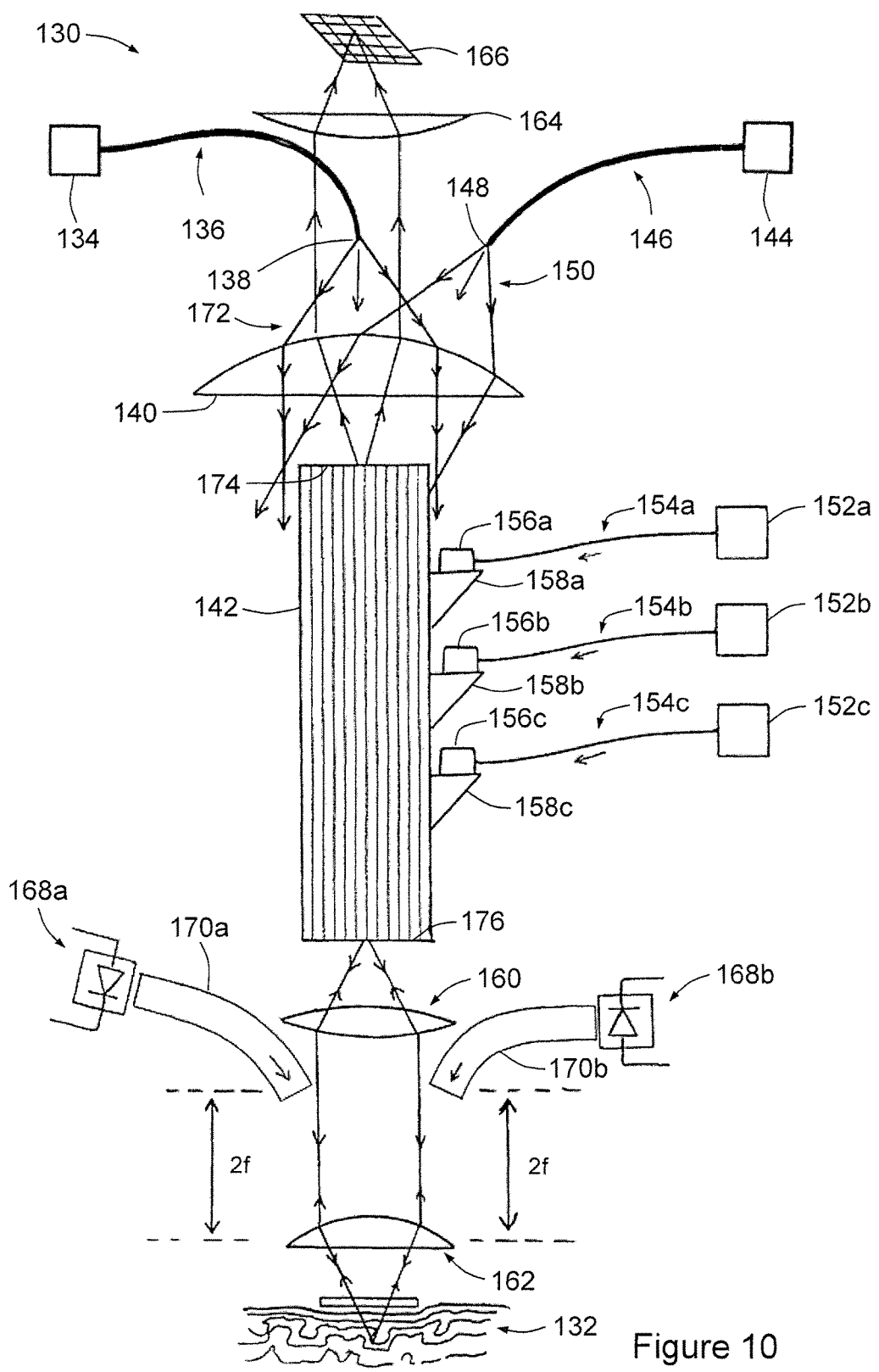
FIG. 10 is a schematic view of a microscope according to an embodiment of the present invention.

FIG. 10 is a schematic view of a microscope 130 according to another embodiment of the present invention, which has a number of novel features and is shown with a specimen in the form of a tissue sample 132. Microscope 130 includes an excitation source 134, a delivery optic fibre 136 (which is single moded, or may be multimoded for low coherence length light) with a distal tip 138, a collimating lens 140 and a fibre bundle 142.

Microscope 130 also includes sources of de-excitation light; a first de-excitation light source 144 is arranged in a manner comparable to that of excitation source 134, with an optic fibre 146 for delivering light from first de-excitation light source 144 to collimating lens 140. The distal tip 148 of optic fibre 146 is positioned in the Fourier space away from the optic axis of collimating lens 140 and fibre bundle 142, so that the beam 150 of de-excitation light emerging from it is collimated (by collimating lens 140) and enters fibre bundle 142 at an angle that causes the beam to enter the cores of fibre bundle 142 as higher order modes.

Microscope 130 also includes second, third and fourth de-excitation sources 152a, 152b, 152c, and respective multimode optic fibres 154a, 154b, 154c, mode conditioners 156a, 156b, 156c and prism couplers 158a, 158b, 158c, to couple de-excitation light from second, third and fourth de-excitation sources 152a, 152b, 152c into the cladding of fibre bundle 142 as low order, medium order and high order cladding modes respectively.

The de-excitation pulses from de-excitation sources 144, 152a, 152b, 152c may operate by GSD/STED mechanisms, or de-excitation sources 144, 152a, 152b, 152c may act as the illumination source that is used to produce the second frame that is subtracted from the frame produced by the excitation light pulse from excitation source 134.

Downstream of fibre bundle 142, microscope 130 includes collimating lens 160 and an objective lens 162, the last arranged to focus light into tissue sample 132.

Microscope 130 also includes a converging lens 164 and a CCD 166, the converging lens 164 being arranged to direct return light emitted by fibre bundle 142 and collimating lens 140 to a focus on CCD 166. In addition, microscope 130 includes two low coherence light sources 168a, 168b, and respective multimode optic fibres 170a, 170b connected thereto with distal tips for emitting light from low coherence light sources 168a, 168b positioned on either side of the optic axis at a distance of approximately 2 f away from objective lens 162; these emit light alternately (by alternate illumination of low coherence light sources 168a, 168b) to carry out Oblique Illumination Phase Contrast Endoscopy in conjunction with the fluorescence mode imaging described above.

In use, light from excitation source 134 is transmitted along optic fibre 136, and is emitted from distal tip 138 as a diverging beam 172 that is collimated by collimating lens 140 and passes into the proximal tip 174 of fibre bundle 142 as the fundamental mode of the cores of fibre bundle 142.

Meanwhile, de-excitation light is provided either by first de-excitation light source 144 or by second, third and fourth de-excitation sources 152a, 152b, 152c. Light from de-excitation light source 144 is delivered by optic fibre 146 as described above, entering the cores of fibre bundle 142 as higher order modes. De-excitation light from second, third and fourth de-excitation sources 152a, 152b, 152c is transmitted by respective multimode optic fibres 154a, 154b, 154c to mode conditioners 156a, 156b, 156c; light passing through the mode conditioners 156a, 156b, 156c passes through respective prism couplers 158a, 158b, 158c, which couple the light into the cladding of fibre bundle 142 as low order, medium order and high order cladding modes respectively.

The light and de-excitation light passes out through distal tip 176 of fibre bundle 142, passes through collimating lens 160 and is focussed by objective lens 162 to a focus in tissue sample 132. Light from the tissue returns through objective lens 162 and collimating lens 160, and the cores of the fibre bundle 142, and is focused by converging lens 164 to form a focus on CCD 166.

In some applications it may be desirable that the fibre bundle 142 be made from depressed cladding, W profile core fibres.

GSD/STED Imaging

The embodiments described above by reference to figures in 8, 9 and 10 can be used for conducting ground state depletion (GSD) microscopy/stimulated emission depletion (STED) microscopy, in which case each would additionally include an image processor (such as in the form of image processing software) for finding the centroid and the intensity sum for each core spot of all the EMCCD pixel elements that receive light from every individual spot. The image processor then maps every centroid as a reduced spot in the cumulative frame store for that image and then continues this to give proper high resolution sampling.

Figure 11:
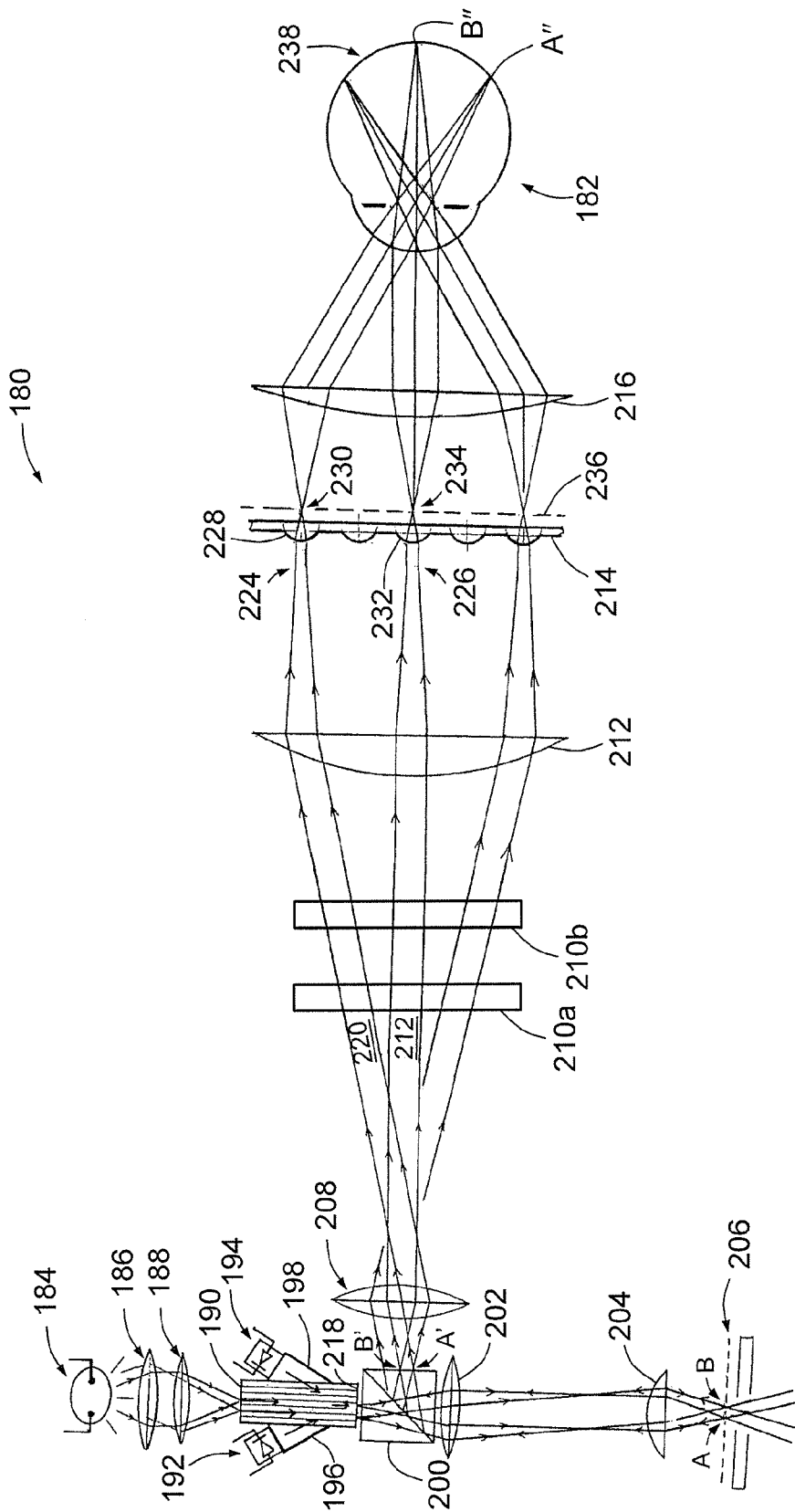
FIG. 11 is a schematic view of a microscope according to an embodiment of the present invention.

However, in an alternative embodiment, a micro-lens plate is used to avoid this complexity. FIG. 11 is a schematic view of a microscope 180 according to another embodiment of the present invention (shown with a user's eye 182), for ground state depletion GSD microscopy or stimulated emission depletion STED microscopy in which an entire image may be integrated in one single exposure on an EMCCD. This allows one to avoid readout downtime of the CCD, a drawback of multiple exposure systems. For bright objects it would be possible for it to be viewed directly by eye.

Referring to FIG. 11, microscope 180 includes a light source 184, a pair of lenses 186, 188 and an optic fibre bundle 190. Microscope 180 also includes de-activation light sources 192 and 194 and respective prisms 196 and 198 for coupling the de-excitation light from de-activation light sources 192 and 194 into the cladding of fibre bundle 190. Microscope 180 includes a beamsplitter in the form of a beamsplitter cube 200, a collimating lens 202 and an objective lens 204 for brings light to a focus at a plane 206 inside a specimen (not shown).

Microscope 180 also includes, for processing return light in the manner described below, a collimating lens 208, filters 210*a*, 210*b*, a focussing lens 212, a microlens array plate 214 and an ocular lens 216.

In use, excitation light from light source 184 is focused by lenses 186, 188 into the cores of fibre bundle 190. Light from the de-activation sources 192, 194 is coupled by prisms 196, 198 into the cladding of fibre bundle 190. Light from both de-activation sources 192, 194 is emitted from the distal end 218 of fibre bundle 190, passes through beamsplitter cube 200 and is collimated by collimating lens 202. The light then passes to objective lens 204, which brings it to a focus at plane 206 inside the specimen.

Light emitted from, for example, sub-resolution fluorescent objects A and B in the specimen in focal plane 206 returns through objective lens 204 and collimating lens 202, and is brought to a focus as separate diffraction limited spots at A' and B' at an exit face of beamsplitter cube 200. Light emitted by that face is collimated by collimating lens 208 forming respective beams 220 and 222, and passes through filters 210*a*, 201*b*. The beams 220 and 222 then pass through focussing lens 212, which focuses them to respective Gaussian waists/Airy discs 224 and 226. The now parallel light beams (each emitted from a sub-resolution area in the specimen) then encounter microlens array plate 214; the optical elements in the microlens array match the projected spot pattern in the image. Thus, microlens 228—for example—brings the light emitted from A to a focus at 230, while microlens 232 brings the light from B to a focus at 234. These focal points 230 and 234 are located in a plane 236. Ocular lens 216 then converges and collimates the light from plane 236 and brings the image to the retina 238 as focused spots A" and B" respectively.

Synchronised scanning between the optic fibre distal tip 218 and microlens array plate 214 creates a continuous and properly sampled super-resolution image.

Optically Obtained Super-Resolution Images, the Microlens Array Plate and Methods of Fabricating the Expanded Array Component As described above, it should be possible to obtain a purely optical super-resolution raw image directly without the necessity for electronic transduction and translation to a screen. The Abbé limit could be exceeded optically without empty magnification.

In all cases where purely optical super-resolution is desired it is necessary to employ an array of optical elements at or close to the focus of an enlarged image of the core spots. These elements must be arranged in a pattern that accurately matches the spacing of the cores.

A number of methods of creating a lens array would be apparent to those skilled in the art. Some of these involve photo-activation of an optically transparent material. The light exposure and the resulting lenses may be formed by photopolymerisation or by photo-dissolution.

1. PHOTOFABRICATION
    a. Forming an expanded image of the bundle waveguide pattern in a layer of monomer or polymer on a glass sheet.
        i. Photopolymerisation of convex micro-lenses by light projected from the cores of the bundle.
        ii. Photopolymerisation of concave micro-lenses by light projected from the cladding of the bundle.
        iii. Photo-dissolution to form convex micro-lenses by light projected from the cladding of the bundle.
        iv. Photo-dissolution to form concave micro-lenses by light projected from the cores of the bundle forming an expanded image on a glass sheet.
    b. Formation of the lens array directly on the polished expanded end of an adiabatically tapered bundle.
        i. Using photofabrication in a layer of the material on the expanded face. This may be done by any of the four techniques described above.
        ii. Chemically etching the glass of the expanded polished end of the waveguide bundle. This can be done with alkaline or fluoride solutions.
            1. Etching the cladding to give convex microlenses
            2. Etching the cores to give concave microlenses.
2. Allowing glass balls (ballotin) to position themselves into the array of concave structures formed from any of the above. (Glass balls of precise dimensions used as spacers in LCD screens would be suitable.)
3. Employing an adiabatically tapered bundle made from fibres which have a sub-core at the centre of each of the cores. This sub-core has no effect on the light in the thin section but it can act as a single mode core of an axially symmetric coupler in the expanded section. If made correctly
4. Using a pick and place robot to position and glue the microlenses on the expanded plate. This would be done by the active control using the optical signal from the core as measured from the output of a quadrant photodiode. The robot would take each lens to its approximate position on the glass plate. The robot would move the lens, under active feedback control, until the outputs of the quadrant photodiodes were equal. Then a photopolymerisation pulse would affix each lens in position. Hemispherical planoconvex lenses would be easiest to manipulate.

Figure 12:
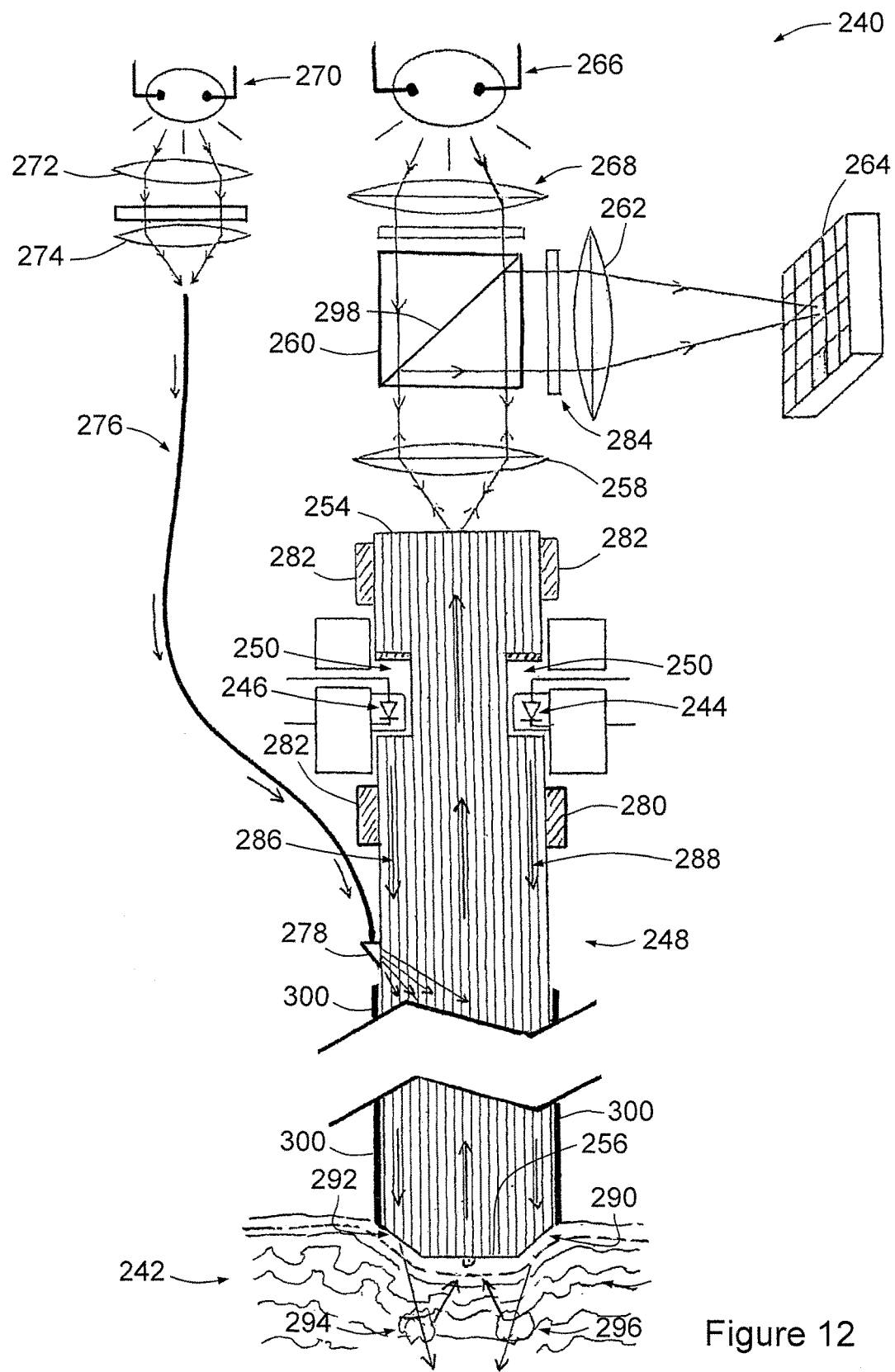
FIG. 12 is a schematic view of a microscope according to an embodiment of the present invention.

FIG. 12 is a schematic view of a microscope 240 according to another embodiment of the present invention, with a specimen in the form of a tissue sample 242. Microscope 240 is designed for use as a tissue contact endomicroscope through a flexible endoscope biopsy channel. It combines structured illumination fluorescence imaging with Oblique Illumination Phase Contrast Endoscopy.

Microscope 240 includes two light emitting diodes 244 and 246 and a Sumitomo (trade mark) or Furakawa (trade mark) fused optic fibre bundle 248 that has shallow grooves 250 and 252 in its sides close to its proximal end 254. Fibre bundle 248 has a polished frusto-conical distal tip 256 (though other distal tip shapes are envisaged, and it may be advantageous in some applications to have, for example, a polished convex distal tip).

Microscope 240 also includes, for collecting return light ultimately emitted by proximal tip 254 of fibre bundle 248, a collimating lens 258, a beamsplitter in the form of a beamsplitter cube 260, a focussing lens 262 and a CCD array 264.

Microscope 240 further includes a large area excitation wavelength light source 266, and a collimating lens 268 for collimating light from light source 266. Microscope 240 also includes an alternately illuminated light source 270, a pair of focussing lenses 272 and 274 for collecting and focussing light from alternately illuminated light source 270, a multimode optic fibre 276 arranged to receive light from focussing lenses 272 and 274, and a coupler prism 278 that is optically glued to fibre bundle 248 and couples light into the cladding modes of bundle 248.

Microscope 240 further includes cladding mode strippers 280 and 282 located towards the proximal end 254 of fibre bundle 248 and a long pass filter 284 to prevent stray light from source 266 from reaching CCD 264.

In use, light emitting diodes 244 and 246 couple light into the adjacent cores on the distal side of the grooves 250, and this light travels as rays 14 and 16 to the distal end of the bundle 18. The light enters the tissue sample 242 as rays 286 and 288; as these rays leave fibre bundle 248, they are bent towards the central axis of the bundle 248 by refraction at the angle polished sections 290 and 292 of the distal tip 256.

The light emitting diodes 244 and 246 are pulsed in alternation. Light from backscatter within the tissue sample 242 form "virtual oblique light sources" (at regions 294 and 296, at depths approximating the mean free path distance within the tissue sample 242) re-enters the bundle in the central area of the distal tip 256 and travels to the proximal end 254 of the bundle 248. The light is then emitted from the cores at the proximal tip 254 and collimated by collimating lens 258, then reflected from the internal, oblique reflecting surface 298 of beamsplitter cube 260 and focused by focussing lens 262 into CCD array 264. Images are derived by subtraction of one frame from the other. Phase objects close to the distal bundle face are enhanced while scatter by deeper objects is nulled out.

A similar two exposure differential image method is used for isolating the fluorescence from objects close to the distal tip 256 and rejecting fluorescence from more distant sources. Light from briefly illuminated large area excitation wavelength light source 266 is collimated by collimating lens 268, passes through beamsplitter cube 260 and is coupled into the cores of the proximal tip 254 of the bundle 248 via lens 258. The light emerges from the distal tip 256 and generates fluorescence in fluorophore labeled structures within the tissue sample 248. Some of this fluorescence returns through the cores of bundle 248, is reflected by the beamsplitter cube 260 and is focussed onto the CCD array 264 to form an image.

A second fluorescence image is generated by alternately illuminated source 270. The light from this source 270 is focussed by lenses 272 and 274, and is carried by multimode optic fibre 276 to coupler prism 278, which couples the light into the cladding modes of the bundle 248. This light is reflected from the opposite sides of the bundle 248 at the interface between the glass and a fluoropolymer layer 300. This cladding mode light also leaves the distal tip 256 of the fibre bundle 248 and causes fluorescence. Very little of the light energy from this second pulse is detectable in the region directly in front of each of the cores; hence the differential image will strongly enhance the visibility of those features.

Thus, dual phase and fluorescence images from the contact surface of a bare bundle tip may be produced. All required hardware components can be located within 15 cm of the proximal tip 254. The main length of the fibre bundle 248 is available to pass along the biopsy channel to the flexible endoscope tip.

The following two embodiments provide microscope that each have a fibre bundle with a distal tip that is polished at an acute angle to the axis of the bundle. Light passing down the cores of the fibre bundle is totally internally reflected when it reaches the angled tip interface. The polished face may resemble a hypodermic needle or it may be formed into a conical tip.

By the principle of optical reciprocity, the light from the bulk of the tissue sample is unable to enter the cores at an angle that would allow them to be guided within them back to the proximal tip. Objects within the tissue that are within a very short distance of the core end surface, typically less than a wavelength, are able to evanescently couple scattered light or fluorescence into the cores. This light is guided to the proximal tip and acts to form the image. The cladding modes act as the source of the light in this embodiment. They can exceed the angle of TIR in their initial propagation mode or they can increase the angle as they undergo multiple reflections.

Figure 13:
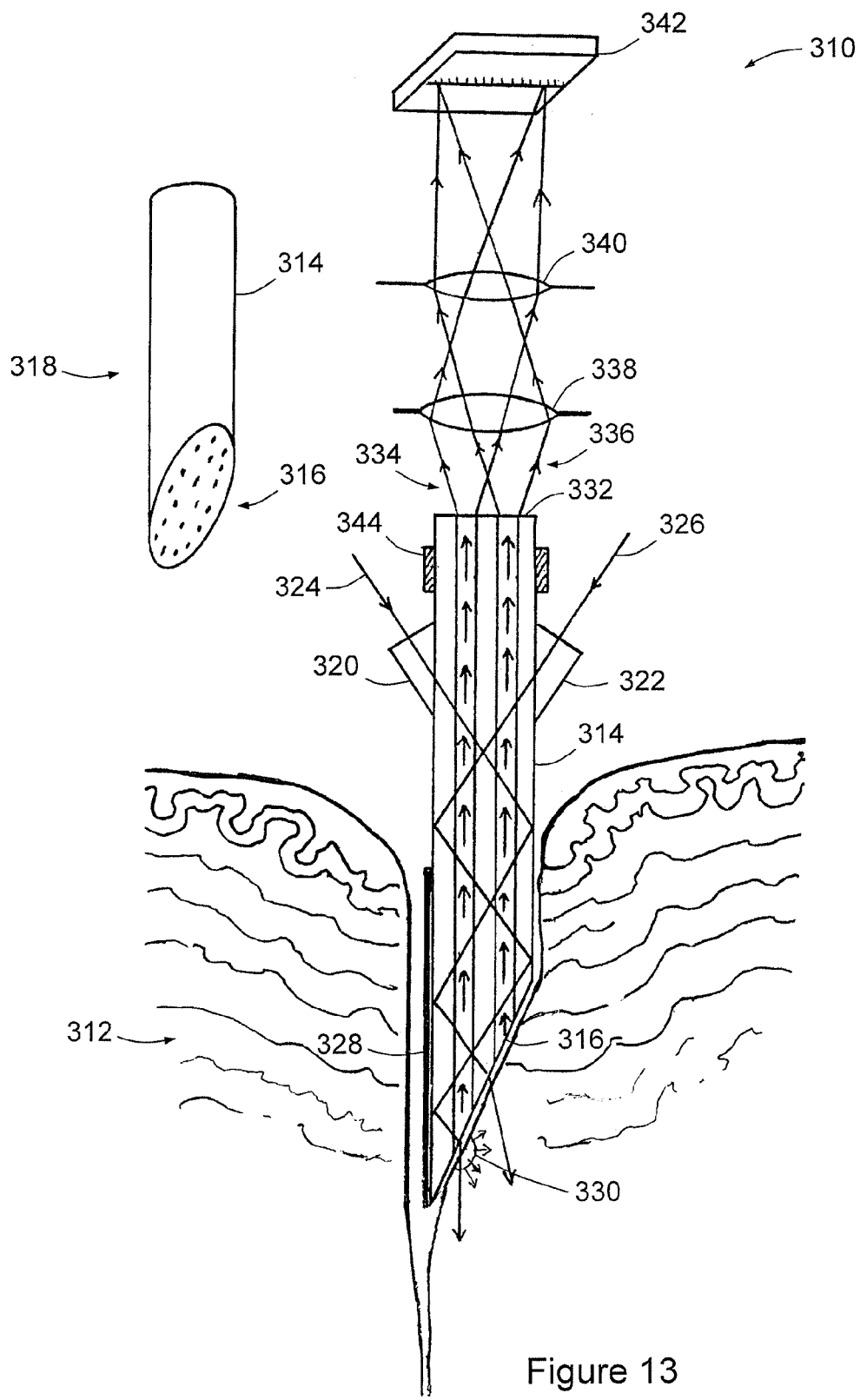
FIG. 13 is a schematic view of a microscope according to an embodiment of the present invention.

Thus, FIG. 13 is a schematic view of a microscope 310 according to another embodiment of the present invention, shown with a specimen in the form of a tissue sample 312. Microscope 310 includes a fibre bundle 314 with a polished distal tip 316 in the shape of a hypodermic needle (shown in isometric view as detail 318). Microscope 310 includes a pair of prism couplers 320 and 322 attached to bundle 314. Light rays 324 and 326 from respective light sources (not shown) enter bundle 314 via prism couplers 320 and 322, and propagate along the bundle 314 as rays that are reflected at the glass air interface of the bundle 314. At the distal tip 316 of bundle 314, these beams escape into the tissue sample 312 through the flat, angle polished tip surface of the distal tip 316. The distal portion of bundle 314 (apart from the angle polished tip surface of the distal tip 316) has a coating comprising a thin layer of silver 328, which increases the light output. Scatter or fluorescence from objects (such as at 330) return into the cores of bundle 314 and pass to the proximal tip 332 of fibre bundle 314, emerging as ray bundles 334 and 336. Microscope 310 includes lenses 338 and 340, and a CCD 342; ray bundles 334 and 336 are collected and focussed by lenses 338 and 340 to CCD 342, on which an image is formed. Microscope 310 also includes a cladding mode stripper 344, located near proximal tip 332 of bundle 314.

Figure 14:
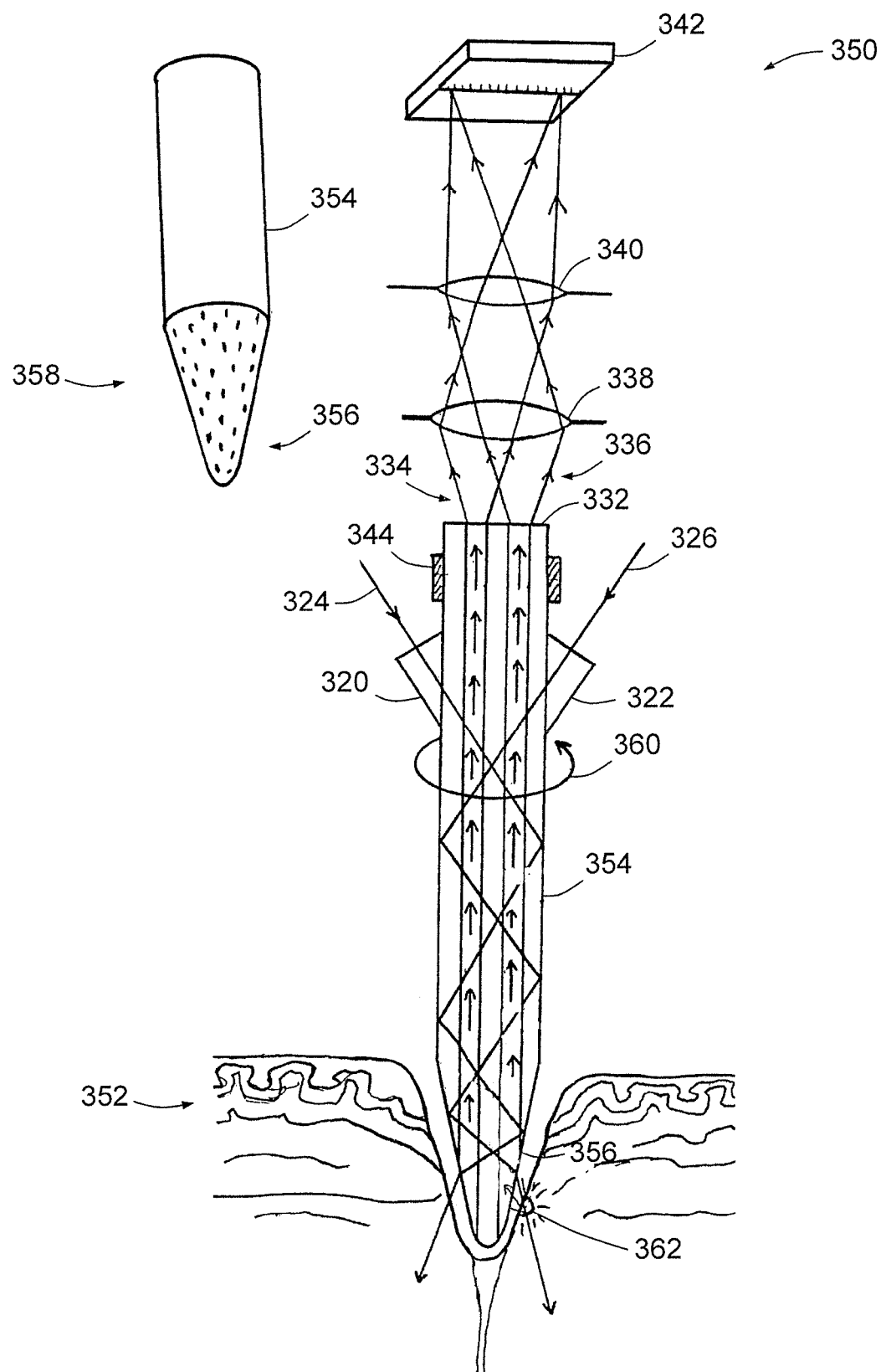
FIG. 14 is a schematic view of a microscope according to an embodiment of the present invention.

FIG. 14 is a schematic view of a microscope 350 according to another embodiment, shown with a specimen in the form of a tissue sample 352; microscope is comparable to microscope 310 of FIG. 13, and like numerals have been used to identify like elements. However, instead of a fibre bundle with a hypodermic needle-like distal tip, microscope 350 has a fibre bundle 354 with a tip 356 polished in the form of a cone (shown in isometric view as detail 358). As with microscope 350, light rays 324 and 326 from respective light sources (not shown) enter bundle 354 via prism couplers 320 and 322, and propagate along the bundle 354 as rays that are reflected at the glass air interface of the bundle 354. At the distal tip 356 of bundle 354, these beams escape into the tissue sample 352 through the surface of the conical polished distal tip surface 356. The bundle 354 is rotated during each exposure by any suitable mechanism, as shown by arrow 360. This improves the resolution of the image. Scatter or fluorescence from objects such as that at 362 return into the cores of bundle 314 and pass to the proximal tip 332 of fibre bundle 314, emerging as ray bundles 334 and 336 which are collected and focussed by lenses 338 and 340 to CCD 342, on which an image is formed The conical tip 356 might be a desirable form to provide images of the os of the cervix. In solid tissue it might be desirable to pass a trochar through the tissue and to introduce a contrast medium and a reference object such as a thin fluorescent thread prior to the observation being made.

Cladding Mode Applications; Photolithography; Photopolymerised Nanofabrication

Figure 15:
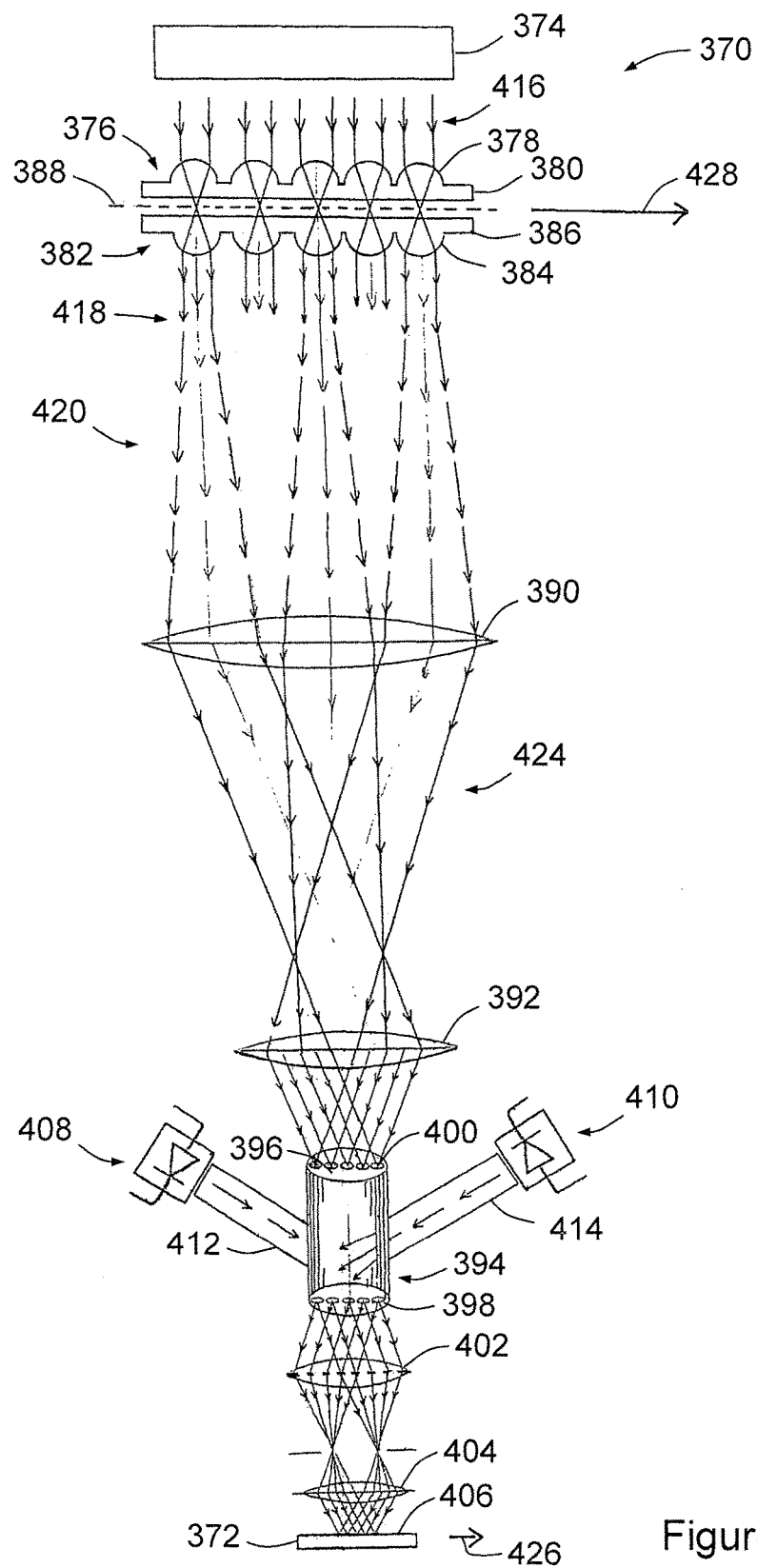
FIG. 15 is a schematic view of a photolithography apparatus according to an embodiment of the present invention.

FIG. 15 is a schematic view of a photolithography apparatus 370 according to another embodiment of the present invention, shown with a silicon wafer 372. Microscope 370 is adapted for high density photolithography applications, such as for the exposure of resist material on silicon wafers (for example) in the fabrication of semiconductor chip devices.

Photolithography apparatus 370 includes a TEMoo laser 374 with an output wavelength that can activate the photoresist material on silicon wafer 372, a first microlens array 376 (comprising microlenses or lenslets 378 on a transparent plate 380), a second microlens array 382 (also comprising microlenses or lenslets 384 on a transparent plate 386) and, between the first and second microlens arrays 376, 383, a mask 388 that consists of a pattern defining the features desired to be transferred to the wafer 372. Each microlens 378 of first microlens array 376 brings a portion of the incident light to a diffraction limited point focus, the array of such foci being in the plane as that of mask 388. The mask 388 of this embodiment comprises a thin layer of chromium metal on a silica glass sheet substrate. Light incident on first microlens array 376 but not subsequently blocked by mask 388 passes to second microlens array 382, whose microlenses 384 match the microlenses 378 of first microlens array 376. The two microlens arrays 376, 382 are separated by a distance such that the foci of the microlenses 378 of first microlens array 376 are co-incident with the foci of the microlenses 384 of second microlens array 382.

Photolithography apparatus 370 also includes, optically downstream of microlens arrays 376, 382, a first lens 390, a second lens 392 and a fused fibre optic bundle 394 (with polished proximal tip 396 and distal tip 398, and comprising single moded cores 400). Downstream of fibre bundle 394, photolithography apparatus 370 includes a pair of lenses 402, 404 for focussing light to diffraction limited spots on the photoresist layer 406 of the silicon wafer 372.

Photolithography apparatus 370 also includes light sources 408, 410 for providing light with a wavelength that can de-activate the latent image in the photoresist (STED mechanism) or prevent the formation of the activated species in the photoresist (GSD mechanism), and respective coupling optics 412, 414 for coupling light from light sources 408, 410 into fibre bundle 394 so that the light passes as cladding modes along the bundle 394 to its distal tip 398.

In use, a collimated beam of light 416 of a wavelength that can activate the photoresist material is emitted from TEMoo laser 374 and encounters first microlens array 376. As explained above, each microlens 378 brings a portion of the incident light to a diffraction limited point focus in the plane of mask 388. The light that is not blocked by mask 388 passes to the set of matching microlenses 384 of second microlens array 382.

Consequently the light from microlenses 384 of second microlens array 382 emerges as narrow collimated beams 418 but, as these beams are narrow, they rapidly spread out as diverging cones of light 420. These cones of light 420 encounter first lens 390, which collimates the light from each cone to form collimated ray bundles 424. These collimated ray bundles 424 encounter second lens 392, which brings each beam to a focus at the polished proximal end of a respective, separate single moded core 400 at the proximal tip 396 of fibre bundle 394.

The light enters the cores 400 and passes along them to emerge from the distal tip 398. It then passes through the pair of lenses 402, 404 to form diffraction limited spots on the photoresist layer 406 of the semiconductor wafer 372.

Light from light sources 408, 410 is coupled into the cladding of the bundle 394 by coupling optics 412, 414. This light passes as cladding modes along the bundle 394 to the distal tip 398, and emerges from the distal tip 398 from between the cores 400 and hence is focused by the pair of lens 402, 404 as a reticulated pattern that surrounds the focused spots formed by the light from the cores 400.

Super-resolution photolithography is effected by moving the wafer in the direction shown by arrow 426. At the same time the mask 388 is moved in the direction shown by arrow 428 at a speed that allows the image of the mask 388 to maintain its position on the surface of wafer 372.

In this photolithography embodiment, the activating spot of light is surrounded by a ring of light of the reticulated cladding pattern or the doughnut mode. This shrinks/erodes the dimensions of the feature in both the X and the Y dimensions. Much of the 'real estate' on a silicon wafer chip, however, is taken up by linear tracks. Also, many of the devices fabricated in the silicon surface are made up of structures that are thin only in one direction (see, for example, an Ivy Bridge 22 nm tri-Gate Transistor.) Exposing the photoresist that forms the tracks or other thin structures using a halo of light for de-activation is thus inefficient, as the de-activated state for GSD processes in the photoresist has a finite decay time (and STED may require a light intensity that is too high to write many spots), so if a line is the desired feature it would be more efficient to write it as sections of a line in a few exposures rather than to fabricate it by exposures as a large number of spots.

FIG. 16A is a schematic view of a photolithography apparatus 430 according to another embodiment of the present invention, as might be applied to high density photolithography, shown with a silicon wafer 432. This embodiment uses an array of planar waveguide structures to produce a de-activating light source. Several features of photolithography apparatus 430 are identical with corresponding features of photolithography apparatus 370 of FIG. 15, and like reference numerals have been used to identify like features.

Thus, photolithography apparatus 430 includes a TEMoo laser 374 with an output wavelength that can activate the photoresist material on silicon wafer 432, a first microlens array 376, a second microlens array 382 and, between the first and second microlens arrays 376, 383, a mask 388 that consists of a pattern defining the features desired to be transferred to the wafer 432. Each microlens of first microlens array 376 brings a portion of the incident light to a diffraction limited point focus, the array of such foci being in the plane as that of mask 388, while light incident on first microlens array 376 but not subsequently blocked by mask 388 passes to second microlens array 382, whose microlenses match the microlenses of first microlens array 376, the two microlens arrays 376, 382 being separated by a distance such that the foci of the microlenses of first microlens array 376 are co-incident with the foci of the microlenses of second microlens array 382.

Photolithography apparatus 430 also includes, optically downstream of microlens arrays 376, 382, a first lens 390 and a second lens 392. However, downstream from first and second lenses 390, 392, photolithography apparatus 430 includes a beamsplitter in the form of a beamsplitter cube 434 and a pair of lenses 436, 438.

Photolithography apparatus 430 also includes a structure 440 (shown in greater detail in isometric view in FIG. 16B) for directing de-activating light into beamsplitter cube 434, comprising a plurality of parallel planar waveguide layers 442.

Photolithography apparatus 430 further includes light sources 446 optically coupled to structure 440 such that light coupled into structure 440 from light sources 446 is emitted by structure 440 into a side face 448 of beamsplitter cube 434.

In use, a collimated beam of light 416 of a wavelength that can activate the photoresist material is emitted from TEMoo laser 374 and encounters first microlens array 376. As explained above, each microlens brings a portion of the incident light to a diffraction limited point focus in the plane of mask 388. The light that is not blocked by mask 388 passes to the set of matching the microlenses of second microlens array 382. The light from the microlenses of second microlens array 382 emerges as narrow collimated beams 418 but, as these beams are narrow, they rapidly spread out as diverging cones of light 420. These cones of light 420 encounter first lens 390, which collimates the light from each cone to form collimated ray bundles 424. These collimated ray bundles 424 encounter second lens 392, which brings each beam to a focus at a proximal face 450 of beamsplitter cube 434; the beams then pass through beamsplitter cube 434 followed by the pair of lenses 436, 438, which form the beams into diffraction limited spots A, B, and C in the photoresist layer 452 on the wafer 432.

Light from de-activating sources 446 enters structure 440 as described above, and exits structure 440 through side face 448 into beamsplitter cube 434, is (partially) reflected by the dichroic surface of beamsplitter cube 434 towards, and is focussed by, the pair of lenses 436, 438. D and E indicate two exemplary planar waveguide layers 442; D' and E' indicate the positions of the light from layers D and E once focussed onto wafer 432.

To effect The mask and the wafer are moved synchronously as shown by arrows 392 and 48.

Photolithography is effected by moving the wafer 432 in the direction shown by arrow 426. At the same time the mask 388 is moved synchronously in the direction shown by arrow 428, such that the image of the mask 388 maintains its position on the surface of wafer 432.

FIG. 17A is a schematic view of a photolithography apparatus 460 according to still another embodiment of the present invention, as might be applied to high density photolithography, shown with a silicon wafer 462. Several features of photolithography apparatus 460 are identical with corresponding features of photolithography apparatus 370 of FIG. 15, and like reference numerals have been used to identify like features.

Thus, photolithography apparatus 460 includes a TEMoo laser 374 with an output wavelength that can activate the photoresist material on silicon wafer 462, a first microlens array 376, a second microlens array 382 and, between the first and second microlens arrays 376, 383, a mask 388 that consists of a pattern defining the features desired to be transferred to the wafer 432. Each microlens of first microlens array 376 brings a portion of the incident light to a diffraction limited point focus, the array of such foci being in the plane as that of mask 388, while light incident on first microlens array 376 but not subsequently blocked by mask 388 passes to second microlens array 382, whose microlenses match the microlenses of first microlens array 376, the two microlens arrays 376, 382 being separated by a distance such that the foci of the microlenses of first microlens array 376 are co-incident with the foci of the microlenses of second microlens array 382.

Photolithography apparatus 460 also includes, optically downstream of microlens arrays 376, 382, a first lens 390 and a second lens 392. However, downstream from first and second lenses 390, 392, photolithography apparatus 460 includes a fused fibre optic bundle 464 with a polished proximal tip 466 and a distal tip 468, followed optically by a pair of lenses 470 and 472 which bring the light to a focus at the surface of the wafer 462.

Photolithography apparatus 460 also includes a second light source 474 and a focussing lens 476 for focussing light from second light source 474 to a focus 478 at the back focal plane of lens 476; the rays of light then impinge second lens 392 and fall on the polished proximal tip 466 of the bundle 464, to ultimately be brought to a focus at the surface of the wafer 462.

In use, a collimated beam of light 416 of a wavelength that can activate the photoresist material is emitted from TEMoo laser 374 and encounters first microlens array 376. As explained above, each microlens brings a portion of the incident light to a diffraction limited point focus in the plane of mask 388. The light that is not blocked by mask 388 passes to the set of matching the microlenses of second microlens array 382. The light from the microlenses of second microlens array 382 emerges as narrow collimated beams 418 that rapidly spread out as diverging cones of light 420. These cones of light 420 encounter first lens 390, which collimates the light from each cone to form collimated ray bundles 424. These collimated ray bundles 424 encounter second lens 392, which brings each beam to a focus at the polished end of a separate fibre core at the proximal tip 466 of fibre bundle 464. The activating light (from TEMoo laser 374) enters the cores as predominantly the fundamental mode of each core. This mode is shown in FIG. 17B.

The beam of light 480 from second light source 474 is brought to a focus 478, as described above, at the back focal plane of lens 476. The rays are collimated by this lens 476 and fall on the polished proximal tip 466 of the bundle 464. The rays are outside the cone of acceptance of the fundamental mode of the cores; they can, however, be coupled into the cores and guided as the 1,0 mode (see FIG. 17C). (The cores of the bundle have a slight degree of asymmetry, so they maintain the orientation of this mode in the cores through the length of the fibre.)

At the distal tip 468 of fibre bundle 464, the light from both sources 374, 474 emerges from each of the cores of bundle 464, each wavelength maintaining its modal pattern as it passes through lenses 470 and 472. The focused spots in the material of the photoresist 482, on the surface of the wafer 462, maintains these two separate modal patterns. Hence the de-activated "sharpening" is in one dimension only. (In this case the lines that are formed orthogonal to the plane of the figure are the ones that are sharpened.)

The mask 388 and the wafer 462 are moved synchronously, as described above.

Optionally, laser light from a further source (not shown, out of the plane of the figure and orthogonal to second light source 474) may be coupled into the cores as the 0,1 mode (see FIG. 17D), with the orientation of the modes maintained as the light passes through the cores. This would sharpen lines in the photoresist that are parallel to the plane of the figure (or in it). In another variation, both of the de-activating laser light sources (i.e. second light source 474 and the further source) are simultaneously coupled into the cores, producing effectively a halo (see FIG. 17E).

Figures 18A, 18B, 18C:
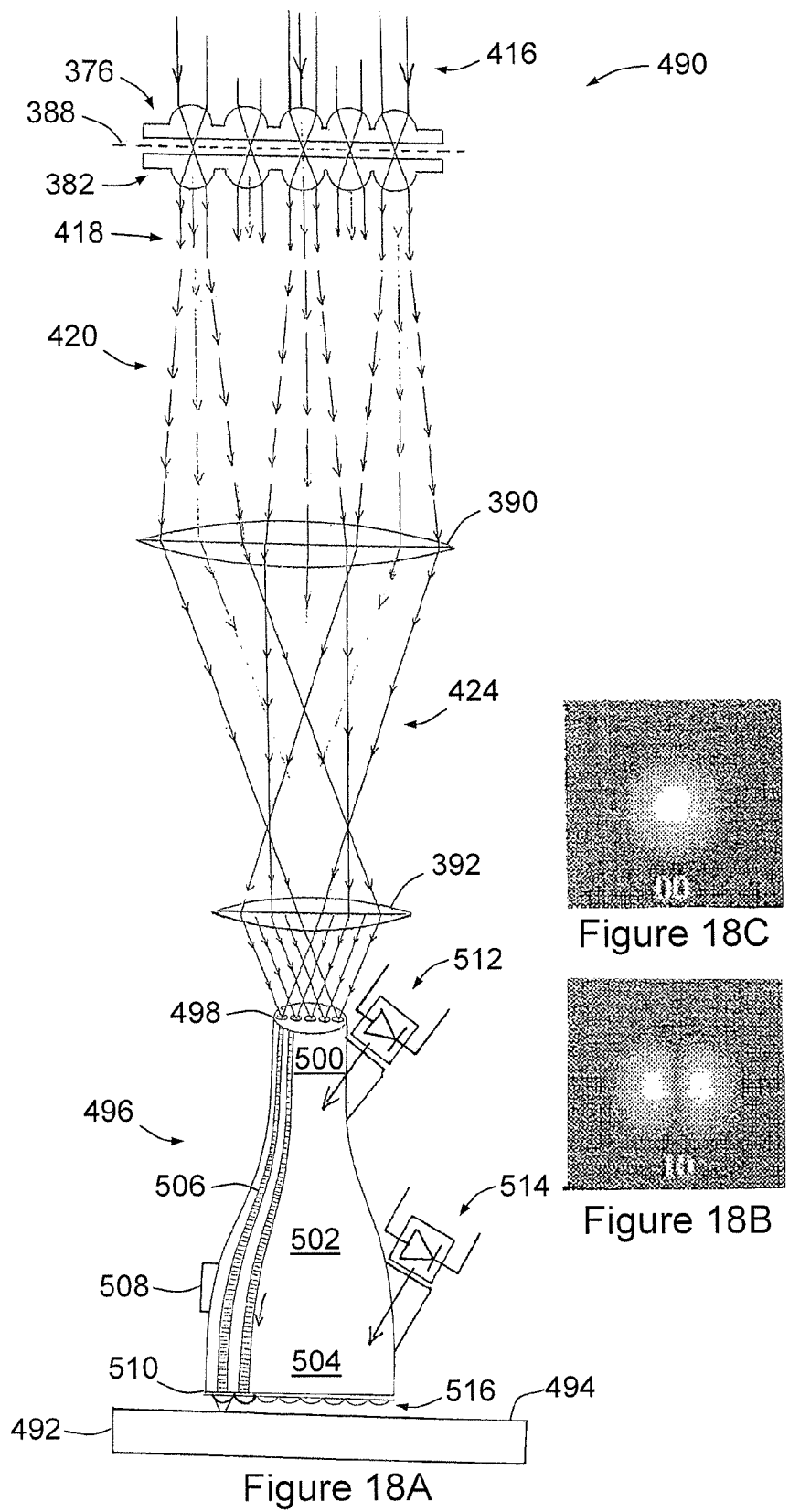
FIG. 18A is a schematic view of a photolithography apparatus according to an embodiment of the present invention.
FIG. 18B is a schematic representation of a mode that is not supported by the elliptical cores of the fibre bundle of the photolithography apparatus of FIG. 18A.
FIG. 18C is a schematic representation of the fundamental mode of the fibre bundle of the photolithography apparatus of FIG. 18A.

FIG. 18A is a schematic view of a photolithography apparatus 490 according to still another embodiment of the present invention, as might be applied to high density photolithography, shown with a silicon wafer 492. Several features of photolithography apparatus 490 are identical with corresponding features of photolithography apparatus 370 of FIG. 15, and like reference numerals have been used to identify like features.

Hence, photolithography apparatus 490 includes a TEMoo laser (not shown) with an output wavelength that can activate the photoresist material 494 on silicon wafer 492, a first microlens array 376, a second microlens array 382 and, between the first and second microlens arrays 376, 383, a mask 388 that consists of a pattern defining the features desired to be transferred to the wafer 432. Each microlens of first microlens array 376 brings a portion of the incident light to a diffraction limited point focus, the array of such foci being in the plane as that of mask 388, while light incident on first microlens array 376 but not subsequently blocked by mask 388 passes to second microlens array 382, whose microlenses match the microlenses of first microlens array 376, the two microlens arrays 376, 382 being separated by a distance such that the foci of the microlenses of first microlens array 376 are co-incident with the foci of the microlenses of second microlens array 382.

Photolithography apparatus 490 also includes, optically downstream of microlens arrays 376, 382, a first lens 390 and a second lens 392. However, downstream from first and second lenses 390, 392, photolithography apparatus 430 includes a tapered fused fibre optic bundle 496 with a polished proximal tip 498. Bundle 496 is single moded in proximal region 500 for the activating light, has an adiabatically tapered region 502 and an expanded (distal) region 504. The cores 506 are elliptical and can only support the 0,1 mode, not the 1,0 mode (see FIG. 18B).

Photolithography apparatus 490 also includes a cladding mode stripper 508 affixed to bundle 496 towards distal tip 510 thereof, a first de-activating light source 512 (light from which is admitted into proximal region 500 and can couple into the 01 mode in the tapered region 502), and a second de-activating light source 514 (light from which is admitted into expanded region 504 and can overlap the fundamental mode (see FIG. 18C) in the 01 direction in the expanded region 504, although not as one of the core modes).

The distal tip 510 of bundle 496 is provided with a microlens array 516 for focussing the activating light as a multitude of diffraction limited spots in the photoresist material 494. Each microlens of the microlens array 516 is aligned with a respective core 510 of bundle 496.

In use, a collimated beam of light 416 of a wavelength that can activate the photoresist material 494 is emitted from the TEMoo laser and encounters first microlens array 376. As explained above, each microlens brings a portion of the incident light to a diffraction limited point focus in the plane of mask 388. The light that is not blocked by mask 388 passes to the set of matching the microlenses of second microlens array 382. The light from the microlenses of second microlens array 382 emerges as narrow collimated beams 418 that rapidly spread out as diverging cones of light 420. These cones of light 420 encounter first lens 390, which collimates the light from each cone to form collimated ray bundles 424. These collimated ray bundles 424 encounter second lens 392, which brings each beam to a focus at the polished end of a separate fibre core at the proximal tip 498 of fibre bundle 496. As mentioned above, the bundle 496 is single moded in proximal region 500 for the activating light, and cores 506 can support the 0,1 mode 40 but not the 1,0 mode.

Meanwhile, light from first de-activating light source 512 is coupled into the 01 mode in the tapered region 502 and excess light is removed by cladding mode stripper 508, while de-activating light from second de-activating light source 514 is coupled into expanded region 504 and overlap the fundamental mode in the 01 direction in the expanded region 504.

The activating light continues as the fundamental mode to the distal tip 510 of the bundle 496 and is focused as a multitude of diffraction limited spots in the photoresist material 494 by microlens array 516. The de-activating light surrounds these diffraction limited spots. As in embodiments described above, the mask 388 and the wafer 492 are moved synchronously.

The system could also be operated with the distal optics of the embodiment of FIG. 17A.

Figure 19:
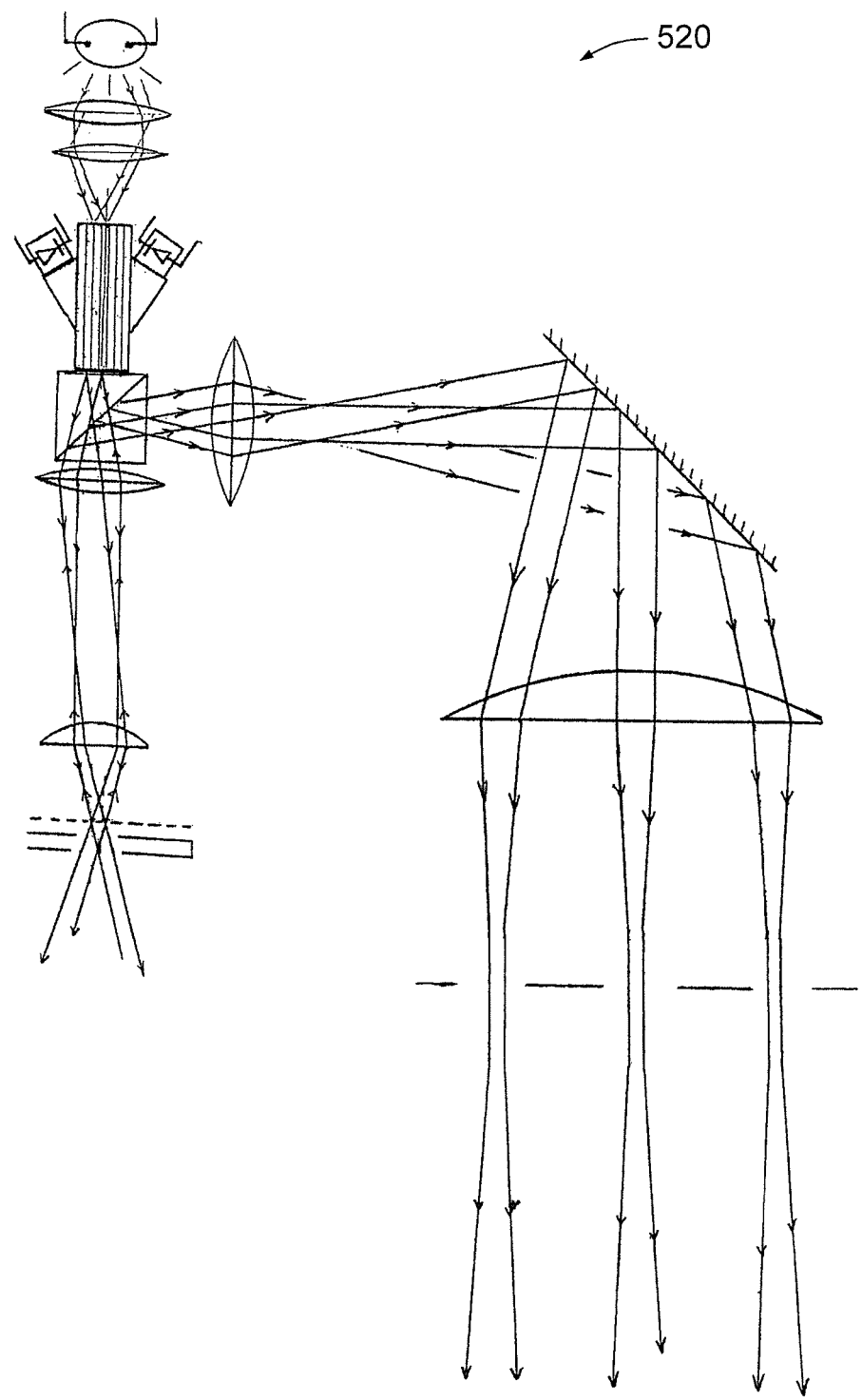
FIG. 19 is a schematic view of a microscope according to an embodiment of the present invention.
Figure 20:
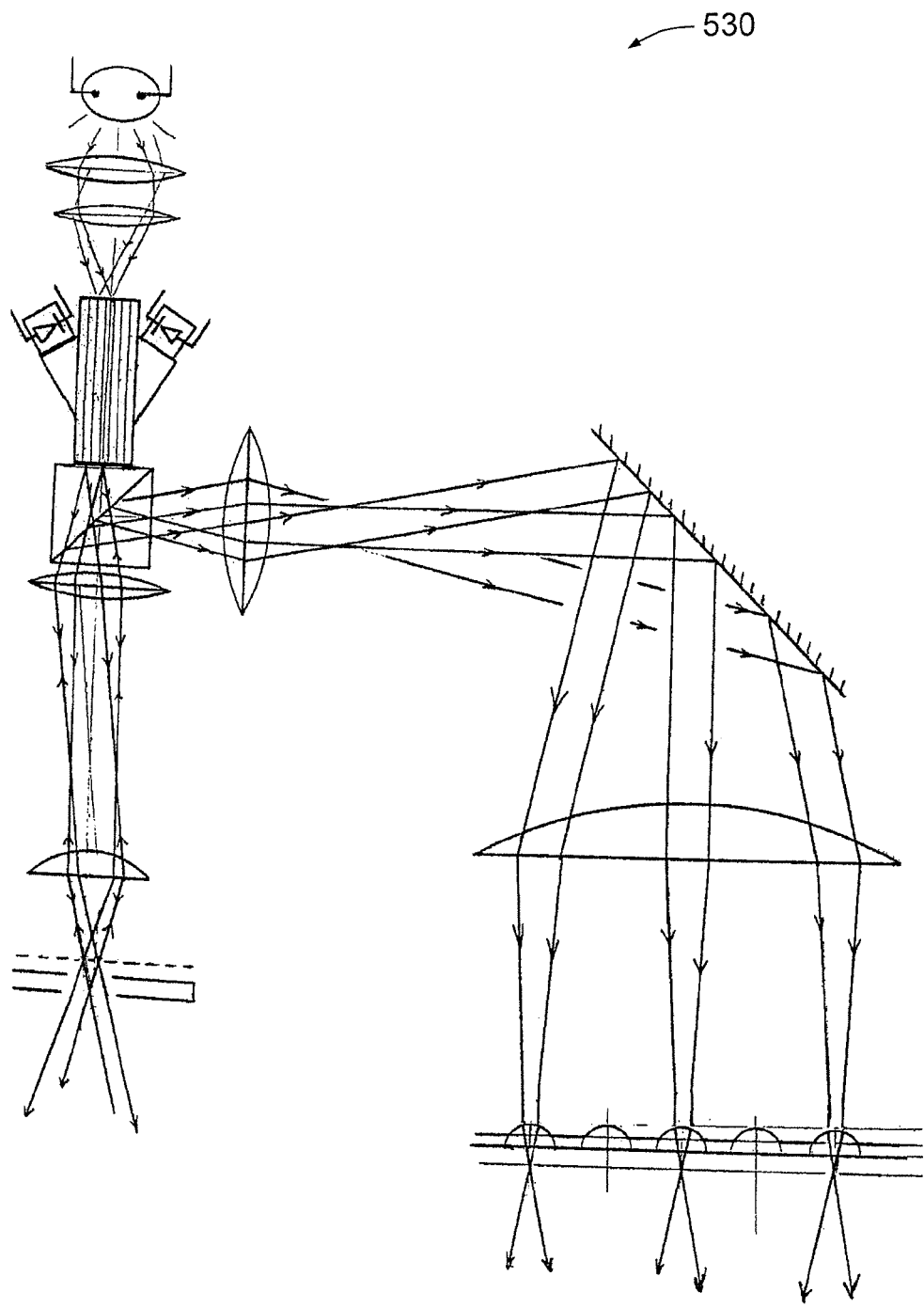
FIG. 20 is a schematic view of a microscope according to an embodiment of the present invention.

Microscopes according to still further embodiments of the present invention are depicted schematically in FIGS. 19 and 20, generally at 520 and 530 respectively, and may broadly be compared in operation with microscope 180 of FIG. 11.

Figure 21:
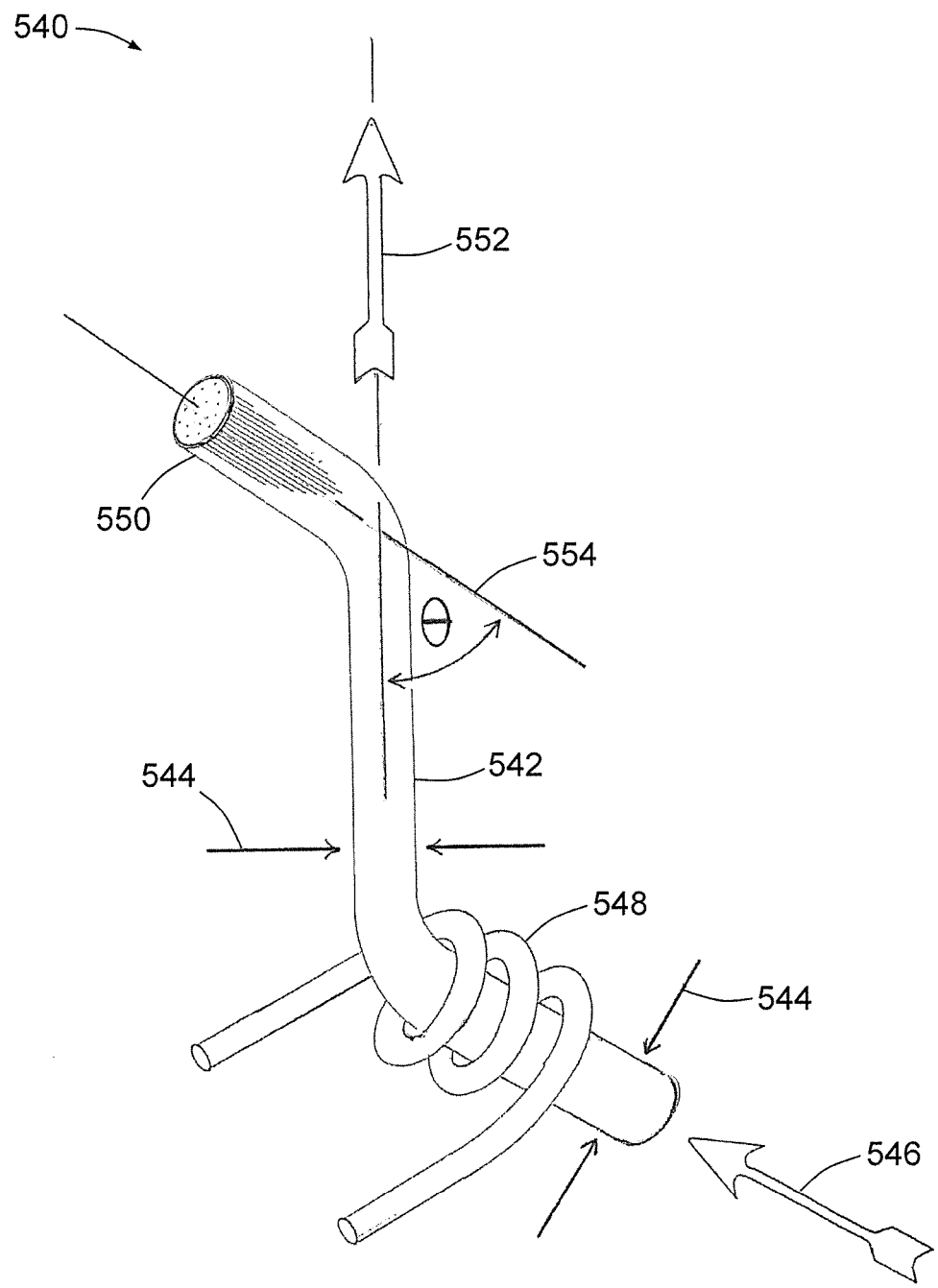
FIG. 21 is a schematic illustration of a technique for manufacturing elliptical core bundles according to an embodiment of the present invention, so that the polarisation vector of the wave within fibre cores in embodiments of the present invention may be controlled advantageously.

One way of producing polarisation maintaining bundles is to give the cores a small degree of ellipticity. Elliptical core bundles can be manufactured as shown generally at 540 in FIG. 21. Referring to FIG. 21, a glass fibre bundle preform or preferably a partly drawn bundle 542 is held in a clamp 544 and slowly fed (as indicated by arrow 546) into an electrically heated coil 548 of wire. The heat from the coil 548 softens the glass and the free end 550 of the bundle 542 is pulled away from the heated coil 548 as shown by arrow 552. The speed of the pulling is greater than the input feed rate. The pulling force direction is at an angle θ to the axis 554 of the bundle 542 at free end 550. This angle θ can be small and, in this figure, the angle is the same at the top and bottom of the figure.

Use of Light Emitted from Cladding and Cores of Fused Coherent Bundle in Stochastic Localization Microscopy (STORM, PALM, FPALM, etc)

Figure 22:
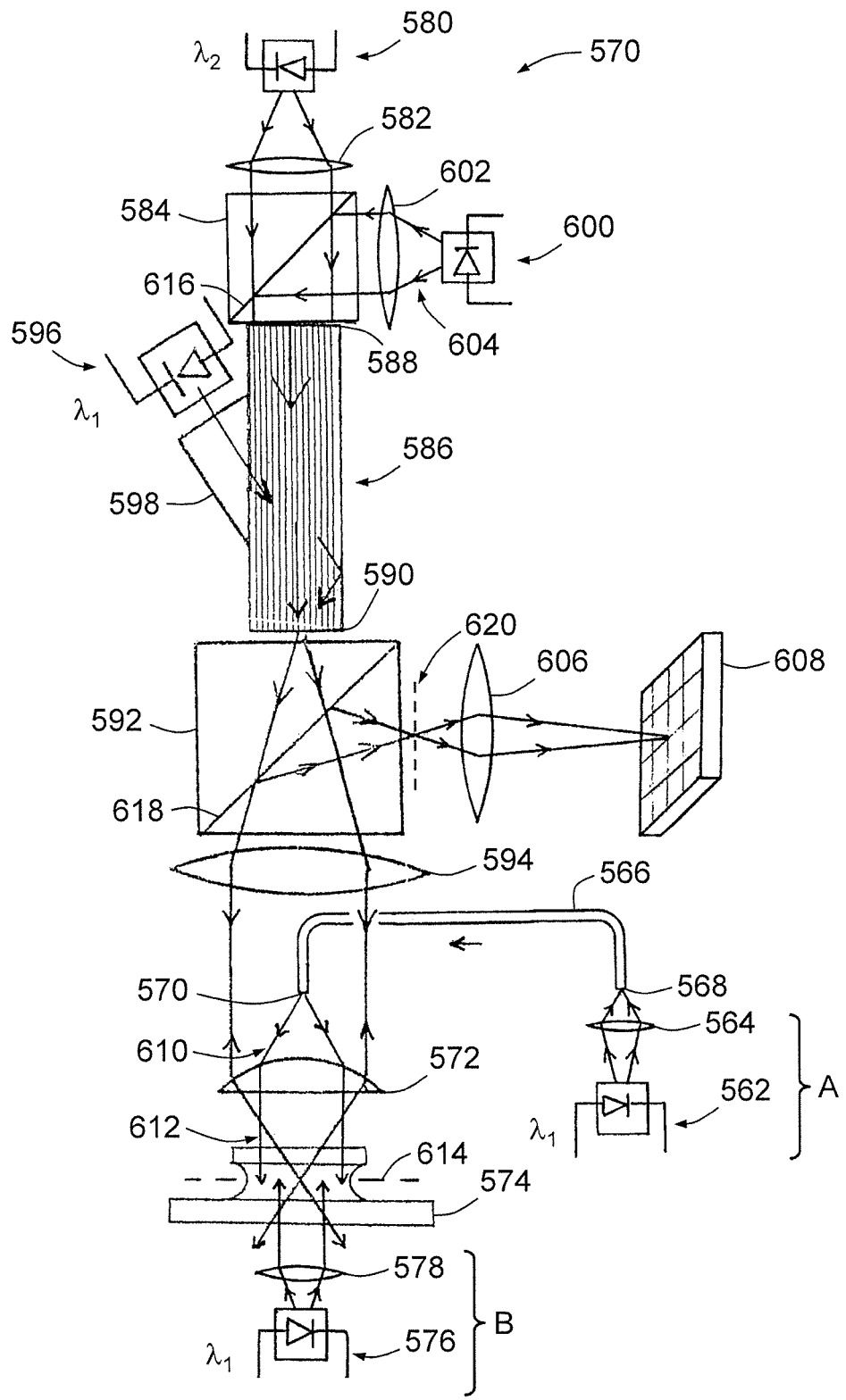
FIG. 22 is a schematic view of a microscope according to an embodiment of the present invention.

The embodiment in FIG. 22 is configured to employ the cladding mode light from a fibre bundle to improve the performance of localization microscopy, stochastic optical reconstruction microscopy (STORM), photoactivated localization microscopy (PALM), fluorescence photoactivation localization microscopy (FPALM), etc.

Thus, FIG. 22 is a schematic view of a microscope 560 according to an embodiment of the present invention. Microscope 560 includes a first de-activation system A comprising a light source 562 of suitable wavelength and a converging lens 564. Microscope 560 also includes an optic fibre 566 with a proximal tip 568 and a distal tip 570, an objective lens 572 and a moveable specimen stage 574. Light from light source 562 is thereby directed towards a specimen from the front of the specimen stage 574.

Microscope 560 further includes a second de-activation system B comprising a light source 576 and a converging lens 578. Light source 576 is located to direct light towards a specimen from the rear of the specimen stage 574. Both the light sources 562, 576 are of wavelength $\lambda_1$.

Microscope 560 also includes an activating light source 580 for producing activating wavelength pulses, a first collimating lens 582, a beamsplitter in the form of first beamsplitter cube 584, a coherent fused fibre bundle 586 with proximal tip 588 and distal tip 590, a beamsplitter in the form of second beamsplitter cube 592 and a second collimating lens 594.

Microscope 560 further includes a further light source 596 of de-activating light of wavelength $\lambda_1$, coupling optics 598 arranged to couple that light into the cladding modes of the bundle 586, a light source 600 of excitation light of wavelength $\lambda_3$ and a third collimating lens 602 for collimating excitation light 604 into a side face of first beamsplitter cube 584.

Finally, microscope 560 includes a converging lens 606 adjacent a side face of second beamsplitter cube 592 for receiving return light, and a pixellated photodetector 608 (such as a CCD or EMCCD) for detecting that return light.

In use, a specimen to be observed is located on specimen stage 574. The fluorophore in the specimen is de-activated by either de-activation system A or B (in which case the other may be omitted), or both de-activation systems A and B.

In the de-activation system A, light source 562 emits a pulse of light that is coupled into the proximal tip 568 of optic fibre 566. The pulse travels along the fibre 566 and is emitted as divergent rays 610 from the distal tip 570 of the fibre 566. This distal tip 570 is located at the back focal plane of objective lens 572. On passing through objective lens 572, the rays 610 are collimated and pass into the specimen as a uniform de-activating beam 612.

In de-activation system B, light source 576 is located to the rear of specimen stage 574 and, with lens 578, illuminates the specimen from the rear.

Light from activating light source 580, of wavelength $\lambda_2$, passes through first collimating lens 582 and first beamsplitter cube 584 and enters the cores of fibre bundle 586 at the proximal tip 588. The light exits the cores of the bundle 586 at the distal tip 590 and enters second beamsplitter cube 592. The portion of this light that is transmitted by second beamsplitter cube 592 is collimated by second collimating lens 594 and then passes to objective lens 572, which focuses it to an image of the core pattern at the focal plane 614 within the specimen.

A pulse of de-activating light from further light source 596 passes through coupling optics 598 into the cladding modes of the bundle 586 and is emitted from the distal tip 590 and focussed by the lens system (comprising collimating lens 594 and objective lens 572) as a reticulated pattern surrounding the positions of the previously activated spots. Wavelength $\lambda_1$ will also de-activate the molecules in the specimen. In this case the de-activation has spatial selectivity defined by the projected 3D pattern of the cladding of fibre bundle 586. It will largely inactivate the fluorophores in the out of focus planes but will leave fluorescent entities in the centres of the hexagonal pattern units in the focal plane mostly unaffected.

The imaging process is carried out using excitation light generated by light source 600. Rays of light 604 from source 600 are collimated by third collimating lens 602 and reflected from the dichroic layer 616 of first beamsplitter cube 584 to enter the cores of the fibre bundle 586 at its proximal tip 588. This light exits the cores of the bundle 586 at the distal tip 590 and passes through the second beamsplitter cube 592 and the second collimating lens 594 to be focused by objective lens 572 as a pattern of spots at the focal plane of in the tissue. This light causes fluorescence of the isolated sparse fluorescent entities. Some of this fluorescent light passes through objective lens 572 and second collimating lens 594, and is reflected from the dichroic layer 618 of second beamsplitter cube 592 to a focal plane 620 between second beamsplitter cube 592 and converging lens 606. Converging lens 606 relays the image to photodetector 608. A conjugate bundle may optionally be positioned at focal plane 620 to convey the light to the photodetector 608, with converging lens 606 omitted, the cores of the conjugate bundle acting as further spatial filters and further sharpening the point spread functions (PSFs).

This image contains multiple spots each spot is produced by the light emitted from one single fluorescent entity. This allows the centroid of the PSF to be determined and thus the position of the individual fluorescent entity can be localised with a resolution far greater than that of the Abbé limit.

The fluorophores in the specimen are then de-activated by a further exposure pulse from de-activation system A or B, and the sequence reiterated, potentially several hundred times or more. Each iteration activates fresh fluorescent entities in the specimen.

A series of several hundred to several thousand exposures are made and the sample is moved to a new position. A further several hundred to several thousand exposures are made at this new position. The number of changes of position of the sample or the bundle tip required in this method has only to satisfy the Nyquist criterion in relation to core spacing and Airy disc size. It does not require the nano-stepping that must be done in implementing the STED and GSD embodiments.

Figure 23:
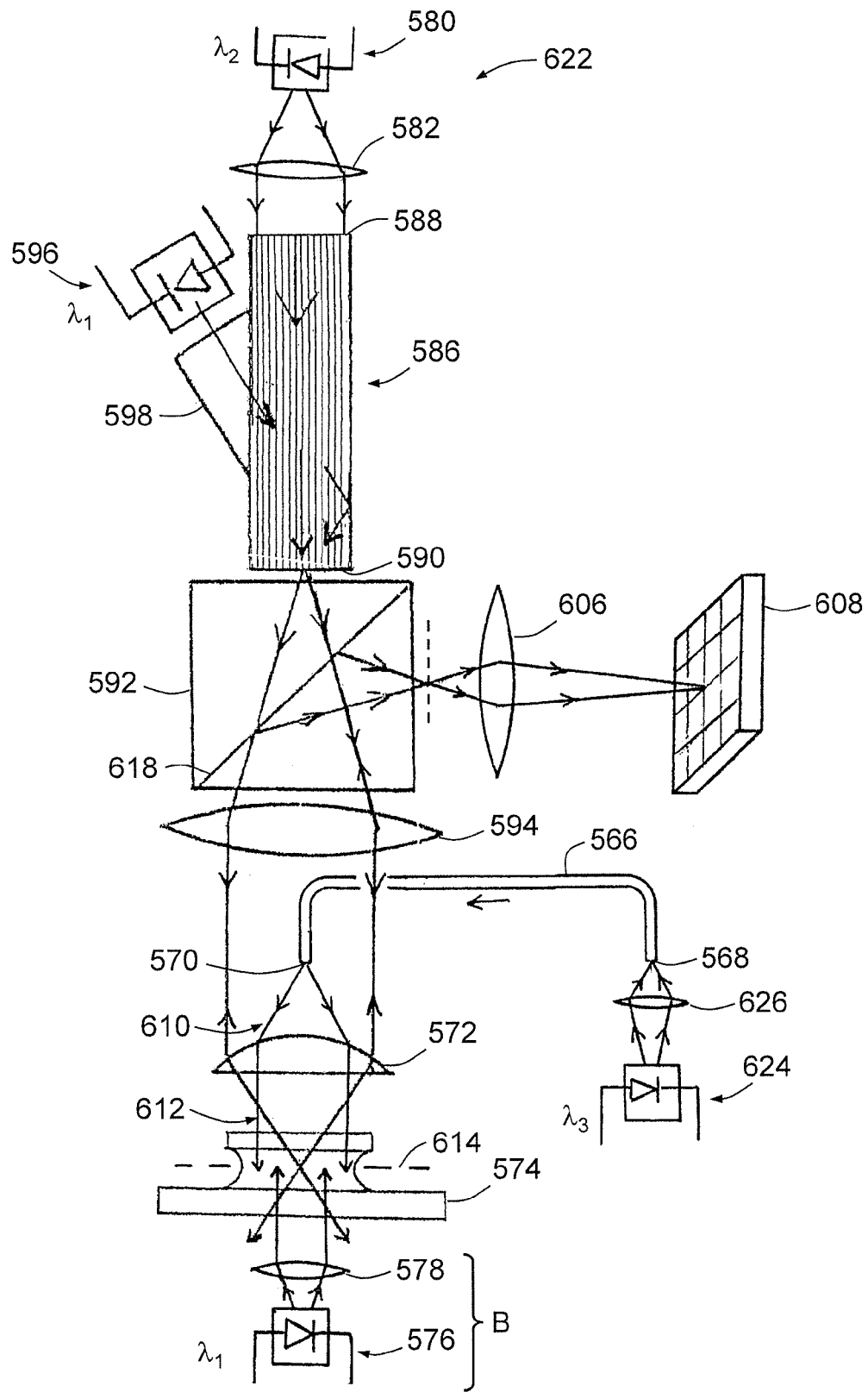
FIG. 23 is a schematic view of a microscope according to an embodiment of the present invention.

FIG. 23 is a schematic view of a microscope 622 according to another embodiment of the present invention. Most features of microscope 622 are identical with corresponding features of microscope 570 of FIG. 22, and like reference numerals have been used to identify like features.

This embodiment, however, uses only de-activation system B for de-activation by supplying a pulse of wavelength $\lambda_1$ to the specimen from the rear, while de-activation system A of microscope 570 of FIG. 22 is replaced, in microscope 622, with a light source 624 of excitation light of wavelength $\lambda_3$. and a focussing lens 626. The activating light pulse rays from light source 580 of wavelength $\lambda_2$ is collimated by lens 582 and coupled directly into the cores of the bundle 586 at the proximal tip 588 and travels through the optical system to produce spatially defined areas in the specimen in which single fluorescent entities may be activated, as described above. A further deactivating pulse is supplied by further light source 596, which selectively de-activates fluorophores above and below the focal plane.

The excitation light produced by light source 624 are focused by lens 626 into the proximal tip 568 of optic fibre 566. The light emerges from the distal tip 570 as a divergent beam 610 that is collimated by objective lens 572 and uniformly illuminates the specimen. The fluorescence from the specimen travels to the photodetector 608 to form the image, as described in the previous embodiment.

Multiple images and Nyquist criterion shifting need to be acquired, as in the previous embodiments.

Figure 24:
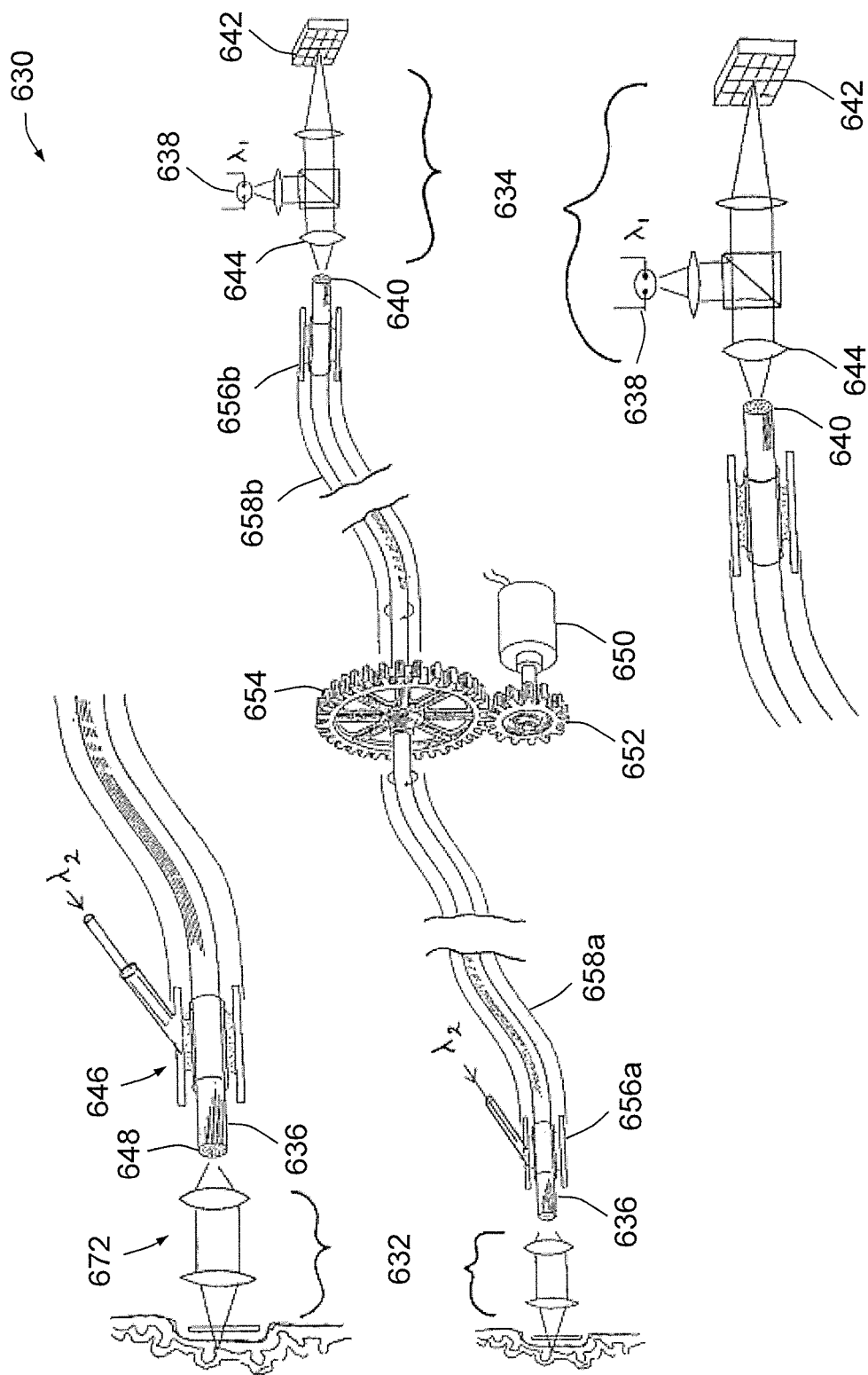
FIG. 24 is a schematic view of a rotating fused fibre bundle system according to an embodiment of the present invention.

Some embodiments require that a fibre bundle be rotated (cf. FIG. 14). FIGS. 24 and 25A to 25C illustrate how this can be accomplished. FIG. 24 is a schematic view of a rotating fused fibre bundle system 630 (including a detail of the distal portion 632 in the upper register and of the proximal portion 634 in the lower register), including a thin, long, flexible fused fiber bundle 636. Bundle 636 is sufficiently thin and long that it should be possible to use it through a biopsy channel. The optical and electronic components associated with the proximal portion 634 of the bundle 636 and those associated with the distal portion 632 of the bundle 636 are provided for illustrative purposes, and will differ according to application. As illustrated, however, these include a laser light source (not shown) that provides light of wavelength $\lambda_2$ injected at an injection location 646 near distal tip 648 of bundle 636, and a second light source 638 between the proximal tip 640 and the photodetector 642, optically after objective lens 644. Second light source 638 provides light at a wavelength $\lambda_1$ different from that of laser light $\lambda_2$.

Motor 650 causes rotation of gear 652 (directly coupled to motor 650), which engages and drives gear 654, which is coupled to bundle 636. Bundle 636 is located coaxially within gear 654 and is thus rotated. Close to the distal and proximal tips 648, 640 of the bundle 636 are lubricated sleeves or dashpots 656a and 656b, respectively, while the bundle is rotated within Teflon tubes 658a and 658b.

The construction of the distal and proximal dashpots 656a and 656b is shown in FIGS. 25A and 25B, respectively. Referring to FIG. 25A, the distal rotary dashpot 656a comprises a tube 660 through which the distal portion of the bundle 636 passes and to which bundle 636 is glued. This tube 660 is fabricated to fit bundle 636, but is mounted to rotate freely within a second, larger tube 662. A further member (not shown) constrains axial movement in both directions. The space between the tubes 660, 662 is filled with Kilopoise grease 664.

Dashpot 656a has an aperture 666 through which light from an optical fibre 688 (or other device) is injected, via the Kilopoise grease, into the cladding modes of the bundle 636.

FIG. 25B shows the proximal rotary dashpot 656b, which is identical in most regards (though without an aperture to admit light) to distal rotary dashpot 656a. A Peltier device 668 is thermally connected to the outer tube 670, to maintain the temperature at the temperature of the distal end and hence to that of the specimen (such as 37° C. when imaging the human body).

FIG. 25C is a detail of FIG. 24 showing the motor 650 and gears 652, 654, for rotating the bundle 636.

Thus, the rotary motion of bundle 636 allows imaging to be carried out via a distal lens train 672 (as illustrated in FIG. 24). However, it should also be noted that imagining can alternatively be conducted without such distal optical elements but rather by direct contact of the distal tip 648 of the bundle 636 with the specimen.

Chromatic Shift Lateral

Figure 26:
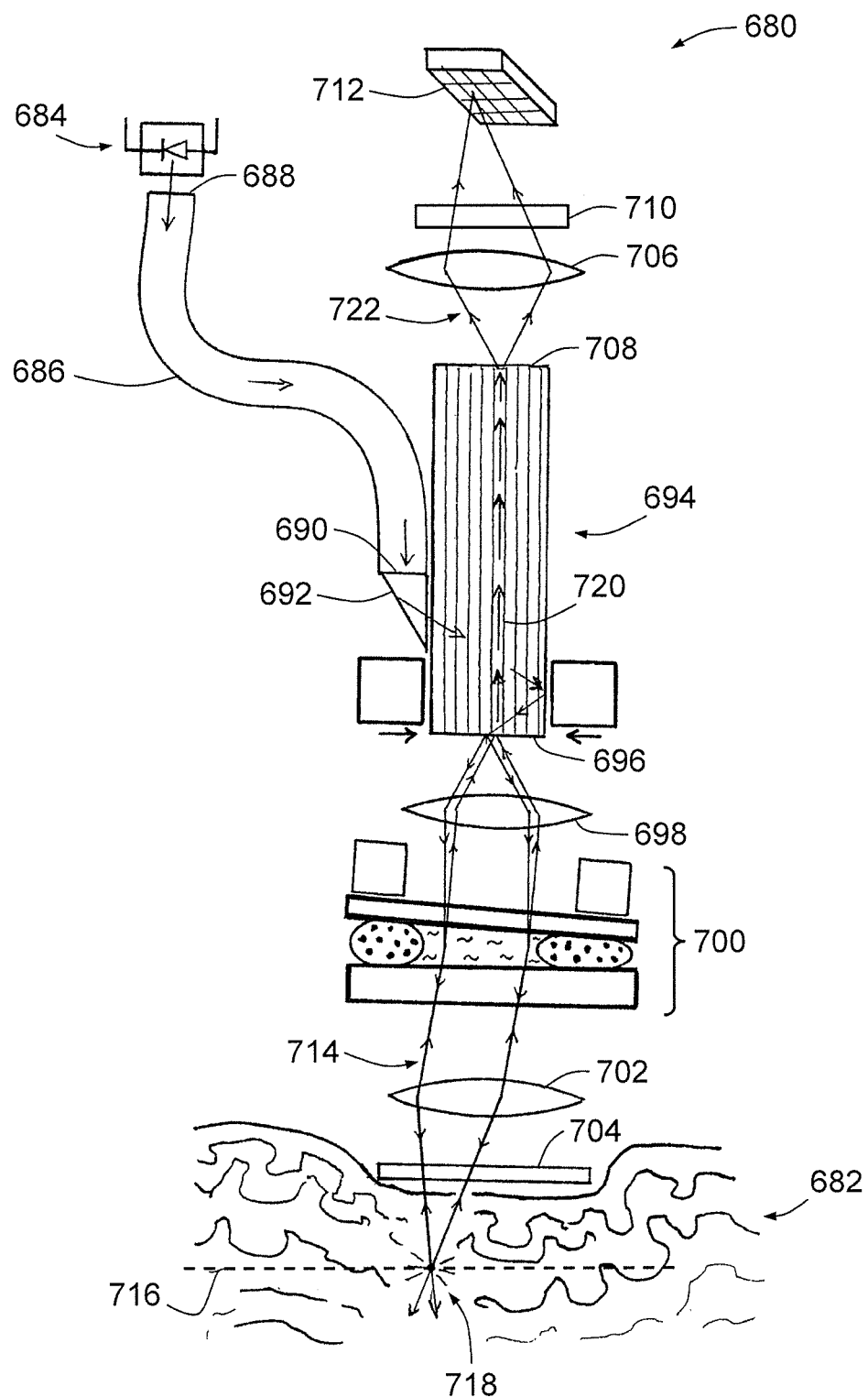
FIG. 26 is a schematic view of a microscope according to an embodiment of the present invention.

FIG. 26 is a schematic view of a microscope 680 according to another embodiment of the present invention, shown with a specimen in the form of a tissue sample 682. In this embodiment, a prism is introduced in the Fourier space in the distal lens train. Thus, microscope 680 includes an excitation light source 684, a multi-moded optical fibre 686 with a proximal end 688 and a distal end 690, a coupling prism 692, a fused optic fibre bundle 694 with a distal tip 696, a collimating lens 698, a prism stage 700, a first converging lens 702 and a cover slip 704.

Microscope 680 also includes a second converging lens 706 located to receive return light emitted by the other tip 708 of fibre bundle 694, a long pass filter 710 and a photodetector in the form of a CCD 712.

In use, light from excitation light source 684 is introduced into the proximal end 688 of multi-moded optical fibre 686, transmitted to the distal end 690 of the fibre 686, and coupled into the fused optic fibre bundle 694 by coupling prism 692. The light is then emitted by distal tip 696 of fused optic fibre bundle 694, and diverges until collected by collimating lens 698, which collimates the light. The light then passes through prism stage 700 and is deviated slightly thereby, and continues as beam 714 which passes through converging lens 702 which produces an image of the cladding pattern in the focal plane 716 within the tissue sample 682.

A point object 718 within the tissue sample 682 that is excited by the light then emits fluorescent light of a longer wavelength. A portion of this light passes in the reverse direction through converging lens 702 until it reaches the prism stage 700. As the return light is Stokes shifted and of a longer wavelength, it is deviated to a slightly different extent (compared with the incident light) as it passes through the prism stage 700. It is then brought to a focus at distal tip 696, with a lateral displacement compared with the incident, excitation light, which causes the return light to enter and be guided by a core 720 of fused optic fibre bundle 694 to the other tip 708 of bundle 694. The light from the core 720 is emitted and passes as ray 722 through converging lens 706 and long pass filter 710 to a focus 724 on CCD 712, thus contributing to the formation of an image.

Figure 27:
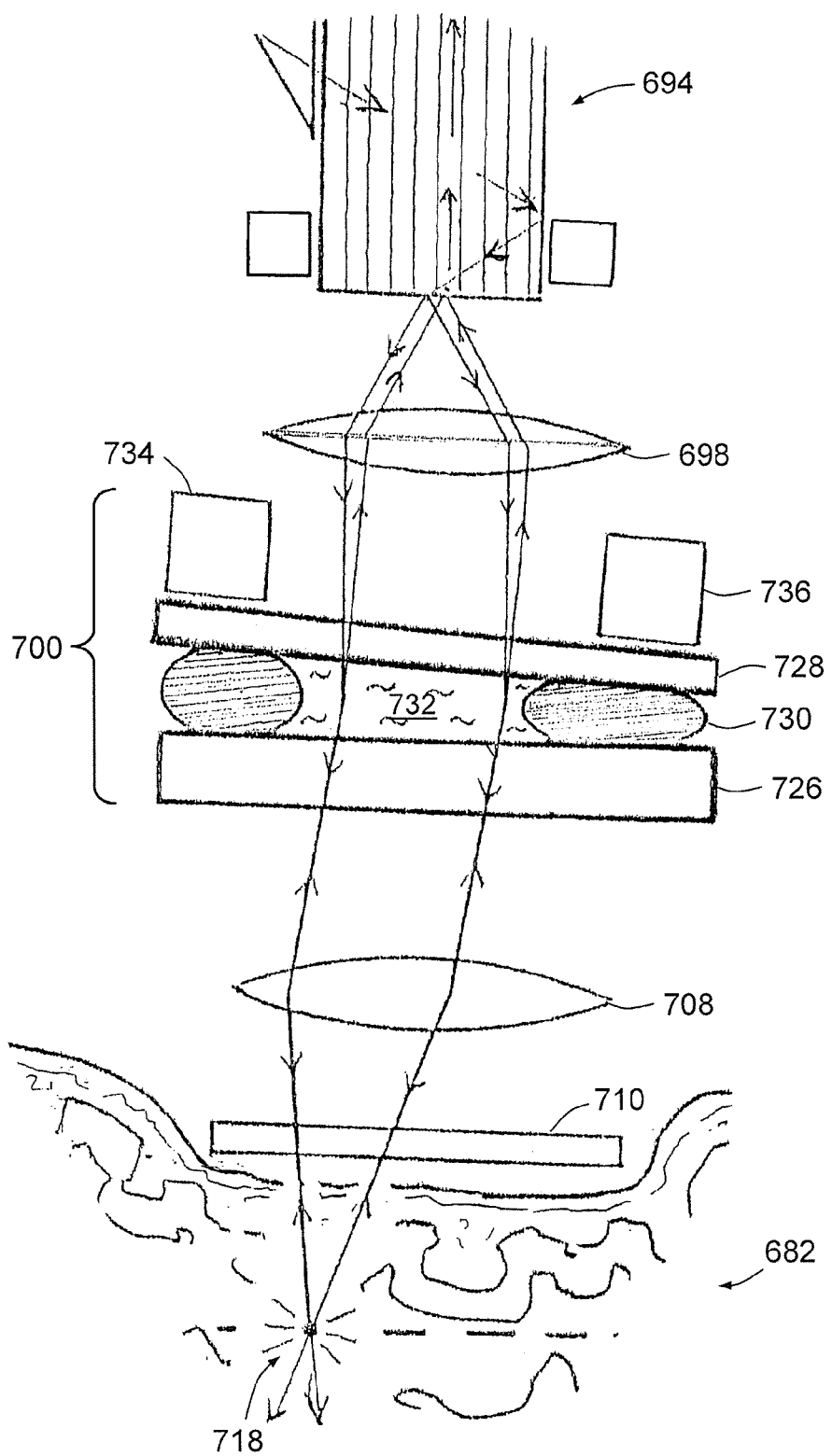
FIG. 27 is a schematic view of the prism stage of the microscope of FIG. 26.

FIG. 27 is an enlarged view of prism stage 700 and adjacent elements of the microscope 680 of FIG. 26. Prism stage 700 comprises a pair of glass plates 726, 728 between which is a compressible elastomeric "O" ring 730 which forms a seal against both glass plates 726, 728. The prism stage 700 also comprises a liquid 732 contained by "O" ring 730 and glass plates 726, 728. Pressure is maintained on the "O" ring 730 by two (or more) piezo transducer actuators 734, 736. During the operation of the microscope 680, the voltage applied to the actuators 734, 736 is first set so that the two glass plates 726, 728 are parallel. An initial image is collected and the voltages changed so that a slight prism angle is formed between the two glass plates 726, 728. A second image is then acquired. A pixel by pixel subtraction of one image from the other gives the difference and thus isolates the focal plane.

Further detail contributing to the formation of the image could be obtained by reversing the voltages applied to the actuators 734, 736 so that the prism angle is formed to produce deviation of the light in the opposite direction.

Optionally, a further pair of piezo transducer actuators (not shown) may be deployed to operate above and below the plane of the figure, to cause tilting in the orthogonal plane and would give further information that could contribute to the image.

It is also envisaged that the introduction of small amounts of aberration into the distal lens train could be used in a similar manner, e.g. normal chromatic aberration, astigmatism etc.

Figure 28:
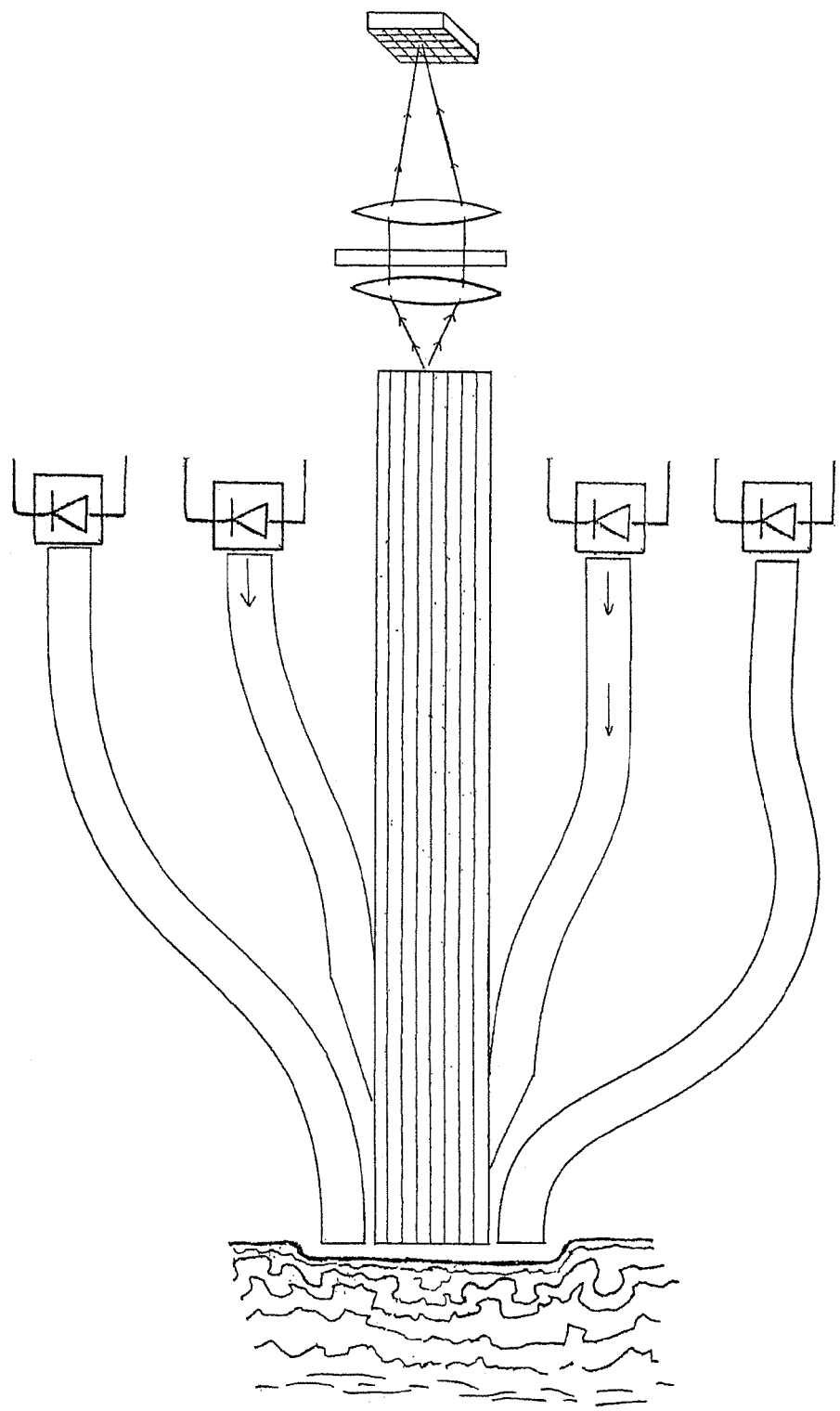
FIG. 28 is a schematic view of a microscope according to an embodiment of the present invention.
Figure 29:
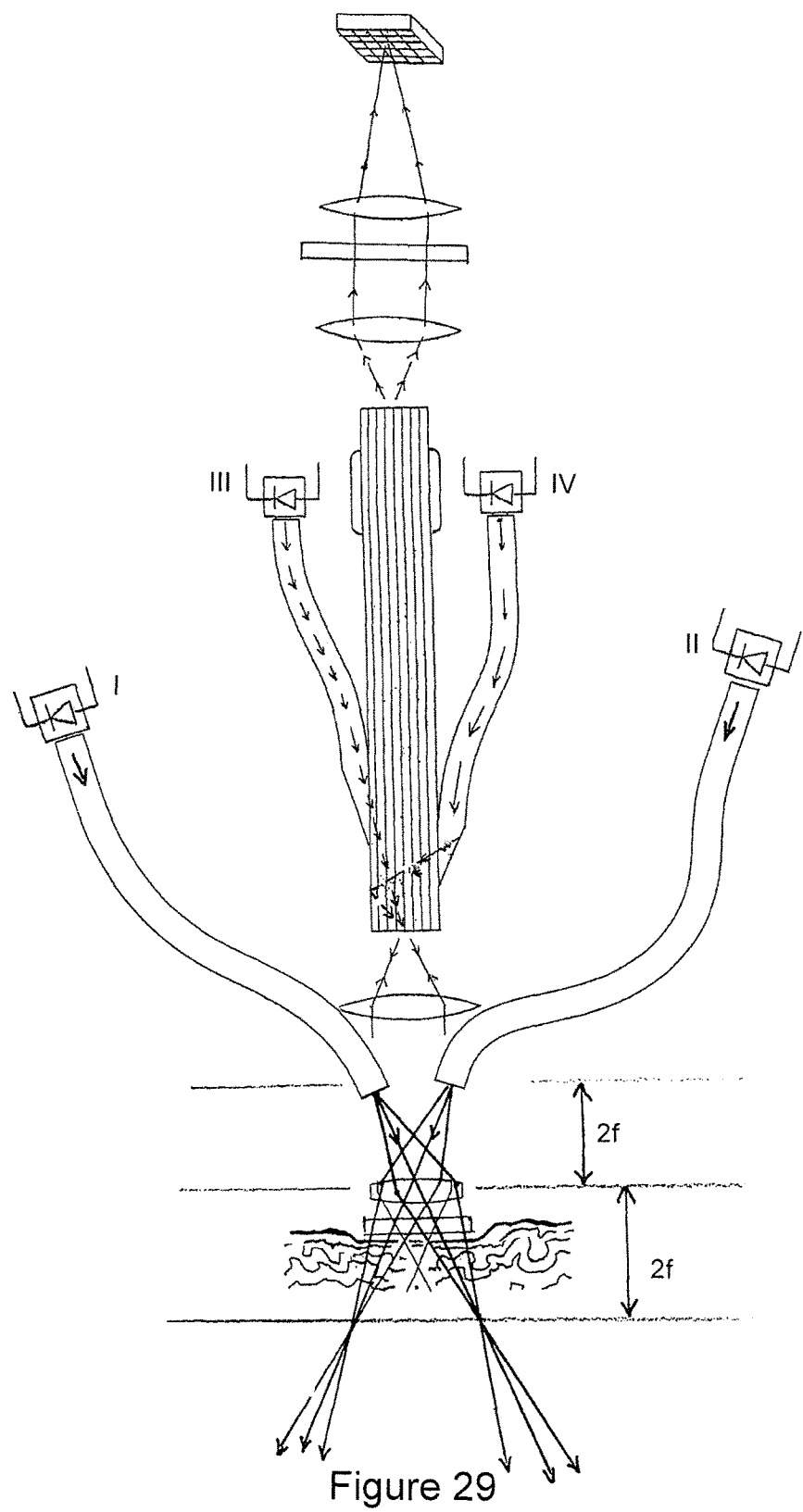
FIG. 29 is a schematic view of a microscope according to an embodiment of the present invention.
Figure 30:
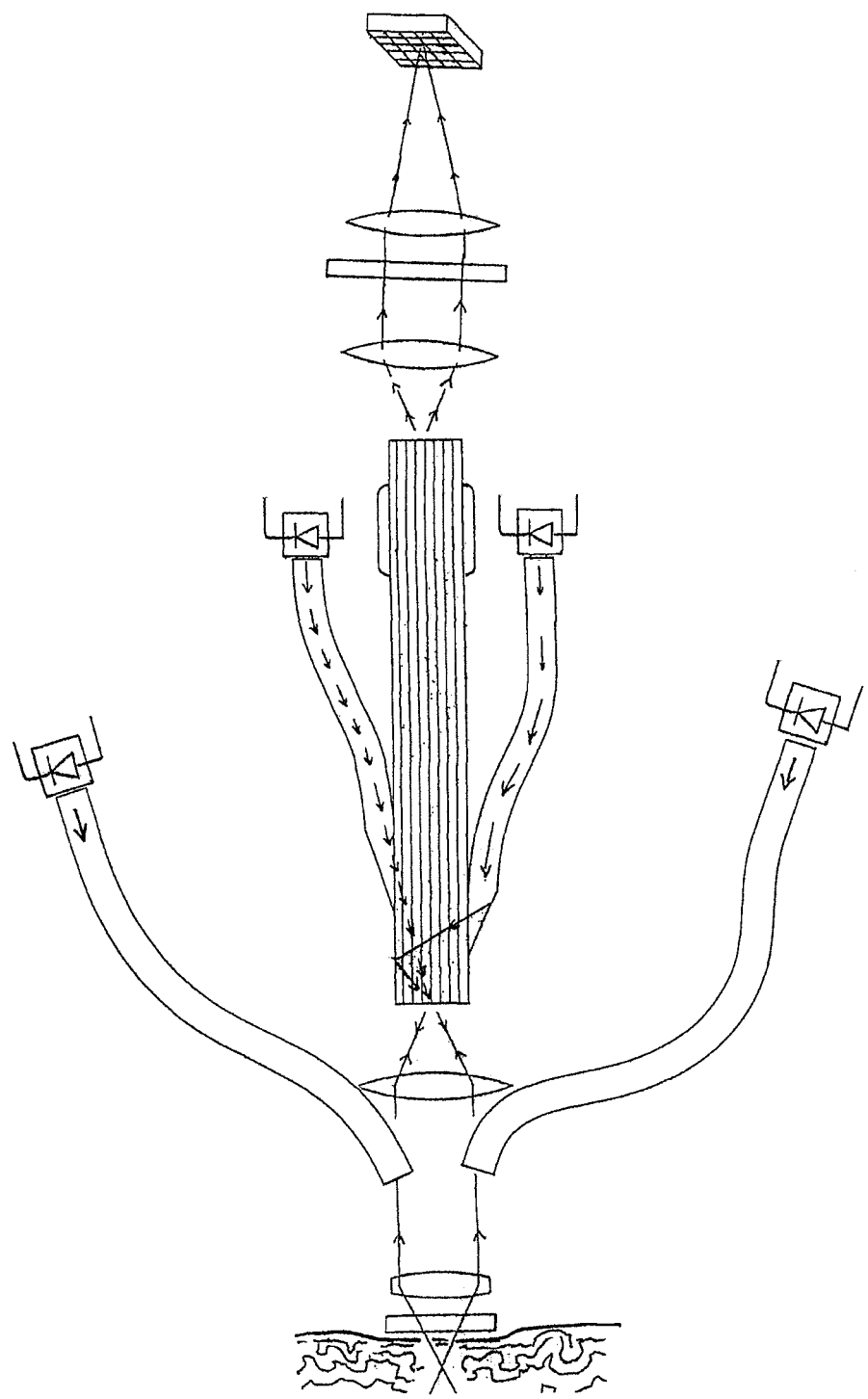
FIG. 30 is a schematic view of a microscope according to an embodiment of the present invention.

FIGS. 28 to 30 are schematic views of further embodiments, which may be used to conduct Oblique Illumination Phase Contrast Endoscopy.

Modifications within the scope of the invention may be readily effected by those skilled in the art. For example, other uses of fused fibre optic bundles with light coupled into the cladding modes include:

Rapidly changing uniform high intensity light sources, for microscopy, etc;

Merging high intensity light sources;

Independent control of angle of cone of light of each colour without light loss: a "mode conditioner";

Trapping Bose Einstein condensates (where the light source is separated to a spectrum and the spectrum is launched into the cladding as a spread of modes;

Nanofabrication by photopolymerisation using projected cladding modes, providing a reticulated pattern.

The first group of embodiments of the present invention described below relate to methods for producing an array of diffraction limited spots on or in a specimen. The optical structure that produces the array of spots is also capable of producing a second pattern in the same plane. This pattern comprises a grid or mesh or net or reticular pattern closely surrounding the spots. The second pattern is made with a de-activating wavelength.

The second group of embodiments of the present invention described below relate to an optical method of using such patterns in conjunction with an optical device to observe structures visually (by optical means) with a resolution that considerably exceeds the Abbé limit. The principles embodied in these embodiments may used in other applications, such as photolithography, high density optical data storage, Optical Data storage, Scanning Nearfield Optical Microscopy (SNOM) and endoscopy, in addition to microscopy.

The current invention combines the super resolution optics as described by Hell, with the Nipkow disc scanning principle. The preferred embodiment uses an optical fibre bundle to provide light channels instead of a Nipkow disc. It delivers the activating excitation light through the cores and delivers the de activating light through the cladding of the bundle.

In an embodiment described here the excitation light passes through a set of holes in a rotating disc. The light generated in the specimen passes back through the same set of pinholes, as with a Kino single sided scanning disc confocal microscope. In the current invention the light then goes through another set of apertures in a second disc. The unique feature of this part of the invention is that the second set of holes in the second disc is an expanded version of the holes in the first plate, and the image is observed through these holes. At first sight it would appear that this would just result in empty magnification. However each hole in the second disc has a micro lens in its aperture and each micro-lens is centred on the projected Gaussian or Airy disc from the pinhole/core array. Hence synchronous scanning will give a super-resolution image.

Light coming through each pinhole or core is projected as collimated beam. It can be seen that the NA of the cone of light produced by each micro-lens is independent of the distance between the spots. Thus the super resolution magnification is obtained. It should be noted that a substantial advantage in component density produced during photolithography over approach of U.S. Pat. No. 7,755,063 may be gained according to certain embodiment of the present invention, by having a rotating double disc array of lenslets in conjunction with synchronised motion of the pinhole/core array.

Figure 31:
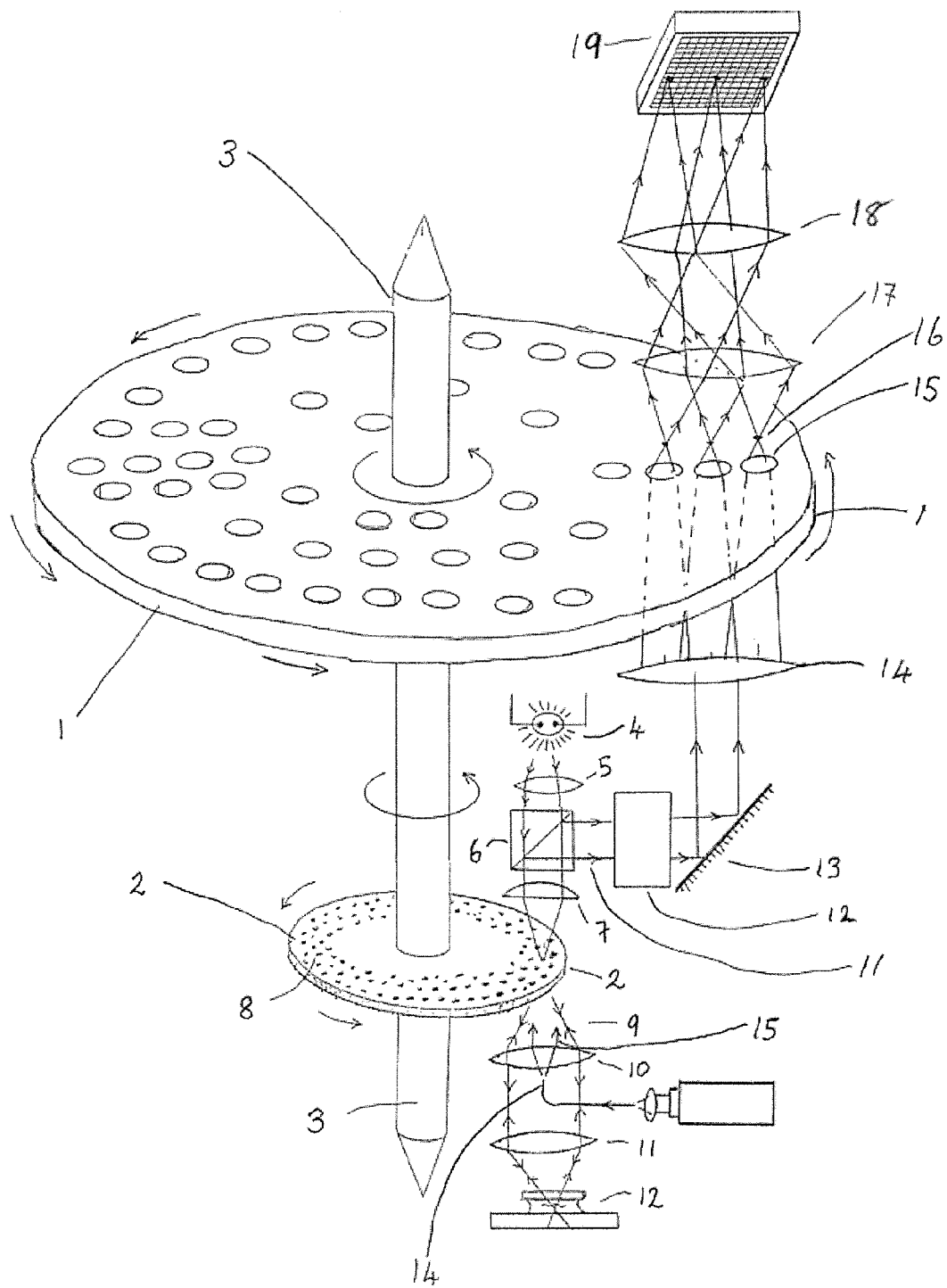
FIG. 31 is a schematic view of a microscope according to an embodiment of the present invention.

Thus, FIG. 31 is a schematic view of a microscope according to an embodiment of the present invention. First and second disks 1 and 2 of dissimilar size are both arranged on a shaft 3 that causes both disks to rotate synchronously. A large area low coherence excitation light source 4 is located between the two discs. The light from the source is collimated by lens 5 and it then passes through a dichroic beams splitter cube 6. The light is then converged by lens 7 to a focus on the surface of disk 2.

Second disk 2 is formed of very thin metal film which is supported on a glass sheet. The metal sheet is perforated with a multitude of very small holes 8. The size of these holes is uniform and is approximately equivalent to the Airy disc size produced by lens 7. The hole packing density is high and a substantial proportion of the light passes through as divergent beams 9 and is collimated by lens 10. This light passes to lens 11 which brings it to a focus 12 as a series of bright spots within the specimen 13.

The de-excitation light of an appropriate wavelength is emitted from the tip of optical fibre 14 and passes through lens 10 as collimated beam 15. This light impinges on the underside of second disc 2. The metal surrounding the pattern of holes scatters the light (this can be seen as forming a first order diffraction grating scattering. The zeroeth order reflection would be focused back into the fibre.

The plus and minus first order light passes back through lens 10 and then to lens 11 which brings it to a focus within the specimen as a grid or network surrounding all the focus light spots formed by the excitation light source.

Light source 1 is of a wavelength that excites appropriate molecules in the tissue to an excited state. Light source 2 causes de-excitation. The excited spots are thus sharpened by STED/RESOLFT/GSD processes. When the remaining excited state molecules do decay/fluorescence the light that they emit passes through the holes in second disk 2 and is collimated by lens 5 and reflected by beamsplitter cube 6 as a beam 11. This beam passes through inversion optics 12 and is reflected by mirror 13 through lens 14 onto the larger first disk 1. A series of micro-lenses 15 are located, each in its own aperture, on first disk 1. Each micro-lens is present at position that corresponds to the centre of the projected image (Gaussian) of the holes in the first disk 1. These micro-lenses converge the light from each of the beams (Gaussians) to a focus at a plane 16. This plane is projected by lenses 17 and 18 onto an EM CCD array 19.

Figure 32:
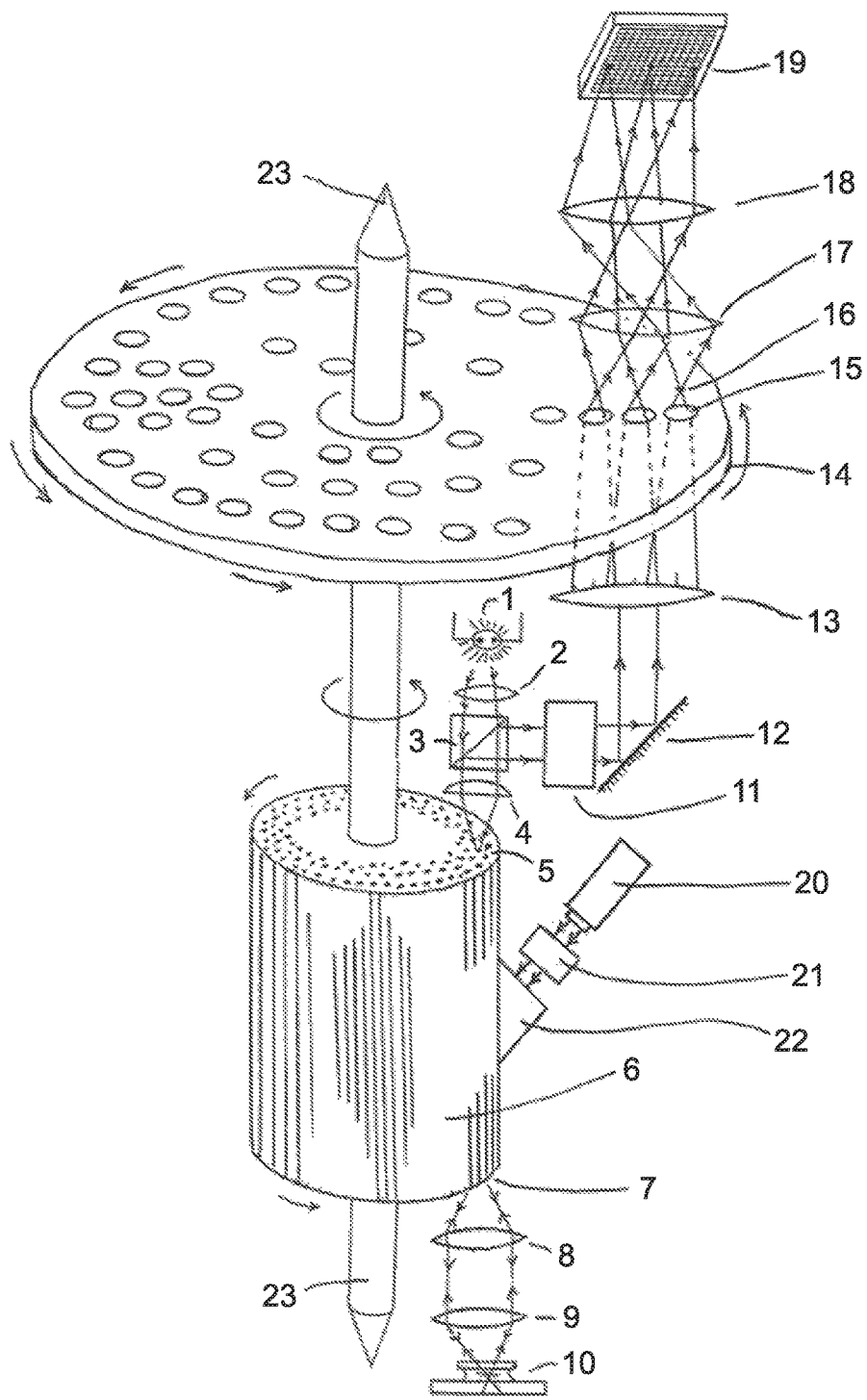
FIG. 32 is a schematic view of a microscope according to an embodiment of the present invention.

FIG. 32 is a schematic view of a microscope according to an embodiment in which holes in the disc of the embodiment in FIG. 31 are, in effect, replaced by the cores of a fused coherent optic fibre bundle. The excitation light is emitted from the cores of the fibre bundle (acting as an image transfer bundle), and the de-excitation light is injected into the cladding matrix of the optical fibre bundle from the side through a coupling prism. This light is then emitted uniformly from the cladding surrounding the cores of the same bundle.

Thus, referring to FIG. 32, a light source 1 is collimated by lens 2 and passes through a beam splitter 3. The light then passes through lens 4 and enters the cores of a fused coherent optic fibre bundle 6 at the proximal end 5 of the fibre bundle. The light passes to the distal end 7 of the fibre bundle 6, emerges and is converged by lenses 8 and 9 to form a focus in a specimen 10. Light returns through the fibre bundle 6 to the beam splitter 3 and is, in part, reflected through beam inversion optics 11. It is then reflected by mirror 12 and passes through lens 13 reaching a perforated disk 14 which carries an array of micro-lenses 15. The light passes through these micro-lenses to the focal position at 16 from which it then diverges to impinge on a lens 17. This lens collimates the light and a further lens 18 brings it to a focus on CCD array 19. Simultaneously, de-activating light from a light source 20 passes through a mode conditioner 21 and a coupling prism 22 so that this light also impinges on the specimen. The cores of the fibre optic bundle 6 are arranged so as that they match up with the lens pattern in the expanded disk 14 (which is hence optically an enlarged version of the proximal end 5 of the fibre bundle 6). The fibre optic bundle 6 and the disk 14 rotate about axis 23 aligned and in synchrony.

Figure 33:
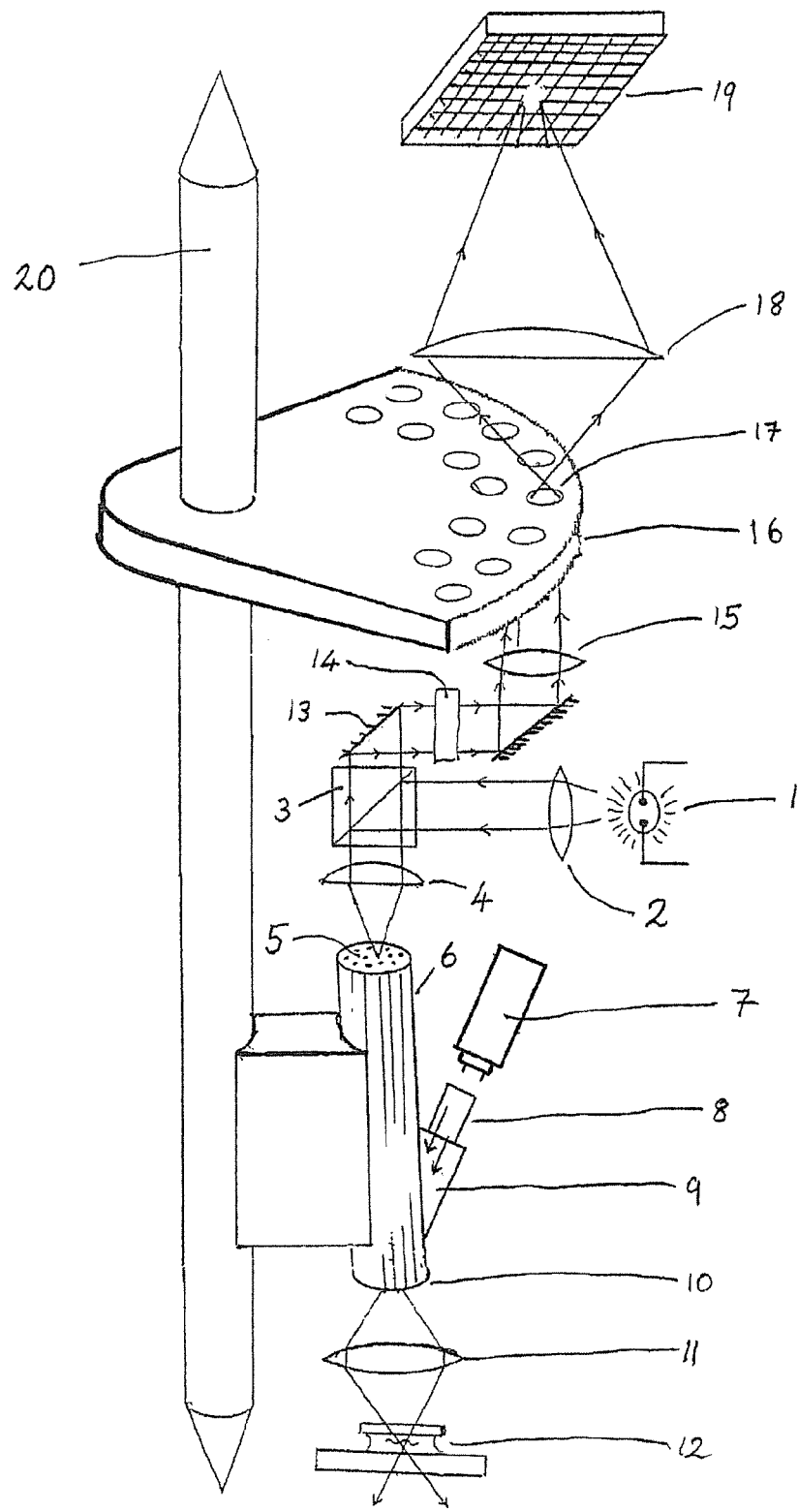
FIG. 33 is a schematic view of a microscope according to an embodiment of the present invention.

FIG. 33 is a schematic view of a microscope according to an embodiment in which reciprocating motion is employed. The excitation light from light source 1 is collimated by a lens 2 and passes into a dichroic beam-splitter 3. This is reflected through a lens 4 onto the surface 5 of fused fibre optic bundle 6, and is coupled into the cores of the bundle 6. A de-excitation light source 7 emits a beam of light, which passes through a mode conditioner 8 and a coupling prism 9 into the cladding matrix of the fibre optic bundle 6. At the distal end 10 of the bundle 6, both the excitation light and the de-excitation light are emitted and focused by a lens 11 into a specimen 12. At the focal plane in the specimen, the excitation light forms a series of spots while the de-excitation light forms a net or grid around the spots. This grid encroaches on the spots and erodes and sharpens them. Fluorescence from the spots passes back through the cores of fibre bundle 6, lens 4 and beam-splitter 3, and is reflected by mirror 13 through inversion optics 14 and focused by a lens 15 onto a plate 16 having a multiplicity of micro-lenses 17. The light from the micro-lenses 17 then passes through a lens 18 and is focused as a series of spots on a CCD 19.

Using any suitable drive mechanism, the fibre bundle 6 and the top plate 16 are placed in synchronous reciprocating motion of appropriate amplitude about an axis 20, which scans the spots on the CCD 19 and fills in the detail of the image giving Nyquist criterion sampling.

Figure 34:
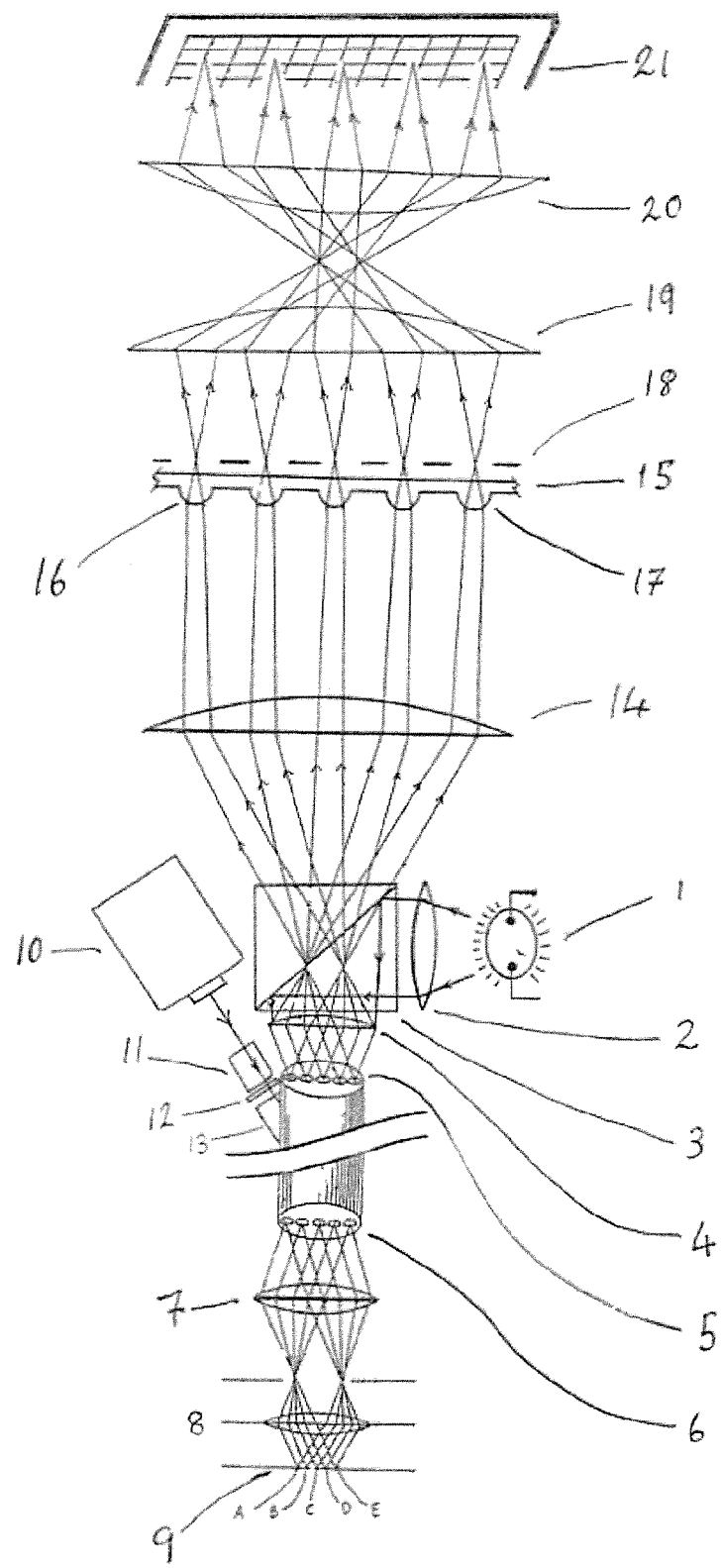
FIG. 34 is a schematic view of a microscope according to an embodiment of the present invention.

FIG. 34 is a schematic view of a microscope according to an embodiment in which lenses are arranged co-axially with a fibre bundle. A large area broadband the light source 1 emits light that is collimated through lens 2. The light is then reflected by the dichroic surface of a beam splitter cube 3 and passes through a lens 4 to the proximal end 5 of a fused fibre optic coherent bundle. The light enters the cores and passes to the distal end 6 of the bundle. (This distal end 6 of the bundle is shown so as to make the cores also visible.) The light passes through lenses 7 and 8 and focuses to a plane 9 within a specimen. A second light source 10 emits de-activating light that passes through a mode conditioner 11, an optical slip ring 12 and a coupling prism 13 into the cladding of the bundle. This light also passes to the distal end 6 of the bundle and is emitted and focused into the specimen. At the focal plane 9 it forms a network around the focused spots of the first light 1 source. This causes the activation of the excited states and has the effect of sharpening the excited state spot volume.

Fluorescence from spots A, B, C, D and E passes back through the cores of the optical fibre bundle and through the beam splitter cube 3 to lens 14, which brings each of these beams to a Gaussian waist at transparent plate 15. Plate 15 carries a series of lenslets or micro-lenses 16, 17 that intercept each of the beams and bring them to focus at plane 18. This light diverges out from these foci and is converged to form an image by lenses 19 and 20 onto a CCD array 21.

The fused optic fibre bundle and the transparent plate 15 are ganged so that they move together. The image of each of the cores must be axially aligned in position on its own specific individual micro-lens and its correspondence must be maintained by rigid construction of the rotating members holding those two components together. The other optical elements between the plates are also kept in rigid alignment.

Figure 35:
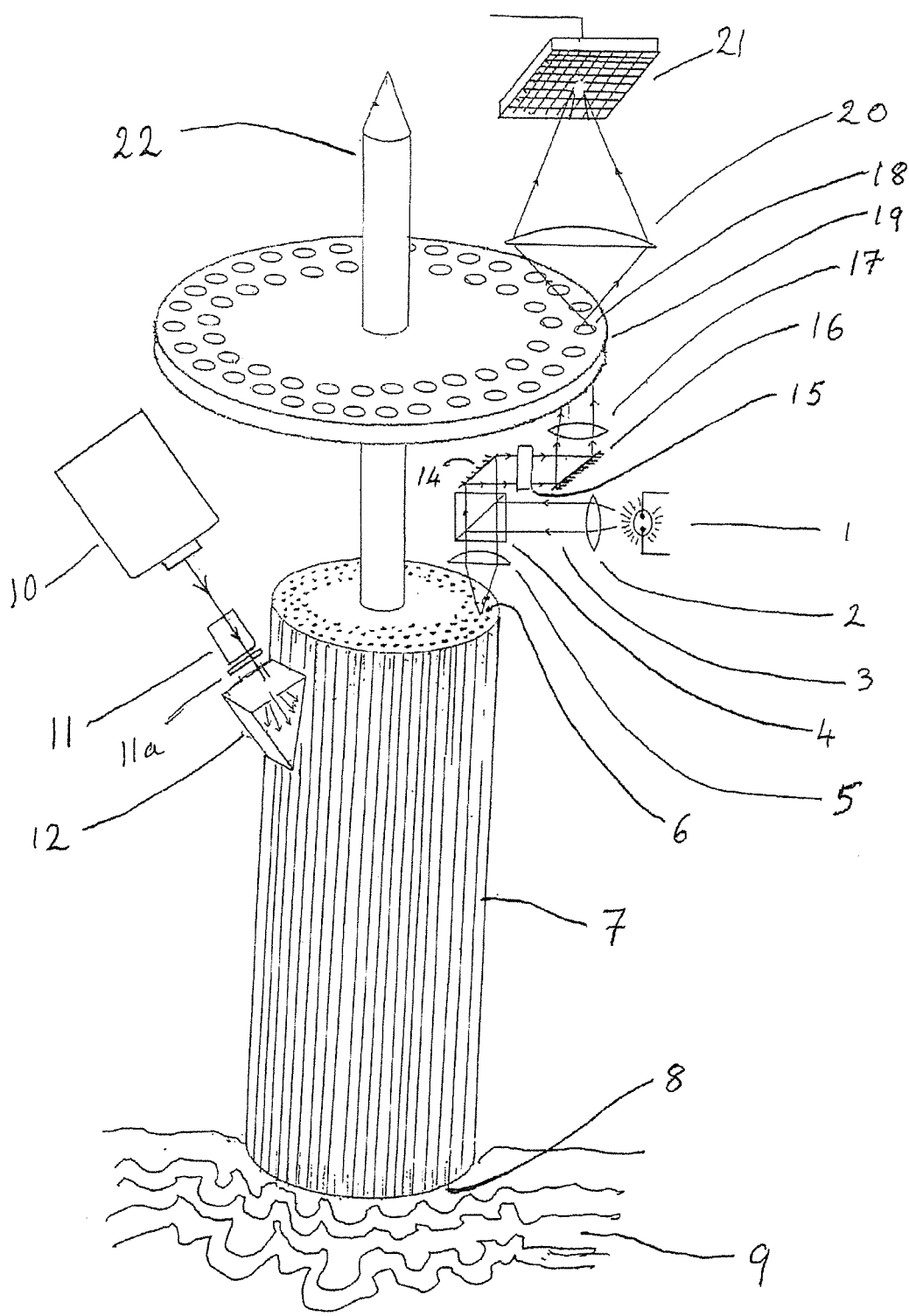
FIG. 35 is a schematic view of a microscope according to an embodiment of the present invention.

FIG. 35 is a schematic view of a microscope according to an embodiment in which GSD images are obtained from direct contact of the bundle tip with a specimen. An excitation light source 1 is focused by lens 2 as a beam 3 that is reflected from beam splitter cube 4 through lens 5 to focus at the proximal surface 6 of optical fibre bundle 7. The light emerges at the distal end 8 of bundle 7 and passes into the specimen 9. A de-activating light source 10 emits de-activating light that passes through a mode conditioner 11, an optical slip ring 11*a* and a coupling prism 12 into the cladding of the bundle 7 as shown by the light ray arrows; it also passes into the specimen along with the excitation light. Fluorescence from the specimen 9 enters distal end 8 of bundle 7, passes back through the bundle 7, is reflected by mirror 14 and inverted by optic element 15. It is then reflected by a mirror 16 and focused by a lens 17 into micro-lenses 18 on enlarged disk 19. The light then passes through a lens 20 which focuses it onto a CCD 21.

Figure 36:
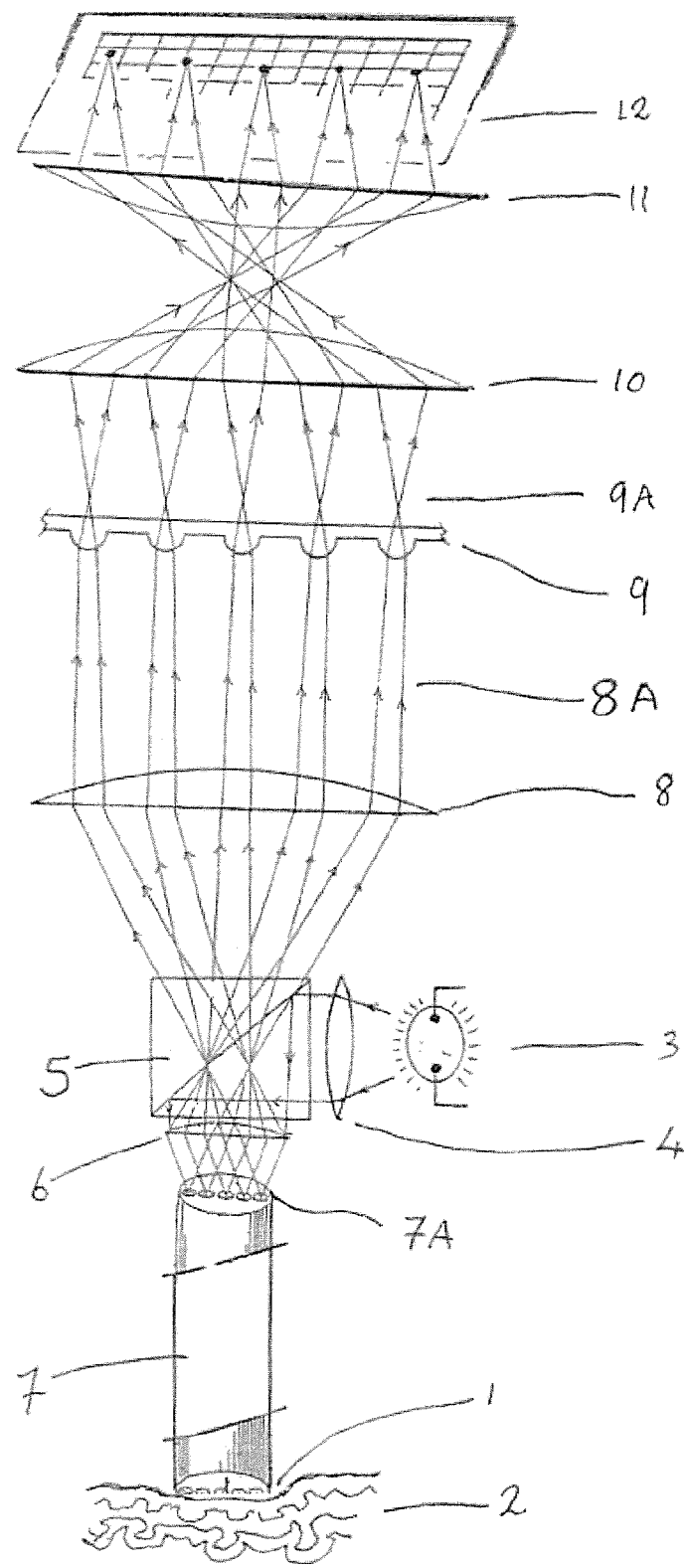
FIG. 36 is a schematic view of a microscope according to an embodiment of the present invention.

FIG. 36 is a schematic view of a near-field scanning optical microscope according to an embodiment. The distal tip 1 of a optical fibre bundle is specially treated with a generally opaque layer that is, however, perforated with very small holes in front of each core. (The technique used to achieve this is described below.) The tip 1 is made to contact a specimen 2. The excitation light source 3 emits light that is collimated by a lens 4 and reflected by a dichroic beam splitter 5. Excitation light passes through a lens 6 and into the cores of the fibre bundle 7; it reaches the distal tip 1 and passes into the specimen 2. Fluorescence from very close to the holes in the opaque layer on distal tip 1 and passes back to the proximal tip 7A of the fibre bundle 7. It emerges, then passes through the beam splitter 5 and is collimated by a field lens 8. Each of the individual ray bundles 8A from each of the cores of fibre bundle 7 impinge on a respective micro-lens in a plate 9 and is brought to a focus at a plane 9A. Lenses 10 and 11 bring these to a focus on a CCD array 12.

Figure 37:
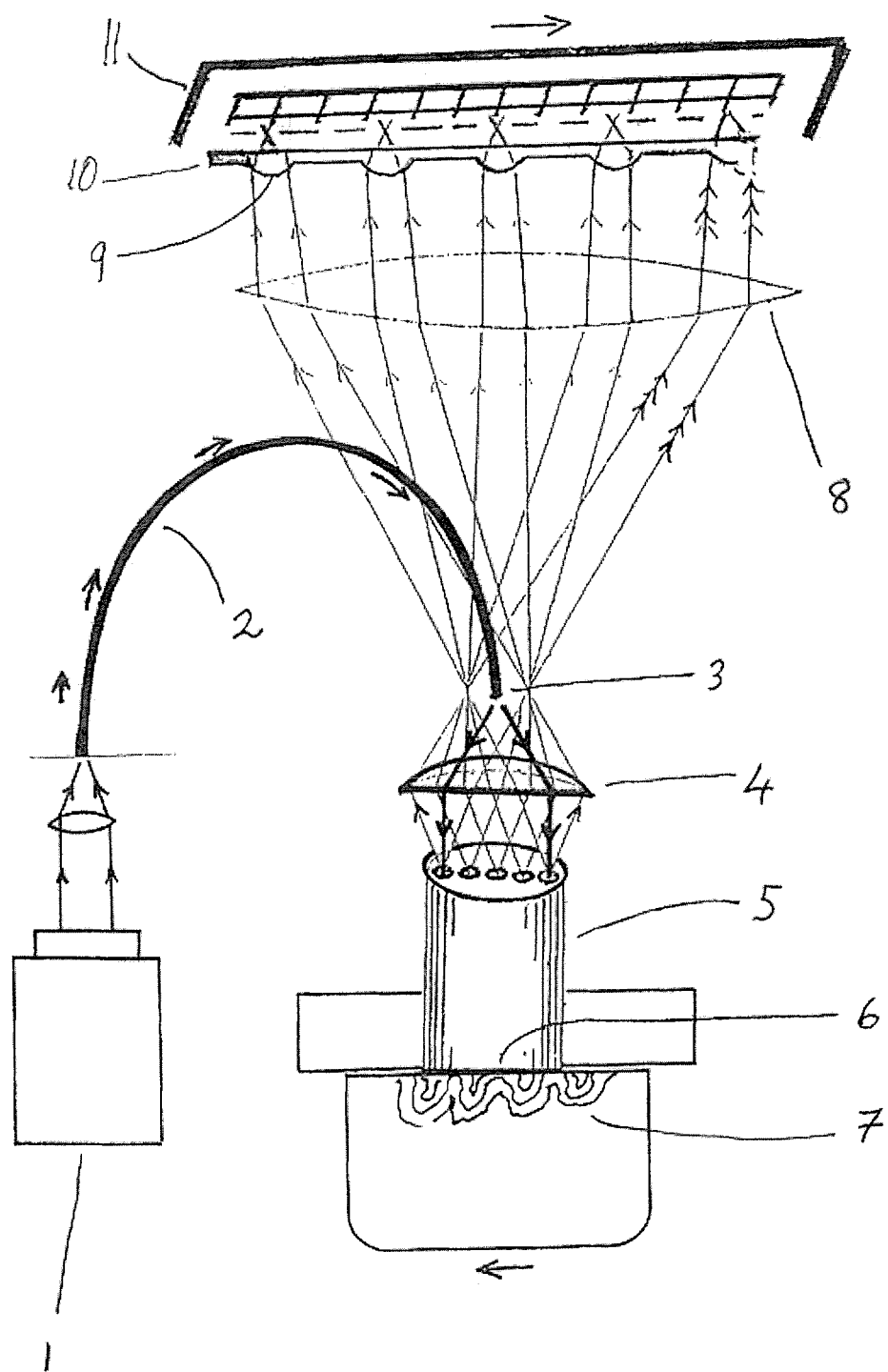
FIG. 37 is a schematic view of a microscope according to an embodiment of the present invention.

FIG. 37 is a schematic view of a scanning near field optical microscope according to an embodiment, which is expected to have a high optical efficiency and be easy to manufacture. Light from a light source 1 passes into an optical fibre 2 (either the light source must be very low coherence length or the fibre must be single moded). Light exits the fibre at distal tip 3 and is collimated by a lens 4 and enters the proximal cores of optical fibre bundle 5. At the distal tip 6 the cores are covered with an opaque material which has small holes in it. The light passes through these holes and causes fluorescence in the frozen tissue 7. Fluorescence returning through these pinholes passes to lens 8 and is focused through micro lenses 9 on plate 10 to form an image on CCD array 11.

Figure 38:
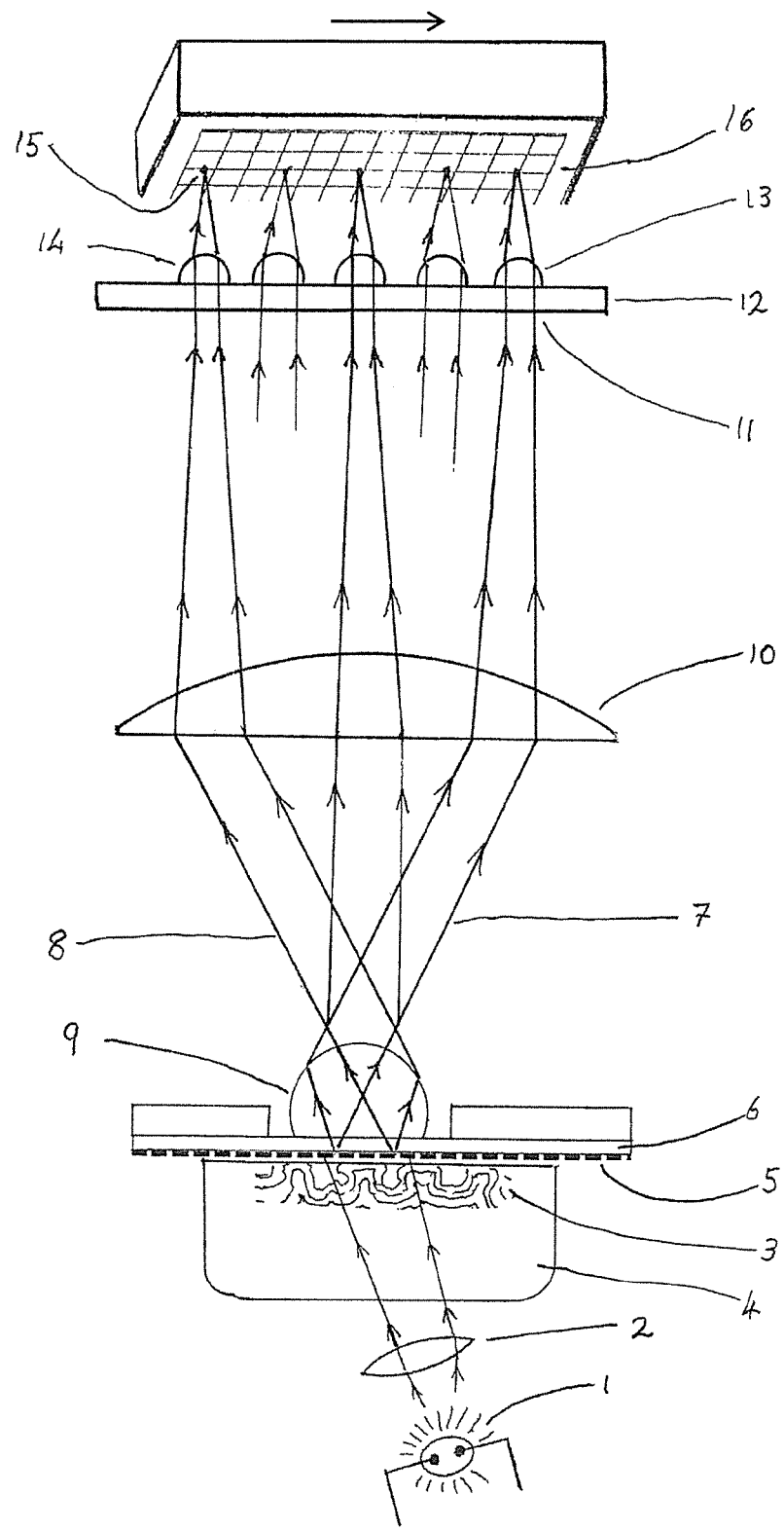
FIG. 38 is a schematic view of a microscope according to an embodiment of the present invention.

FIG. 38 is a schematic view of a microscope according to an embodiment that achieves near field scanning optical microscopy directly onto a CCD array without the use of a fibre bundle. An image is acquired as snap frozen specimen os slid across the microscope.

In this embodiment the light from a light source 1 is collimated by a lens 2 and passes through a thin layer of the specimen 3. The specimen is embedded in a block of ice 4 which is able to slide smoothly over a thin metal sheet 5 which is closely adherent to a sheet of glass 6. The thin metal sheet 5 is perforated with a multitude of sub-resolution holes. Light passes through these holes and the light from each hole is collimated as a separate beam 7 and 8 by a lens 9. These collimated beams encounter lens 10 which renders them parallel and brings each of them to a Gaussian waist in region 11. The beams pass through a transparent plate 12 which carries a number of micro-lenses 13 and 14. These micro-lenses are positioned exactly on the beam axis of each of the respective beams. The micro-lenses bring each of the beams to a focus 15 on a CCD array 16.

The microscope includes an actuator (not shown) that moves the block of ice 4 (with embedded specimen 3) and CCD array 16 in unison, though in the opposite direction. The CCD array 16 is moved at a speed that is greater than the speed of the ice 4 by a factor equal to the raw magnification ratio of the arrangement.

Figure 39:
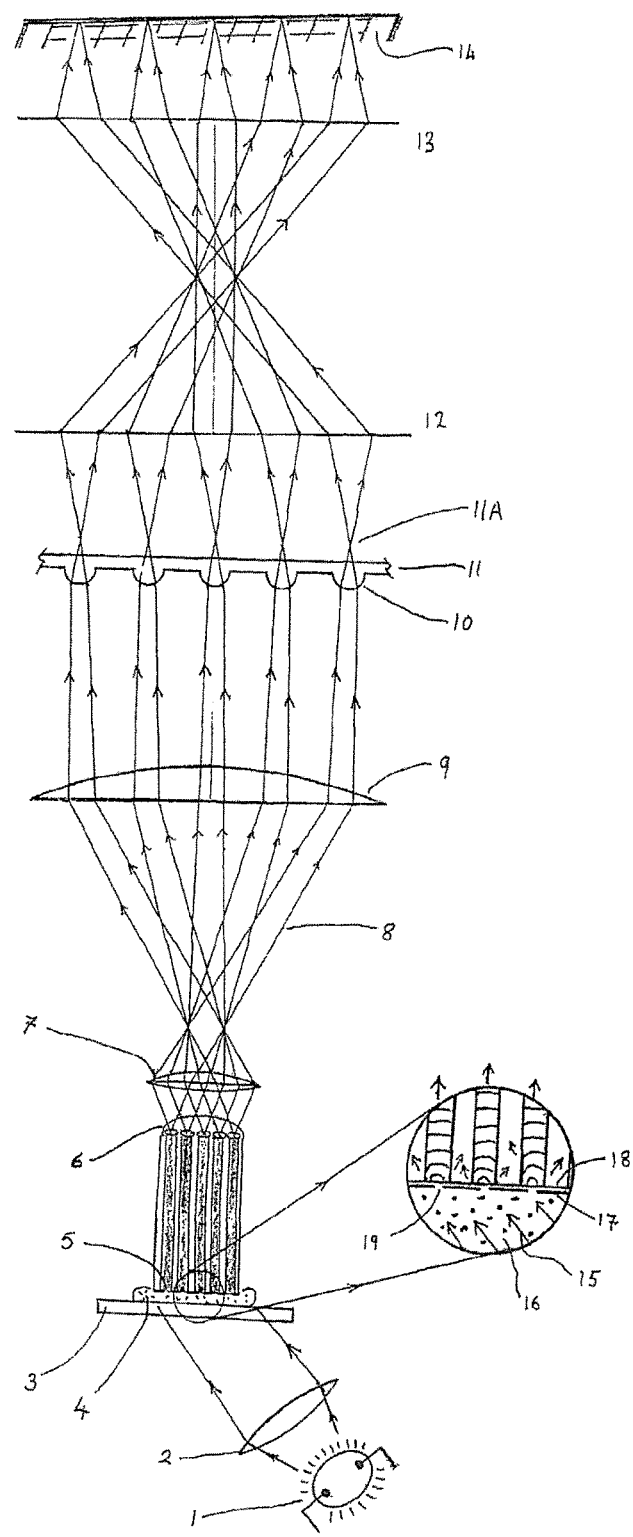
FIG. 39 is a schematic view of a microscope according to an embodiment of the present invention.

FIG. 39 is a schematic view of a microscope according to an embodiment of the invention, applied to Nearfield Scanning Optical Microscopy NSOM. Light source 1 is focused by lens 2 and passes through glass sheet 3. The light passes through the specimen 4 to be observed. The specimen 4 is in contact with the polished tip of the bundle 5 but is able to slide smoothly across it. The bundle tip is coated with a film of metal which is perforated with very small holes that correspond to the centres of the cores of the bundle (see detail). The light passes through these holes and emerges from the other end of the bundle 6. The light from each core is collimated by lens 7 and passes as separate beams 8 to field lens 9 this lens focuses each beam as a broad Gaussian waist onto separate micro-lenses 10 that are appropriately positioned on a glass plate 11. After passing through the micro-lenses 10, each beam focuses to a much tighter Gaussian waist. These Gaussian waist foci form a row 11A on the other side of the glass plate 11. The light from these diverges outwards and is focused by lenses 12 and 13 onto a CCD array 14.

The detail is an enlarged view of the area where the bundle contacts the specimen 4. The light beam 15 passes through the tissue 16 and comes in contact with the metal layer 17. The metal is in close contact with and adherent to the polished bundle tip 18 and has sub-resolution holes 19 positioned in front of the respective cores. These allow light to enter the cores and travel along them. The light enters the holes as almost complete hemispherical shells, so much of it is lost because the numerical aperture of the core cannot be made above about 0.5.

Figure 40:
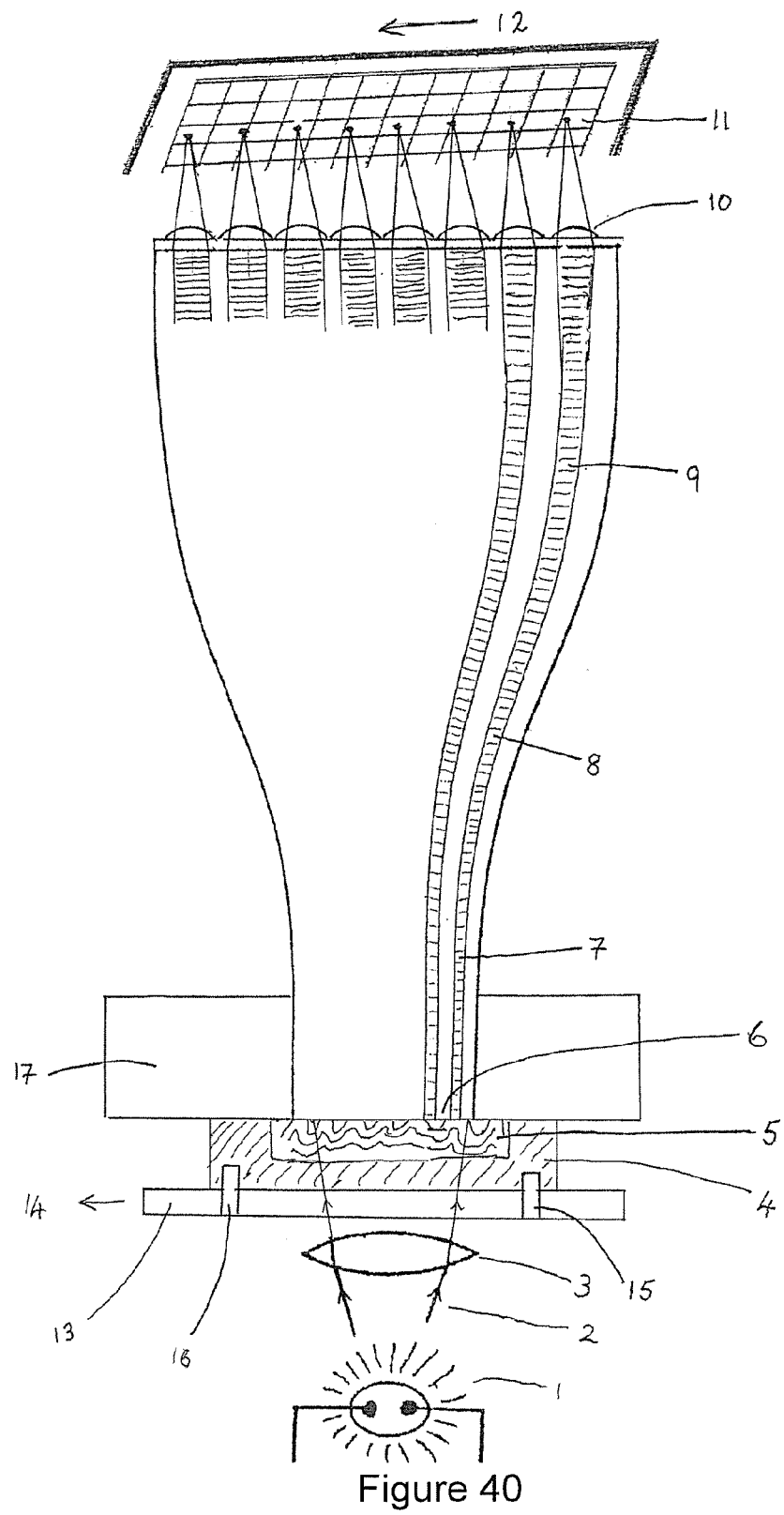
FIG. 40 is a schematic view of a microscope according to an embodiment of the present invention.

FIG. 40 is a schematic view of a microscope according to an embodiment of the invention in which light from a light source 1 passes as beam 2 through lens 3 into a block of ice 4. The block of ice 4 carries a frozen biological tissue specimen 5. The specimen 5 is pressed against the polished face of the tapered bundle at the thin end of the bundle 6. Light passes up the single moded cores 7, which adiabatically expands in region 8 to be a large core in region 9. The light is maintained as the fundamental mode so that when it leaves the core and passes through the micro-lens 10 it focuses to a diffraction limited spot on the surface of CCD array 11. In use, CCD array 11 is moved in the direction of arrow 12 while the glass plate 13 holding the specimen is moved a demagnified distance in the same direction 14. Pins 15 and 16 are provided to allow control of the ice 4. A shoulder 17 facilitates the smooth motion of the ice 4 and specimen 5.

Figure 41:
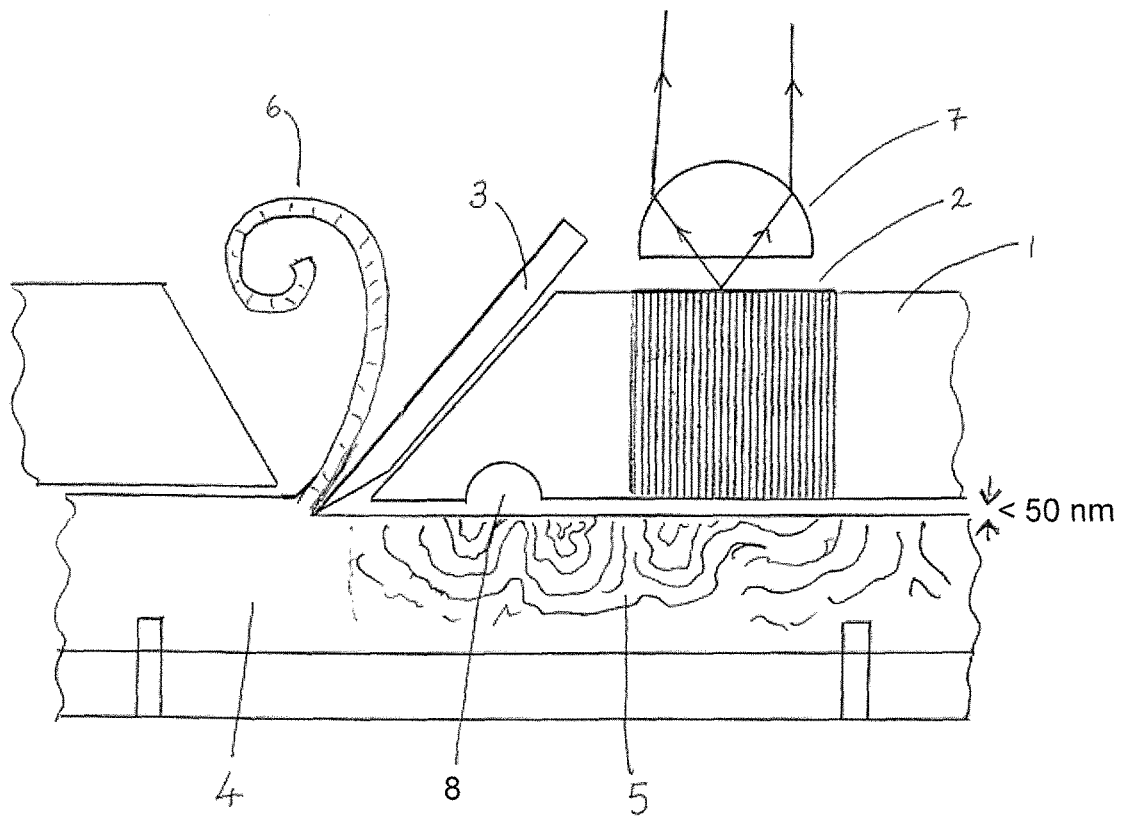
FIG. 41 is a schematic view of a microscope according to an embodiment of the present invention for high throughput automated histology.

FIG. 41 is a schematic view of a microscope according to an embodiment for high throughput automated histology, which allows images to be obtained by contact imaging from frozen biological tissues and hence rapid histopathology. Referring to FIG. 41, a plate 1 that carries a bundle array 2 also carries a sharp blade 3 for blade shaving or planing successive thin layers 6 from the ice block 4. The ice block carries the embedded frozen tissue specimen 5, magnified images of which it is desired to collect. A lens 7 projects the image of the surface layer of the specimen. The cores in contact with the frozen tissue specimen may have near field pinholes in an opaque layer covering them. The microscope also includes both a micro-lens plate and moving CCD array (neither shown). Illumination is provided through the ice (i.e. trans-illumination).

This embodiment may be used with conventional stains. The tissue specimen may be pre-stained or a stain may be introduces at the time of cutting. The stain could be introduced through a groove 8 in the glass plate 1.

If the cores do not have pinholes in the tips, the micro-lens plate gives no advantage and can be omitted. In that case the isolation of the focal plane at the contact zone could be achieved with a restriction in the number of cores used, such as by employing a thin strip of cores as well as a thin strip of illuminating light or by any other suitable mechanism.

Figure 42:
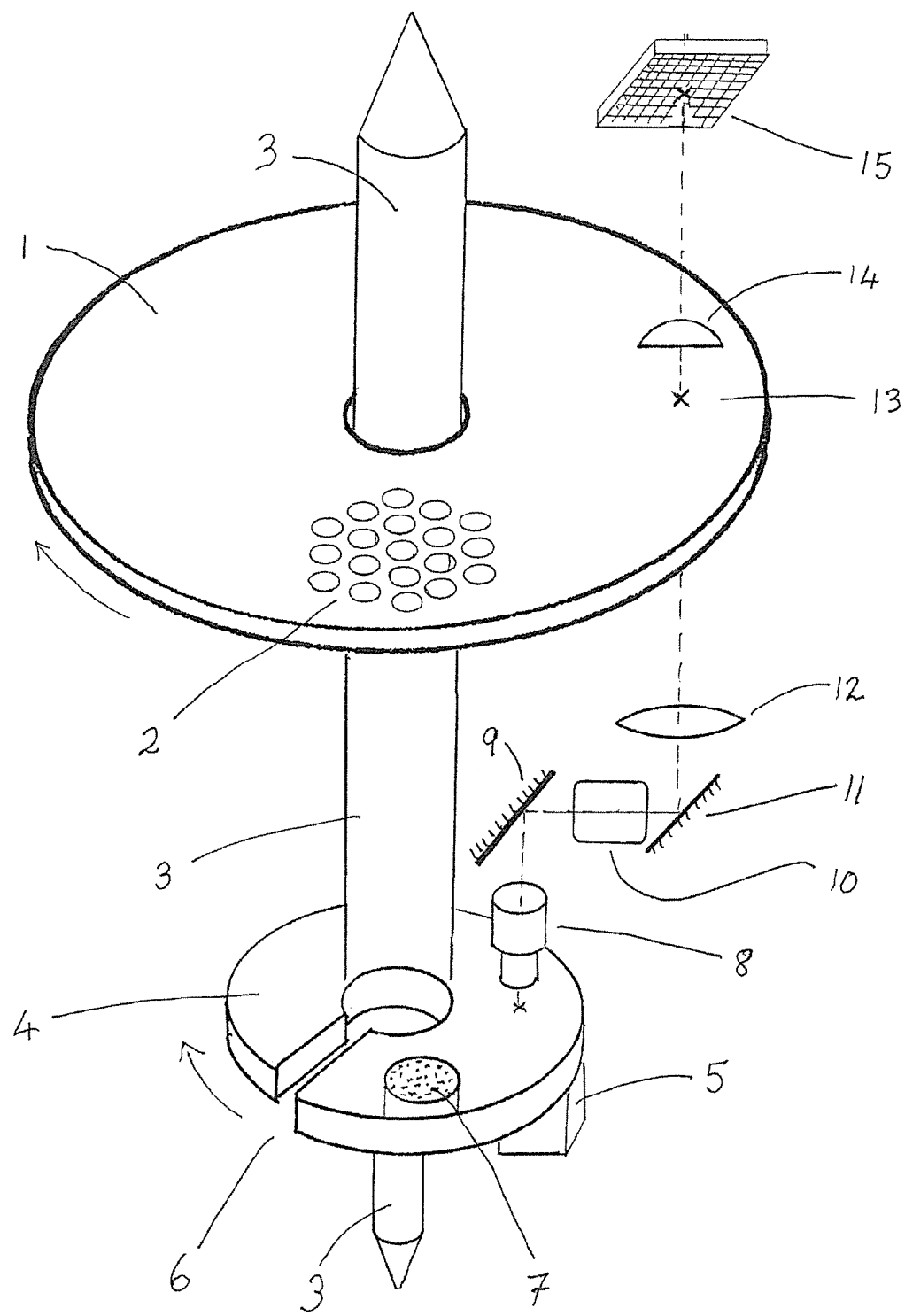
FIG. 42 is a schematic view of a microscope according to an embodiment of the present invention for use in a cryostat on frozen specimen embedded in an ice block.

FIG. 42 is a schematic view of a microscope according to an embodiment for use in a cryostat on frozen specimen embedded in a block. The microscope includes a glass disk 4 with a circular hole in its centre and a radial slot 6 from the circular hole to circumference. Near its periphery, the disk 4 also has a hole that has been drilled through the glass and a fibre optic bundle 7 positioned in the hole with the cores passing from one side of the glass disk 4 to the other. This is glued in position and both ends of the bundle are polished flush with the glass disk 4. A shaft 3 capable of precise rotation is fixed to the glass disk 4. Further along the shaft 3 there is provided a larger disk 1, also to shaft 3. Larger disk 1 carries micro-lenses 2 for high magnification. A block of ice 5 presses against the underside of the glass disk 4. The glass disk 4 is twisted slightly so that it is somewhat helical. As the glass disk 4 is rotated (by a drive mechanism, not shown), the sharp trailing edge of the slot 6 cuts away 10 µm or 20 µm of ice to expose a new surface for observation.

Figure 43:
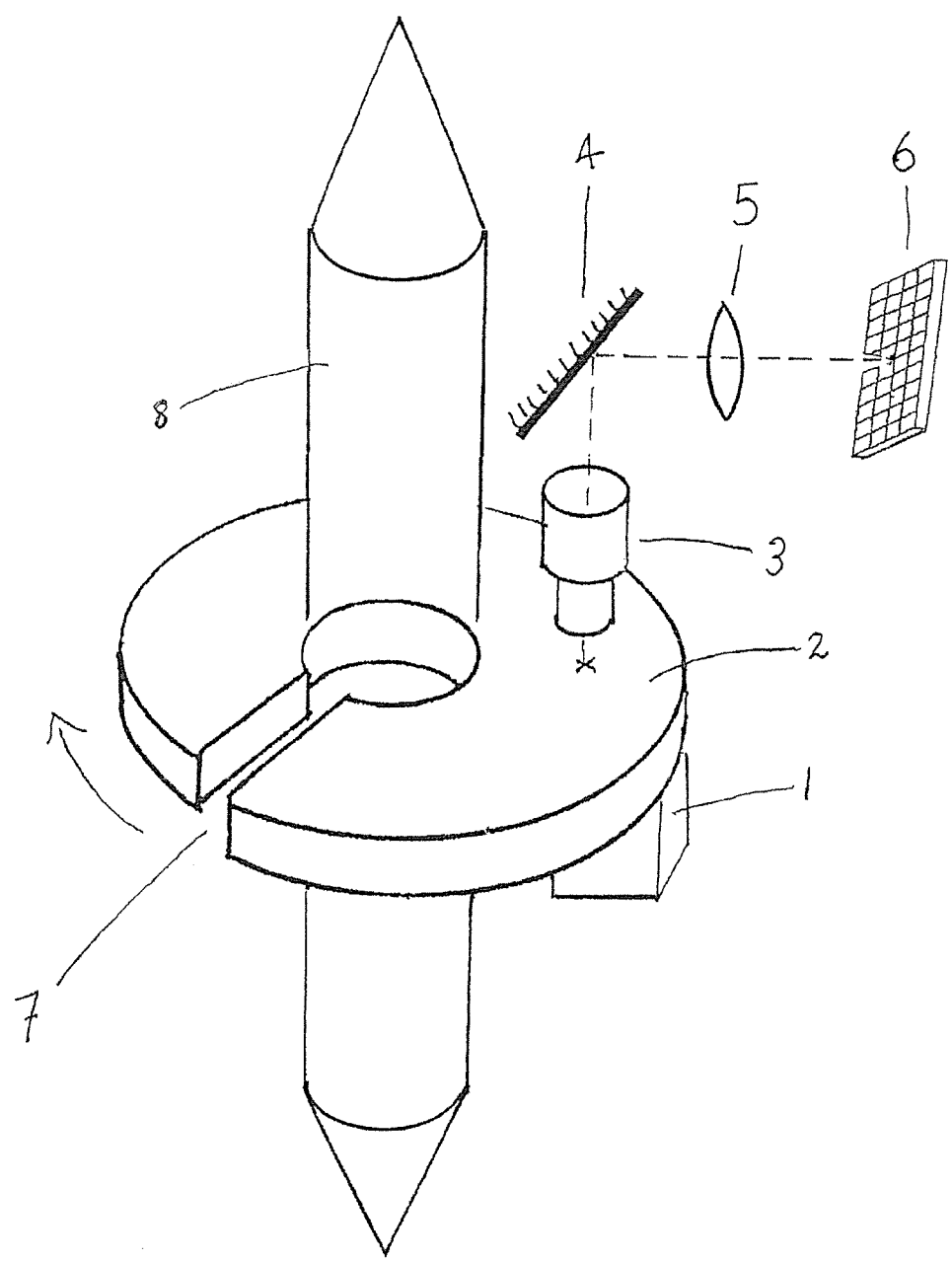
FIG. 43 is a schematic view of a microscope according to another embodiment of the present invention for use in a cryostat on frozen specimen embedded in an ice block.

In FIG. 43 an embodiment is shown that is similar in many respects to that of FIG. 17. A specimen comprising a block of frozen tissue embedded in an ice block 1 is pressed against a rotating glass disk 2. A lens 3 focuses through the glass onto the surface of the tissue, so collects light which it projects onto by mirror 4. Mirror 4 reflects the light to lens 5, which focuses it to an image on a CCD array 6. The glass disk 2 has a slot 7 that shaves away a thin layer of the specimen as the glass disk 2 is rotated by axle 8 on each revolution. The contrast mechanism to make visible structures in the tissue may be, for example, phase imaging with illumination light coming through the glass disk 2. Alternatively, epi-fluorescence could be used or a stain could be introduced at the interface between the block in the glass during the process of shaving of the thin layer of tissue.

As discussed above, FIG. 21 is a schematic illustration of how the polarisation vector of the wave within the cores may be controlled advantageously, whereby polarisation maintaining bundles can be produced by giving the cores a small degree of ellipticity. The ellipticity of the cores also allows the fabrication of plasmonic structures over each of the individual core tips at the end of the bundle that is to come in contact with the tissue. For example, FIG. 44 shows details of an embodiment in which elliptical cores are used to deliver polarised light to a specimen for near field scanning optical microscopy NSOM using plasmonic enhancement of the fluorescent excitation process.

FIGS. 44A to 44E show how a bow-tie antenna structure for surface enhanced imaging can be formed in metal in front of the tip of each of the cores in the bundle. This concentrates the electric field of the excitation light in the space between the tips. Any sub-resolution fluorescent object in that space is strongly excited. The bundle may be formed as shown in FIG. 21.

Figure 44A:
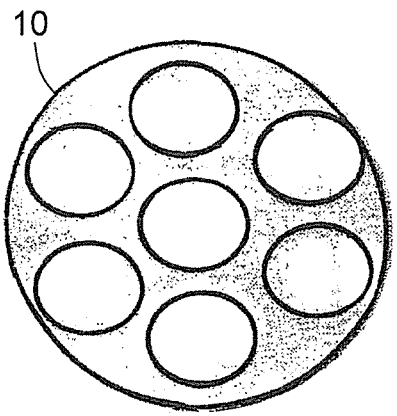
FIGS. 44A to 44E illustrate how a bow-tie antenna structure for surface enhanced imaging can be formed in metal in front of the tip of each of the cores in the bundle according to an embodiment of the present invention.
Figure 44B:
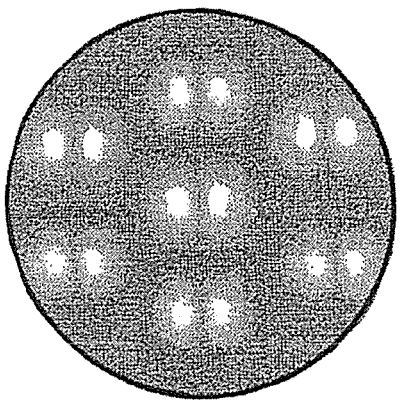

FIG. 44A shows an elliptical core bundle 10 with a group of seven elliptical cores. This can be made by the process described by reference to FIG. 21. FIG. 44B shows the near field modal pattern from each core, when a 0,1 short wavelength mode is launched into the fibre cores at the other end of the bundle.

Figure 44C:
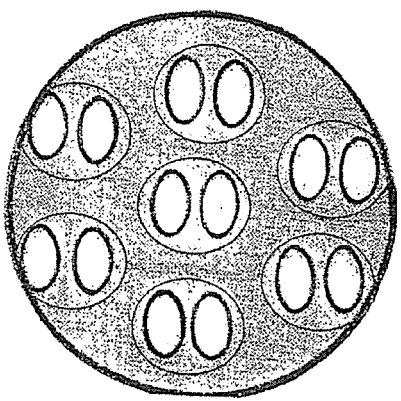

FIG. 44C shows the $1/e^2$ power profile of the 01 modes for the seven cores.

The areas receive sufficient optical power to expose the photoresist and render it insoluble.

Figure 44D:
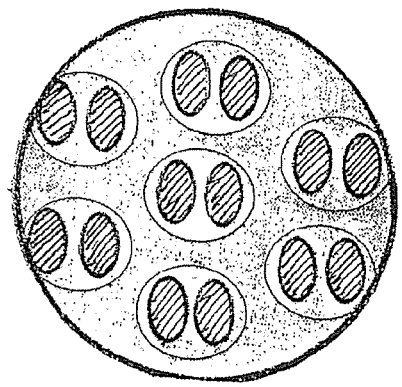

FIG. 44D shows the exposed photoresist that has not been washed away, and which masks the glass underneath.

Figure 44E:
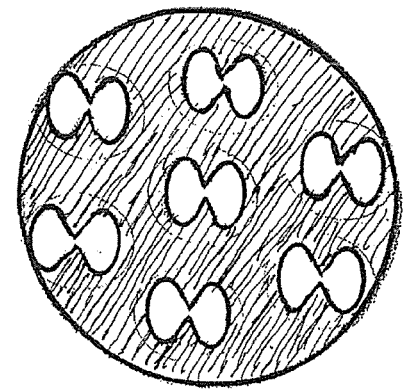

FIG. 44E shows the metal layer that remains after the photolithography and metal deposition process, and the washing away of the photoresist. The opposing tips in the bow-tie structures can be formed by the injection of some fundamental mode light into the core. The tips can be sharpened by electro sharpening techniques (such as are used for sharpening fishhooks).

As a part of the photolithography process it would be possible to inject a small amount of the fundamental mode into the cores of the bundle in addition to the 01 modes. This would expose the photoresist at the centre prior to the metallisation coating process of the tip. The wavelength to activate the photoresist is shorter than the operating wavelength that is to be used subsequently, so the photoresist activating wavelength can exist in the 01 mode whereas the operating wavelength can only be conveyed as the fundamental mode in the same core.

Figure 45:
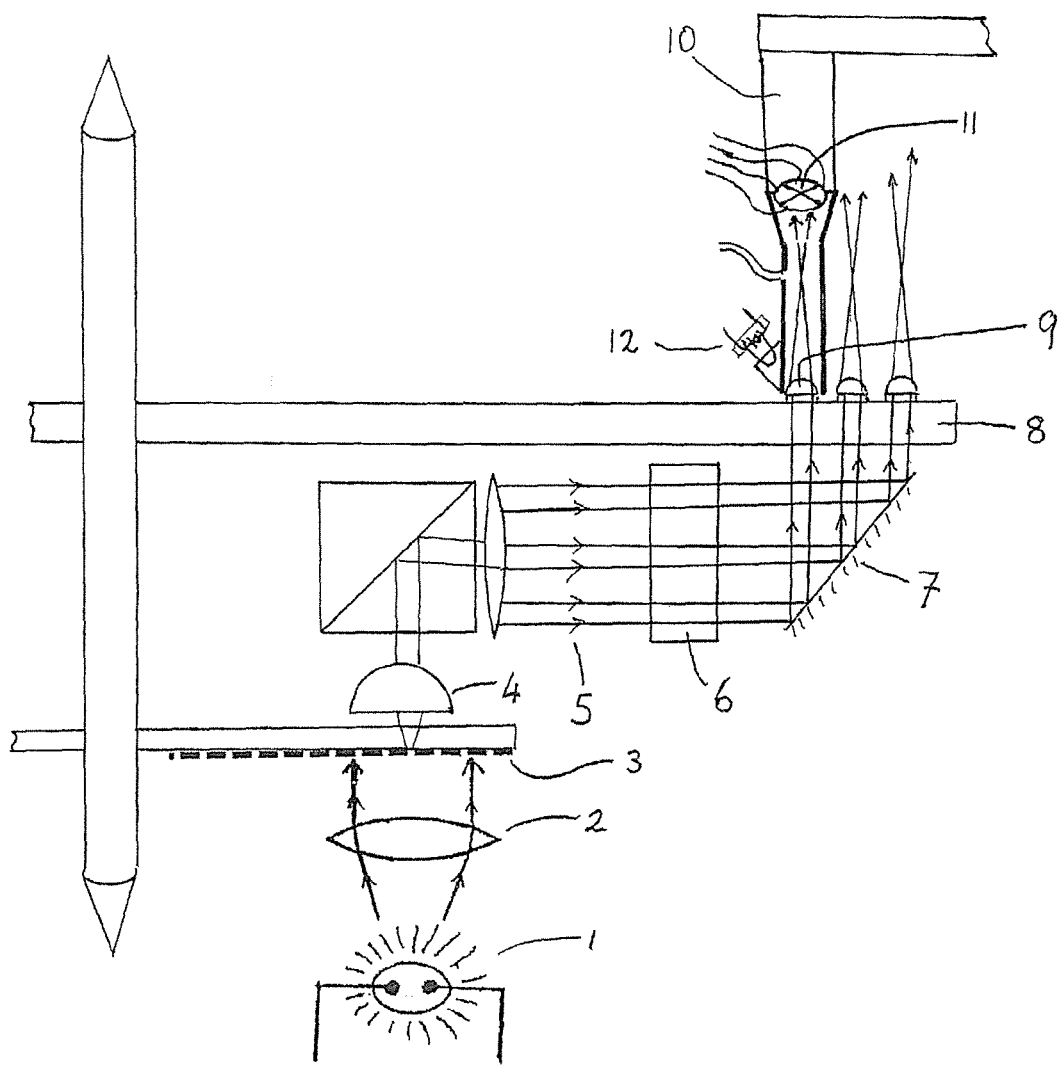
FIG. 45 illustrates a 'pick and place' robot for moving micro-lenses onto the top glass plate of various embodiments of the present invention.

FIG. 45 illustrates a 'pick and place' robot that moves micro-lenses onto the top glass plate (of various embodiments) using a quadrant photodiode to intercept the beam and thus provide positional feedback to place each one accurately with the optical axis of the micro-lens co-incident with the beam axis. A pulse of short wavelength light then polymerises the optical adhesive, fixing the micro-lens to the glass plate.

Referring to FIG. 45, light from a light source 1 passes through a lens 2 and then passes through pre-formed the holes in a metal sheet 3 (or alternatively through the cores of a fibre bundle). On the other side of the sheet 3/bundle, the light from each hole/core is collimated by a lens 4 as separate beams 5 and passes through image converter 6 and a mirror 7, which reflects it to a glass plate 8. A pick and place robot 10 lifts a micro-lens 9 and moves it across until a quadrant photodiode 11 detects that has encountered a beam. The differential output from the quadrant photodiode is then used to position the lens exactly collinear with the beam. A pulse of short wavelength light from light source 12 polymerises optical adhesive and fixes the lens in position. All the optical components between the plates must be rigidly fixed with respect to one another. The metal sheet 3 and glass plate 8 (or alternatively, fibre bundle and glass plate 8) are rigidly fixed together, and they and their rotational axes are fixed relative to the other optical components.

FIGS. 46A to 46D illustrate how uniform sub resolution holes at the polished face of the bundle centred within the exposed tips of the cores may be made for the High resolution NSOM embodiments of this invention.

Figure 46A:
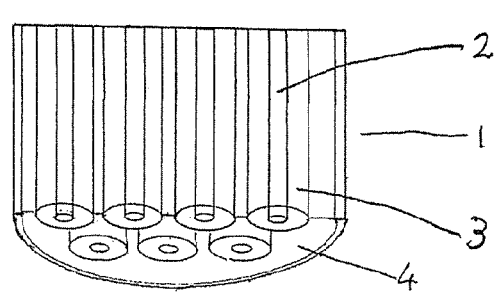
FIGS. 46A to 46D illustrate how uniform sub resolution holes at the polished face of the bundle centred within the exposed tips of the cores may be made for the High resolution NSOM embodiments of this invention.
Figure 46B:
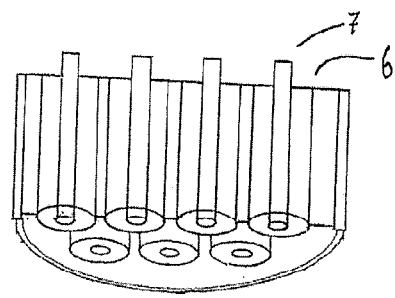
Figure 46C:
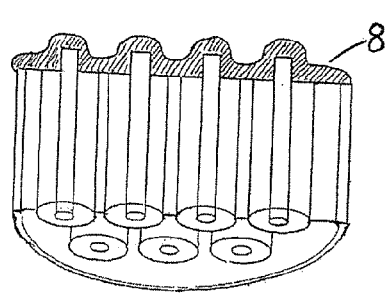
Figure 46D:
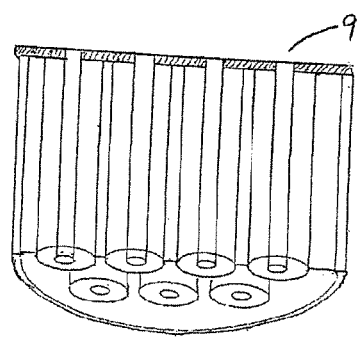

Referring to FIG. 46A, the bundle 1 is made of fibres each of which has a sub core 2 that is resistant to etching. This sub core is much smaller than is able to guide light. The sub core is surrounded by a normal core 3 and this is surrounded by a lower refractive index cladding 4. Referring to FIG. 46B, a bundle made from these fibres has a face polished and etched 6 leaving the sub cores 7 projecting from the bundle matrix. Referring to FIG. 46C, a layer of metal 8 is deposited on this face. Referring to FIG. 46D, some of this metal has been polished away leaving exposed core tips 9.

Figure 47:
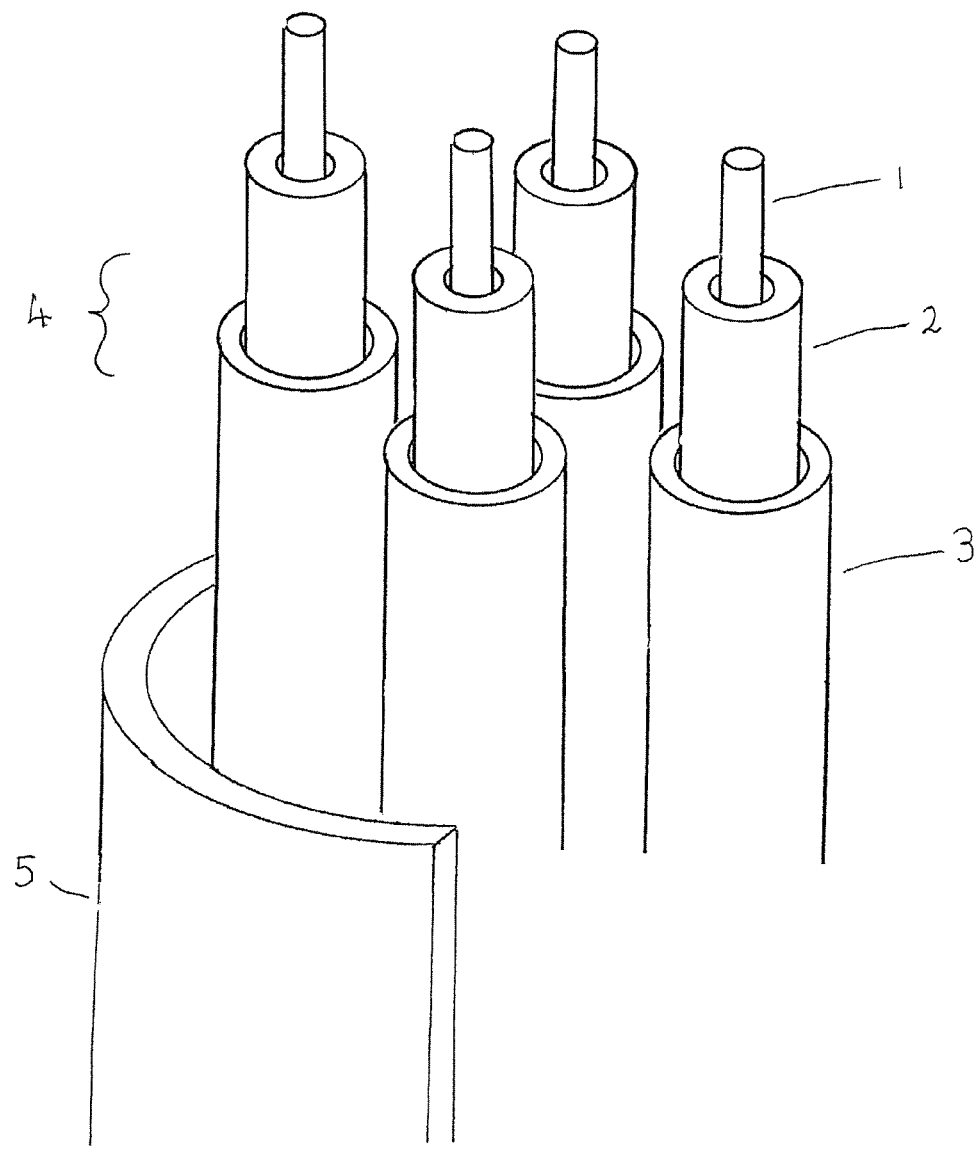
FIG. 47 illustrates the construction of the preform used in the embodiment of FIGS. 46A to 46D.

FIG. 47 illustrates the construction of the preform used in FIGS. 46A to 46D. The preform comprises a central rod of etch resistant glass 1. The RI of this glass is unimportant as it is drawn to a thickness that will not guide light. This is surrounded by a tube 2 of a high RI glass that will become the core. Surrounding both of these is another tube 3 of lower RI glass that will become the cladding matrix. A large number of these units 4 are bundled together and surrounded by a larger external tube 5 prior to final drawing.

Figure 48:
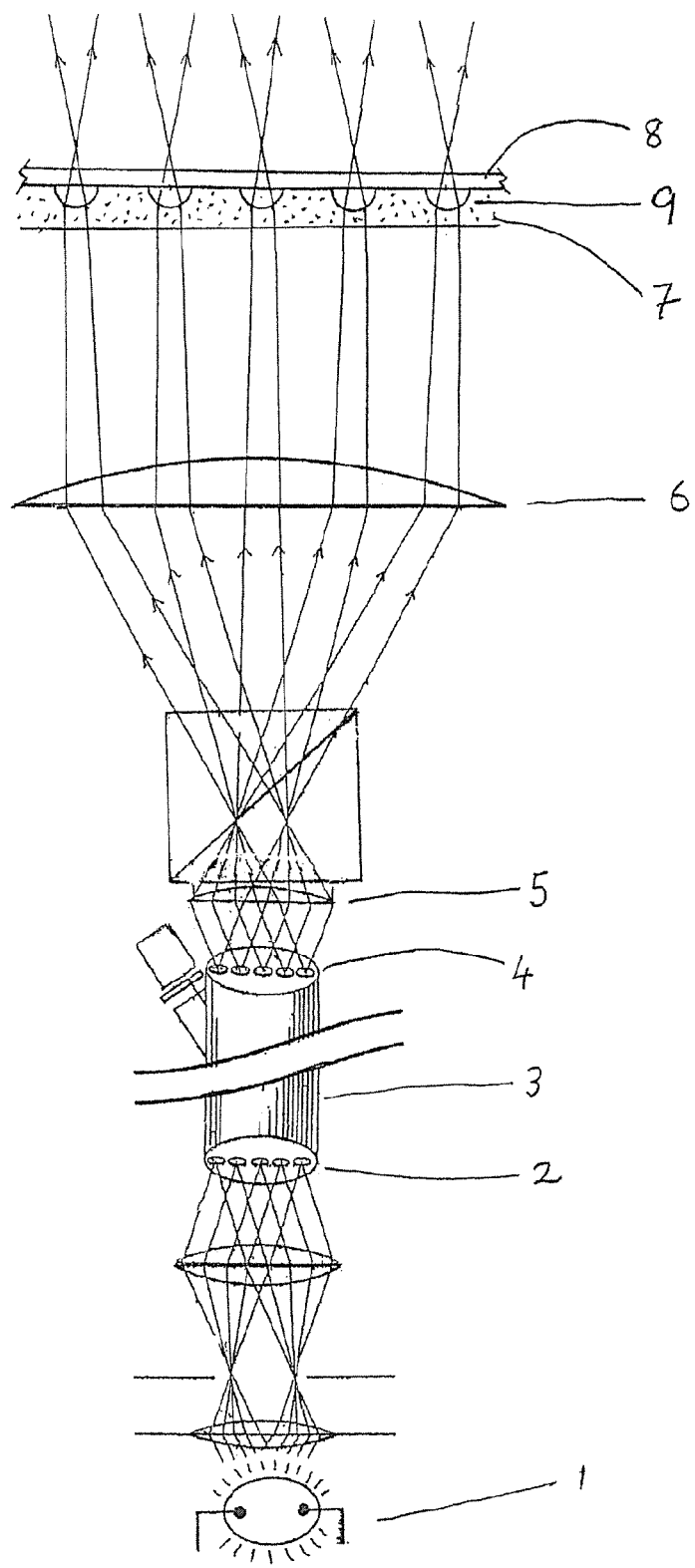
FIG. 48 is a schematic view of a microscope according to an embodiment of the present invention.

FIG. 48 is a schematic view of a microscope according to an embodiment in which micro-lenses on an expanded plate are formed in situ by the polymerisation of an optical material on the plate. The light that causes the polymerisation is emitted by the cores of the bundle, so alignment is automatically effected. Light from a light source 1 of a wavelength capable of polymerising a transparent optical adhesive material, passes into the cores at the proximal tip 2 of an optical fibre bundle 3. The light passes to the other end of the bundle 4 and is emitted. The light passes through a lens 5 which collimates the light from each core into a pencil beam. These beams are converged by a field lens 6 which brings them to a Gaussian waist in a fluid monomer 7 which is on the expanded plate 8. The light forms micro-lenses 9 adherent to the plate that are optically precisely aligned with the core that delivered the light. The monomer is drained away leaving the lenses free in the air. Further light completes the process. All the optical components are kept in rigid alignment once the micro-lenses have been formed.

Alternatively, negative lenses may be formed by polymerisation using light from the cladding. Both positive and negative micro-lenses will increase the NA of the light passing through them. A further alternative that may be employed, when the micro hole array is on a glass sheet rather than a fibre bundle, is to start with the micro-lens array plate and to project a demagnified series of spots onto photoresist on the sheet of glass. Development of the photoresist and metallisation will result in a matching set of pinholes that can be employed in conjunction with the expanded micro-lens plate that formed them.

Figure 49:
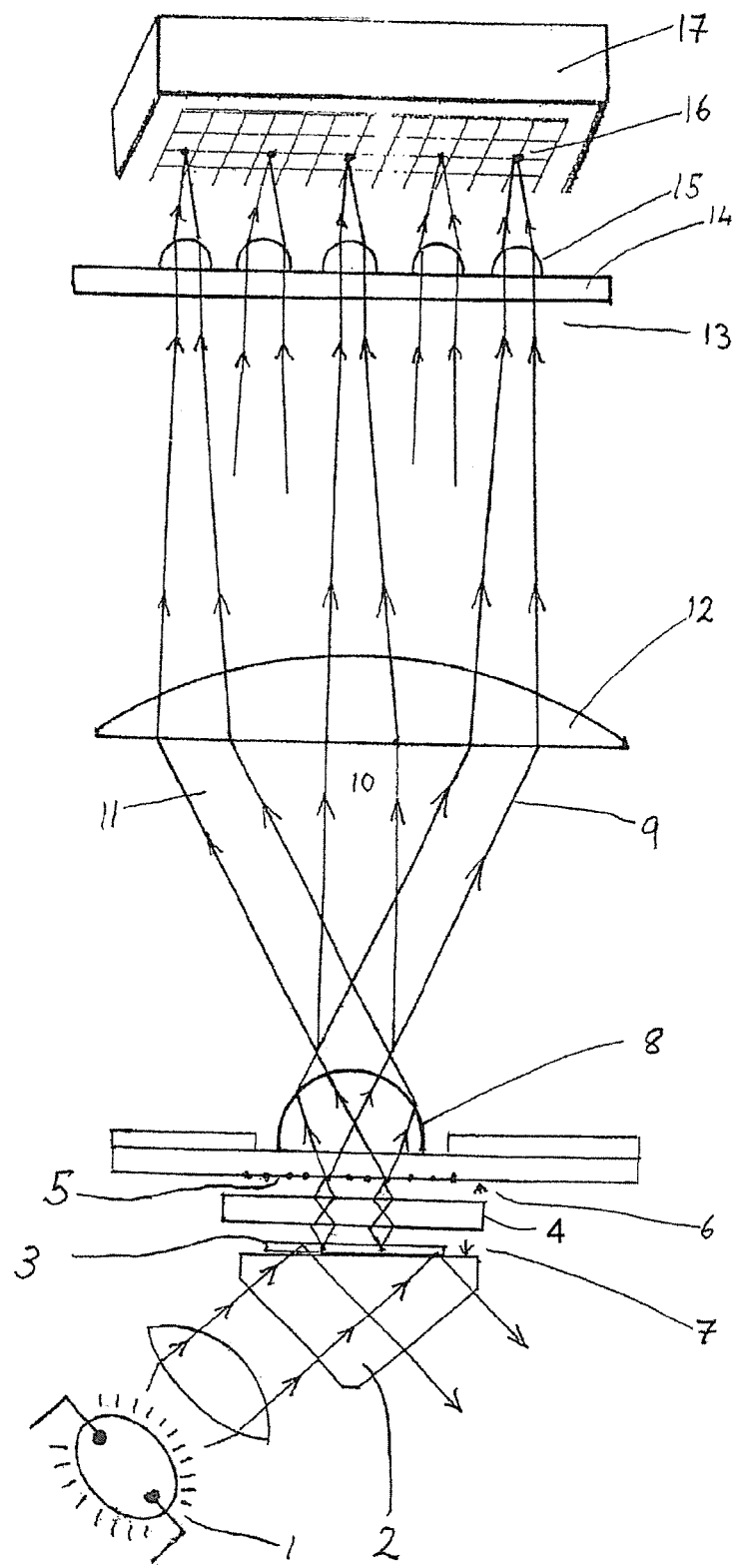
FIG. 49 illustrates a possible optical design for a metamaterial lens microscope in a total internal reflection fluorescence, TIRF, configuration according to an embodiment of the present invention.

FIG. 49 illustrates a possible optical design for a meta-material lens microscope in a total internal reflection fluorescence, TIRF, configuration according to an embodiment of the present invention. Firstly, a discussion of the difficulties that need to be addressed when implementing a microscope based on negative refractive index materials (i.e. meta-materials) may be found in U.S. Pat. No. 8,119,960 (Fukayama), the content of which is incorporated herein by reference. In addition, more recent work by the US National Institute of Standards and Technology (NIST) performed in collaboration with the University of Maryland, Syracuse University and the University of British Columbia, have demonstrated a meta-material Vesalago lens that operates in the ultraviolet and has a wide angle of acceptance (See *All Angle Negative Refraction and Active Flat Lensing of Ultraviolet Light*, Xu, Agrawal, Abashin, Chau and Lezec, Nature online 497 (2013) 470-474). The lens is formed from alternating layers of silver and titanium dioxide. A thin opaque layer of nickel with sub-resolution holes on one side of this lens could be used to project sub-resolution points of ultraviolet light into a specimen on the other side. These points of ultraviolet light could generate fluorescence and this fluorescence could be used for super-resolution imaging (as discussed below by reference to FIG. 49).

Briefly, however, meta-material lenses have some special properties that may make it difficult to integrate them into conventional optical systems. The meta-material lenses described in U.S. Pat. No. 8,119,960 for use in an optical microscope have extremely high spatial resolution and zero magnification (more accurately 1:1 magnification) the spatial dimension of the image in the Z direction, i.e. along the optical axis, is very small.

A meta-material lens transfers very high spatial frequencies to the image. These are too high to be sampled by any conventional pixelated detector. These images also cannot be magnified by a conventional lens objective (as in a compound microscope) without information loss. The evanescent wave information is not transferred to the image plane. However, it seems likely that the super magnification principle described herein could be used to sample this information and to present it in a way that could be assimilated by a standard CCD detector array.

Referring to FIG. 49, a light source 1 shines light into a prism 2 which is reflected by TIR from the hypotenuse of the prism. The hypotenuse carries a very thin layer of the specimen 3 under examination. Fluorescence from sub resolution particles in this specimen passes through a metamaterial lens 4 and the energy is converged to layer/surface 5. This layer/surface holds a sparse array of fluorescent nano particles. These nano particles must be able to be excited by the wavelength emitted from the sub resolution particles, that is, the particles in the specimen. The nano particles must be considerably smaller than the wavelength of light and they must be separated from one another by more than the resolution distance of the objective lens in this system. Also the distances 6 and 7 between meta-material lens 4 and, respectively, layer/surface 5 and prism 2 must be a small fraction of a wavelength.

The light emitted from these nano particles passes through a lens 8, the light from each particle forming separate collimated beams 9, 10, 11. These collimated beams encounter a field lens 12, which converges them to Gaussian waists at a plane 13. The light then passes through a glass sheet 14 and each Gaussian waists then encounters a micro-lens 15, which focuses it to a spot 16 on the surface of an EM CCD 17. In operation the prism 2 holding the specimen and the EM CCD 17 are moved in unison.

It is also possible for the specimen 3 to be on plate 5 and for the array of fluorescent nano particles to be in position 3. The construction of the micro-lens plate would have to done with the lenses put in position under active control using the light from the nano particles to provide alignment.

FIG. 50A is an image taken through the tip of a bundle when the cores at the other end are illuminated (viz. in 'normal illumination mode').

FIG. 50B shows "black holes" at the tip of the bundle when the bundle is exposed to cladding mode illumination, that is, through a coupling prism at the side. This image is of a Sumitomo (trade mark) high resolution 2 mm bundle.

FIG. 50C shows the illumination intensity distribution from a TEM oo laser, and FIG. 50D shows the illumination intensity distribution from a doughnut mode laser.

FIG. 50E shows the increase in certainty of position/resolution of the spot position that can be obtained with STED when the image of FIG. 50D is subtracted from that of FIG. 50C.

Figure 51:
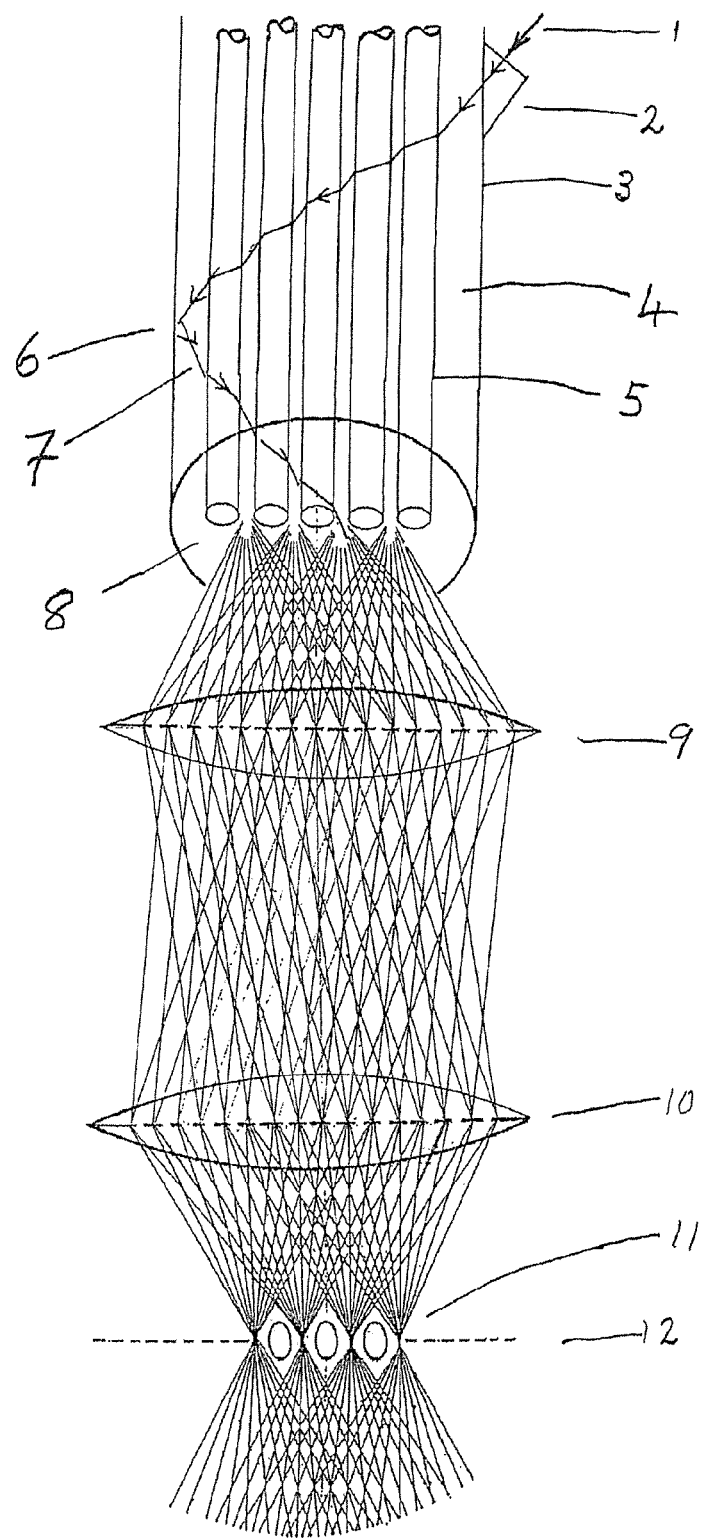
FIG. 51 shows a ray diagram illustrating the formation of the 'black holes' according to an embodiment of the present invention.

FIG. 51 shows a ray diagram illustrating the formation of the 'black holes'. A ray of light 1 passes through a prism coupler 2 and enters fused optical fibre bundle 3. The ray passes through the cladding 4 and the cores 5. At the opposite side of the bundle 6, the ray encounters the glass air interface and undergoes total internal reflection 7. The ray continues its 'dog-leg' path through the bundle until it reaches polished bundle tip 8. It emerges with many other beams, predominantly being emitted from between the cores. These rays encounter collimating lens 9 and focusing lens 10. A series of black holes 11 are formed in the focal plane 12. Light that leaves the tip through the cores focuses at the centre of these black holes. All other regions of the specimen experience the passage of rays from both the core and the cladding.

Figure 52:
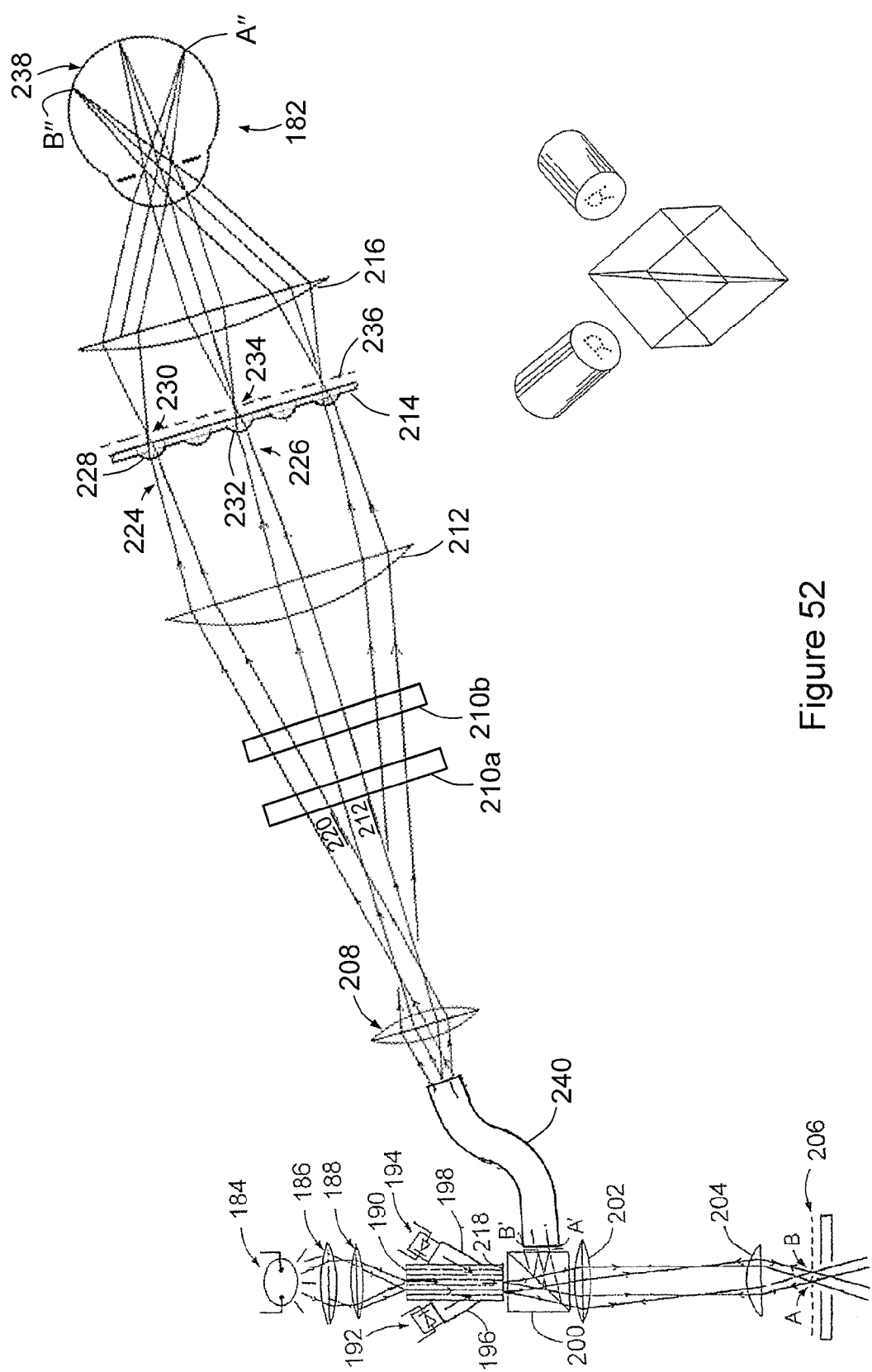
FIG. 52 is a schematic view of a microscope according to another embodiment of the present invention, shown with a user's eye.

FIG. 52 is a schematic view of a microscope according to another embodiment of the present invention (shown with a user's eye 182), which uses the matching mirror image faces of a cleaved bundle on either side of the beam splitter cube.

Referring to FIG. 52, the microscope includes a light source 184, a pair of lenses 186, 188 and an optic fibre bundle 190. The microscope also includes de-activation light sources 192 and 194 and respective prisms 196 and 198 for coupling the de-excitation light from de-activation light sources 192 and 194 into the cladding of fibre bundle 190, a beamsplitter in the form of a beamsplitter cube 200, a collimating lens 202 and an objective lens 204 for brings light to a focus at a plane 206 inside a specimen (not shown).

This microscope also includes, for processing return light in the manner described below, an image transfer collecting bundle 240, a collimating lens 208, filters 210a, 210b, a focussing lens 212, a micro-lens array plate 214 and an ocular lens 216. As illustrated schematically in the detail, at beamsplitter cube 200 the cores of fibre bundle 190 and the cores of image transfer collecting bundle 240 are aligned, each of these bundles having been formed from a single bundle.

In use, excitation light from light source 184 is focused by lenses 186, 188 into the cores of fibre bundle 190. Light from the de-activation sources 192, 194 is coupled by prisms 196, 198 into the cladding of fibre bundle 190. Light from both de-activation sources 192, 194 is emitted from the distal end 218 of fibre bundle 190, passes through beamsplitter cube 200 and is collimated by collimating lens 202. The light then passes to objective lens 204, which brings it to a focus at plane 206 inside the specimen.

Light emitted from, for example, sub-resolution fluorescent objects A and B in the specimen in focal plane 206 returns through objective lens 204 and collimating lens 202, and is brought to a focus as separate diffraction limited spots at A' and B' at an exit face of beamsplitter cube 200. Light emitted by that face is collected by image transfer collecting bundle 240, collimated by collimating lens 208 forming respective beams 220 and 222, and passes through filters 210a, 201b. The beams 220 and 222 then pass through focussing lens 212, which focuses them to respective Gaussian waists/Airy discs 224 and 226. The now parallel light beams (each emitted from a sub-resolution area in the specimen) then encounter micro-lens array plate 214; the optical elements in the micro-lens array match the projected spot pattern in the image. Thus, micro-lens 228—for example—brings the light emitted from A to a focus at 230, while micro-lens 232 brings the light from B to a focus at 234. These focal points 230 and 234 are located in a plane 236. Ocular lens 216 then converges and collimates the light from plane 236 and brings the image to the retina 238 as focused spots A" and B" respectively.

Synchronised scanning between the optic fibre distal tip 218 and micro-lens array plate 214 creates a continuous and properly sampled super-resolution image.

Figure 53:
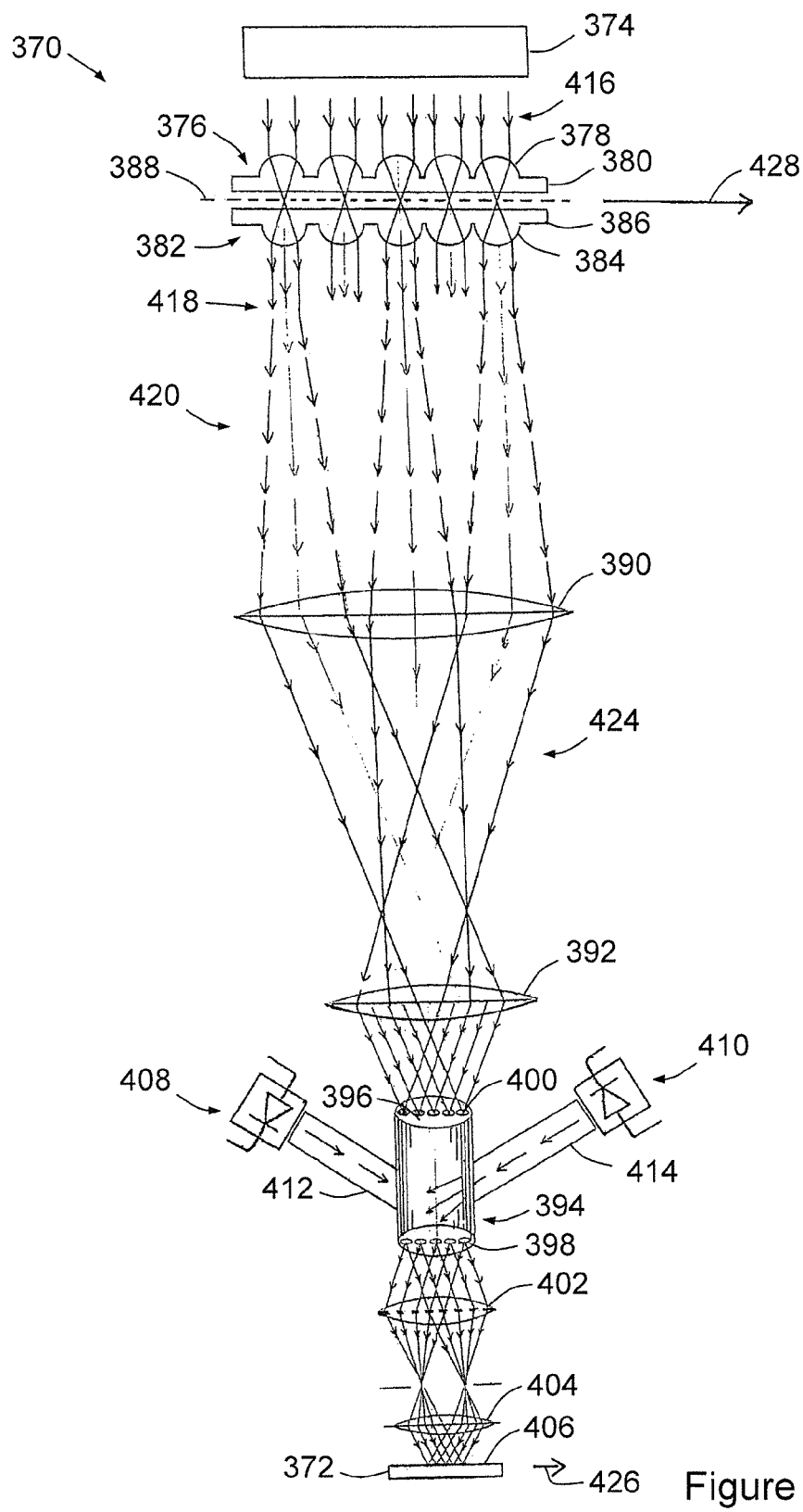
FIG. 53 is a schematic view of a photolithography apparatus according to another embodiment of the present invention, shown with a silicon wafer.

FIG. 53 is a schematic view of a photolithography apparatus 370 according to another embodiment of the present invention, shown with a silicon wafer 372. Apparatus 370 is adapted for high density photolithography applications, such as for the exposure of resist material on silicon wafers (for example) in the fabrication of semiconductor chip devices.

Photolithography apparatus 370 includes a TEMoo laser 374 with an output wavelength that can activate the photoresist material on silicon wafer 372, a first micro-lens array 376 (comprising micro-lenses or lenslets 378 on a transparent plate 380), a second micro-lens array 382 (also comprising micro-lenses or lenslets 384 on a transparent plate 386) and, between the first and second micro-lens arrays 376, 383, a mask 388 that consists of a pattern defining the features desired to be transferred to the wafer 372. Each micro-lens 378 of first micro-lens array 376 brings a portion of the incident light to a diffraction limited point focus, the array of such foci being in the plane as that of mask 388. The mask 388 of this embodiment comprises a thin layer of chromium metal on a silica glass sheet substrate. Light incident on first micro-lens array 376 but not subsequently blocked by mask 388 passes to second micro-lens array 382, whose micro-lenses 384 match the micro-lenses 378 of first micro-lens array 376. The two micro-lens arrays 376, 382 are separated by a distance such that the foci of the micro-lenses 378 of first micro-lens array 376 are co-incident with the foci of the micro-lenses 384 of second micro-lens array 382.

Photolithography apparatus 370 also includes, optically downstream of micro-lens arrays 376, 382, a first lens 390, a second lens 392 and a fused fibre optic bundle 394 (with polished proximal tip 396 and distal tip 398, and comprising single moded cores 400). Downstream of fibre bundle 394, photolithography apparatus 370 includes a pair of lenses 402, 404 for focussing light to diffraction limited spots on the photoresist layer 406 of the silicon wafer 372.

Photolithography apparatus 370 also includes light sources 408, 410 for providing light with a wavelength that can de-activate the latent image in the photoresist (STED mechanism) or prevent the formation of the activated species in the photoresist (GSD mechanism), and respective coupling optics 412, 414 for coupling light from light sources 408, 410 into fibre bundle 394 so that the light passes as cladding modes along the bundle 394 to its distal tip 398.

In use, a collimated beam of light 416 of a wavelength that can activate the photoresist material is emitted from TEMoo laser 374 and encounters first micro-lens array 376. As explained above, each micro-lens 378 brings a portion of the incident light to a diffraction limited point focus in the plane of mask 388. The light that is not blocked by mask 388 passes to the set of matching micro-lenses 384 of second micro-lens array 382.

Consequently the light from micro-lenses 384 of second micro-lens array 382 emerges as narrow collimated beams 418 but, as these beams are narrow, they rapidly spread out as diverging cones of light 420. These cones of light 420 encounter first lens 390, which collimates the light from each cone to form collimated ray bundles 424. These collimated ray bundles 424 encounter second lens 392, which brings each beam to a focus at the polished proximal end of a respective, separate single moded core 400 at the proximal tip 396 of fibre bundle 394.

The light enters the cores 400 and passes along them to emerge from the distal tip 398. It then passes through the pair of lenses 402, 404 to form diffraction limited spots on the photoresist layer 406 of the semiconductor wafer 372.

Light from light sources 408, 410 is coupled into the cladding of the bundle 394 by coupling optics 412, 414. This light passes as cladding modes along the bundle 394 to the distal tip 398, and emerges from the distal tip 398 from between the cores 400 and hence is focused by the pair of lens 402, 404 as a reticulated pattern that surrounds the focused spots formed by the light from the cores 400.

Super-resolution photolithography is effected by moving the wafer in the direction shown by arrow 426. At the same time the mask 388 is moved in the direction shown by arrow 428 at a speed that allows the image of the mask 388 to maintain its position on the surface of wafer 372.

In this photolithography embodiment, the activating spot of light is surrounded by a ring of light of the reticulated cladding pattern or the doughnut mode. This shrinks/erodes the dimensions of the feature in both the X and the Y dimensions. Much of the 'real estate' on a silicon wafer chip, however, is taken up by linear tracks. Also, many of the devices fabricated in the silicon surface are made up of structures that are thin only in one direction (see, for example, an Ivy Bridge 22 nm tri-Gate Transistor.) Exposing the photoresist that forms the tracks or other thin structures using a halo of light for de-activation is thus inefficient, as the de-activated state for GSD processes in the photoresist has a finite decay time (and STED may require a light intensity that is too high to write many spots), so if a line is the desired feature it would be more efficient to write it as sections of a line in a few exposures rather than to fabricate it by exposures as a large number of spots.

Figure 54:
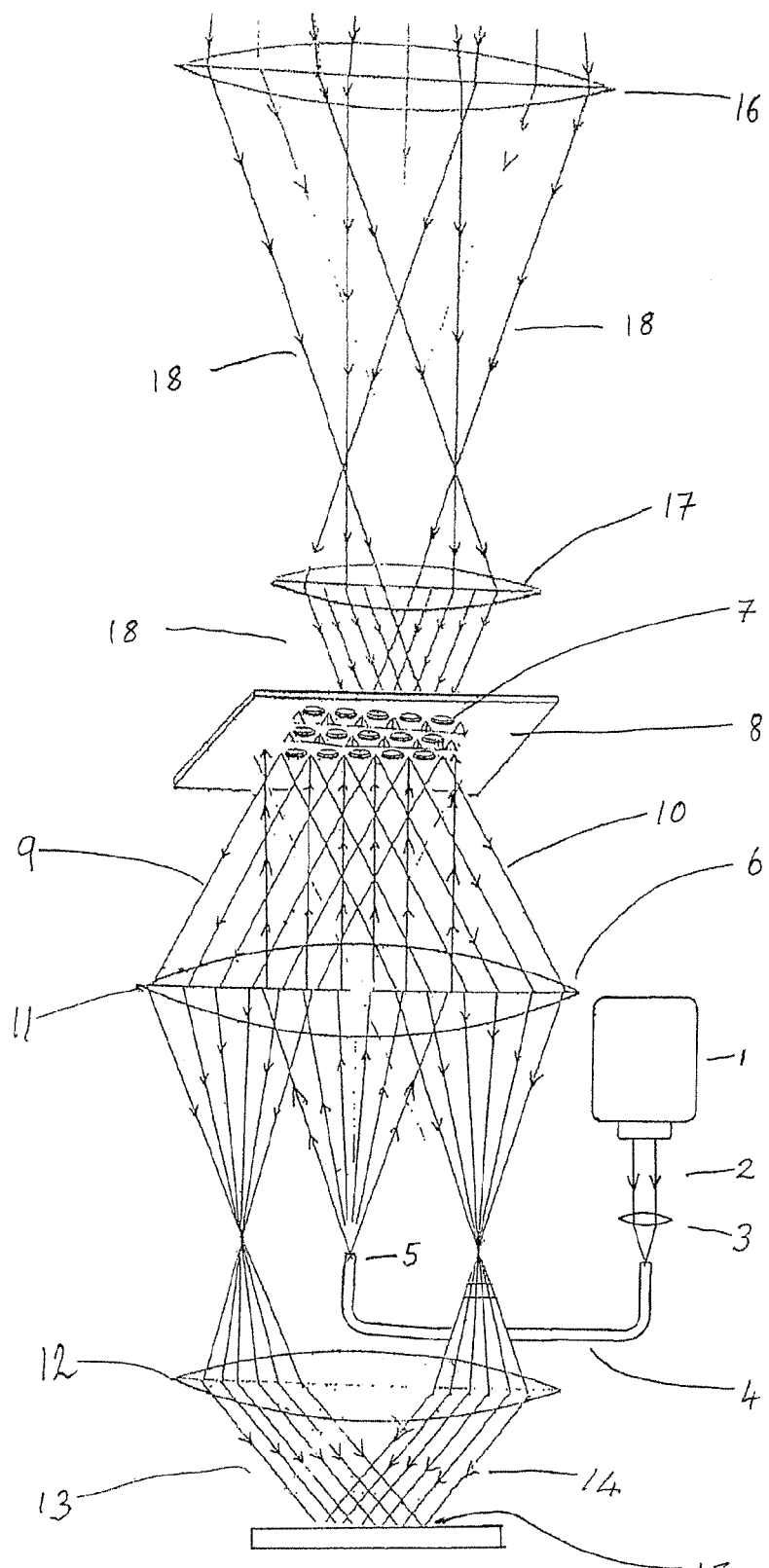
FIG. 54 is a schematic view of an alternative embodiment of the present invention adapted for the purpose of wafer fabrication photolithography.

FIG. 54 is a schematic view of an alternative embodiment adapted for the purpose of wafer fabrication photolithography. In this case the light of the deactivating wavelength is transmitted to the photo-masked area with an optical fibre. A laser 1 emits a beam of radiation 2 that is focused by a lens 3 into an optical fibre 4. The light is emitted from the other end 5 of the fibre 4 and is collimated by a lens 6 to impinge on an array of pinholes 7 in a reflective metal surface 8. A substantial proportion of the energy of this light is scattered into plus and minus first order diffraction beams 9 and 10, which pass through lenses 11 and 12 and, as beams 13, 14, recombines to build up a negative image of the pinholes on a photoresist area 15. This forms the de-excitation pattern. On the other side of the metal surface 8 are located lenses 16 and 17, which carry the excitation light 18 from a light source (not shown) and form an image of a mask (not shown, cf. FIG. 53). The light from this image passes through the pinholes 7 to expose the photoresist layer 15. Synchronous motion of mask and chip takes place during exposure. Note that the optics above the metal surface 8, namely components 16, 17 and 18, are the same components as the corresponding components of FIG. 53.

Figure 55:
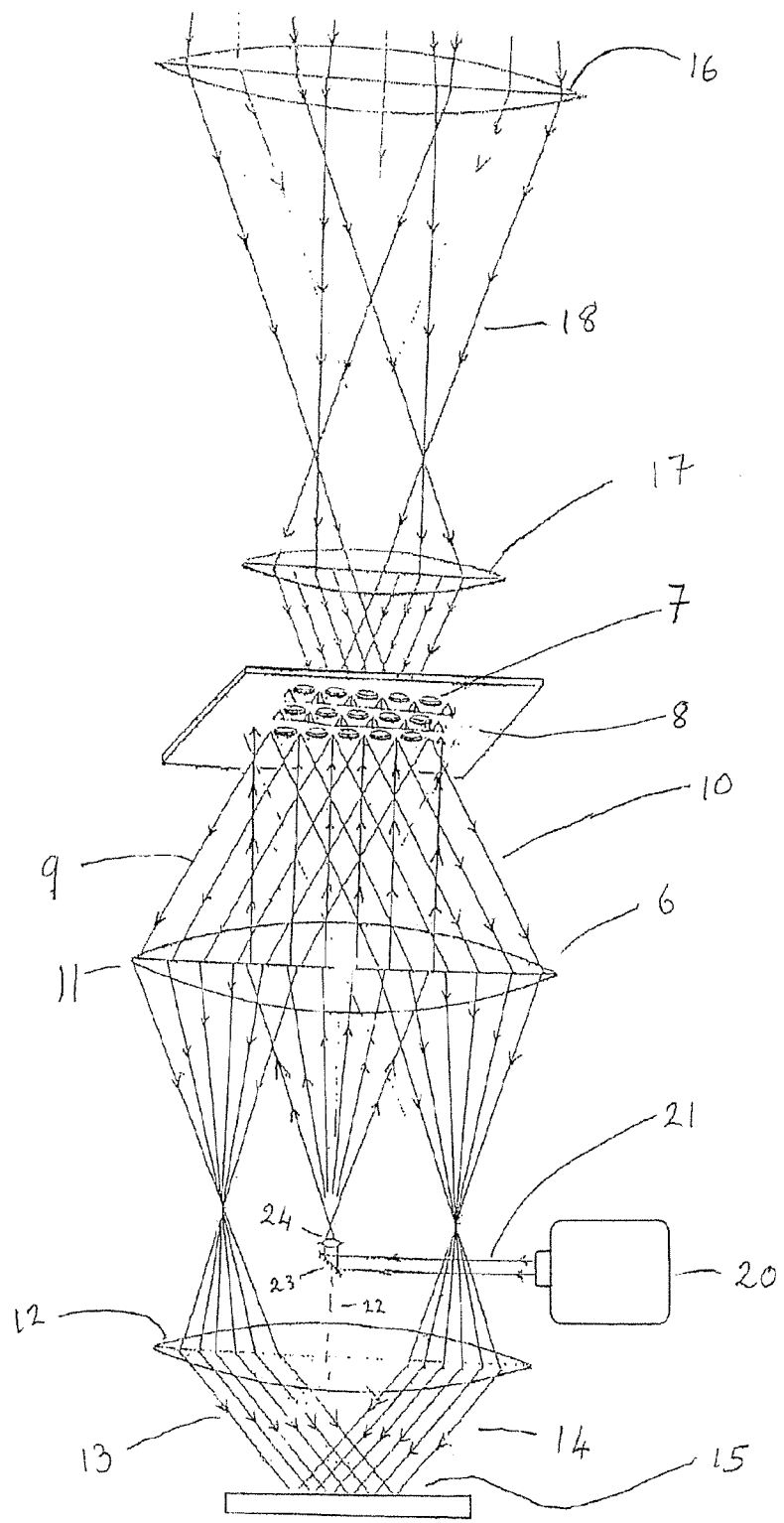
FIG. 55 is an embodiment of the present invention adapted for photolithography.

FIG. 55 is an embodiment for photolithography. This is identical to that of FIG. 54, except that the laser beam 21 passes directly from a laser 20 to the optical axis 22 and is reflected by a 90° mirror 23. The light then goes through a short focal length convex or concave lens 24 and proceeds to metal surface 8 in the same way as in FIG. 54. Direct delivery of the laser beam may give more ready control over polarisation state. Synchronous motion of mask and chip takes place during exposure. The optics above the metal surface 8, namely components 16, 17 and 18, are again the same components as the corresponding components of FIG. 53.

Figure 56:
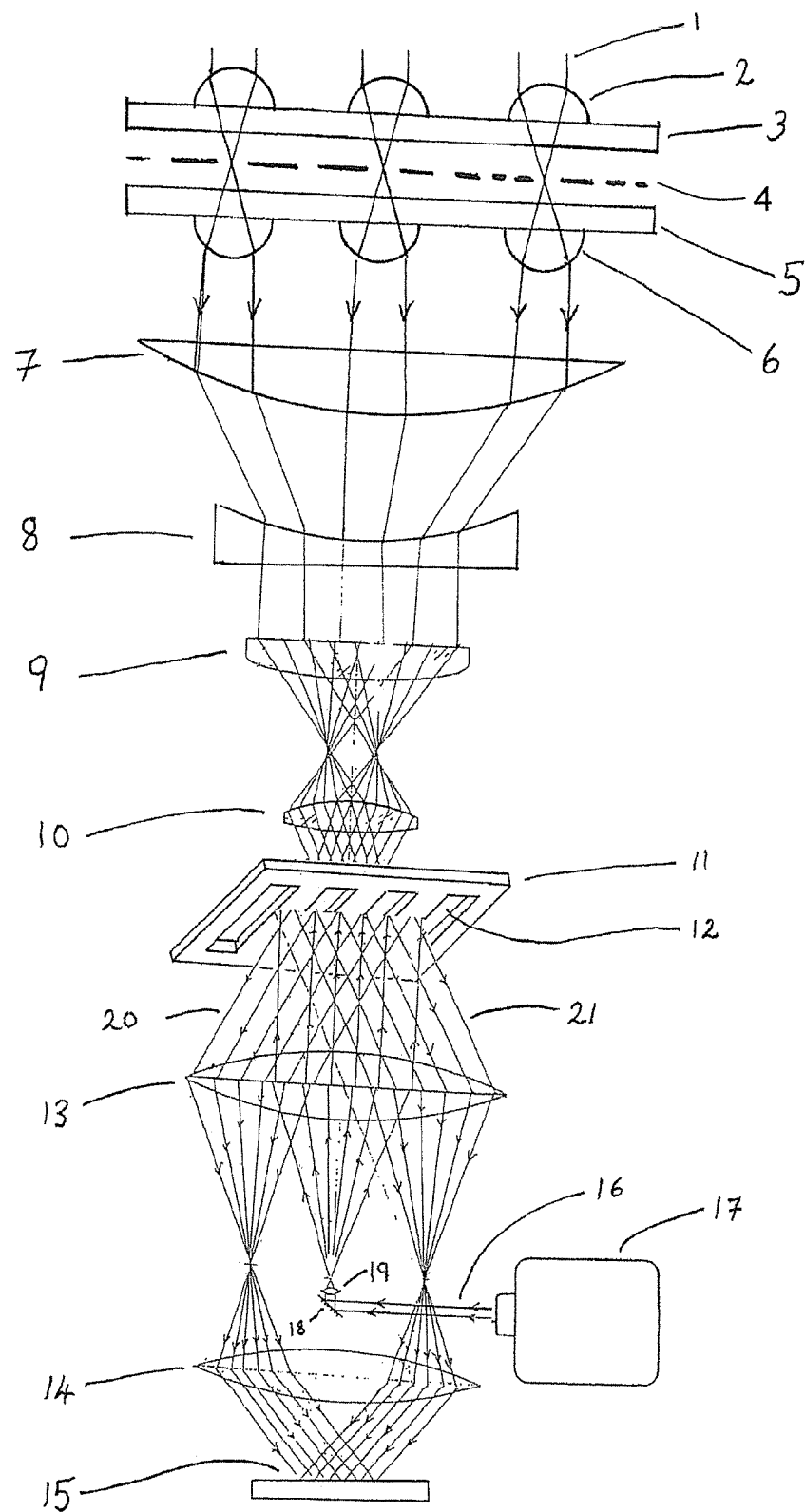
FIG. 56 is a schematic view of an embodiment of the present invention for photolithography.

FIG. 56 is a schematic view of an embodiment of the present invention for photolithography. The use of slots rather than holes in the plate offers some advantages. A beam of activating wavelength light 1 passes through an array of micro-lenses to which are positioned on a glass plate 3. The beam is focused to a series of diffraction limited spots that are in the plane of a metallised mask 4. Some of the light is blocked by the features of the mask and the remainder of the light expands out and passes through glass plate 5 and a matching set of micro lenses 6. The beams pass through a series of lenses 7, 8, 9 and 10, which focus the beams as a series of spots onto a metal sheet 11 that has a series of extremely fine slots 12 in it. Some of the light passes through the slots and is then converged by lenses 13 and 14 to form a focus on a photoresist layer on the surface of a wafer 15. A de-activating light beam 16 is generated by a light source 17 and passes to mirror 18 and lens 19. The lens 19 diverges the light and when the light meets lens 13 it is projected onto the slotted metal sheet 11. The slotted sheet acts as a diffraction grating and the +1 and −1 order beams are shown by 20 and 21. These are converged by the lenses and recombine to form an interference pattern in the photoresist layer on the surface of the silicon wafer. In the operation of this device, the slotted sheet 11 and the two glass plates 3, 5 provided with micro-lenses are moved simultaneously and, independently, the mask 4 and the wafer 15 are also moved together.

Figure 57:
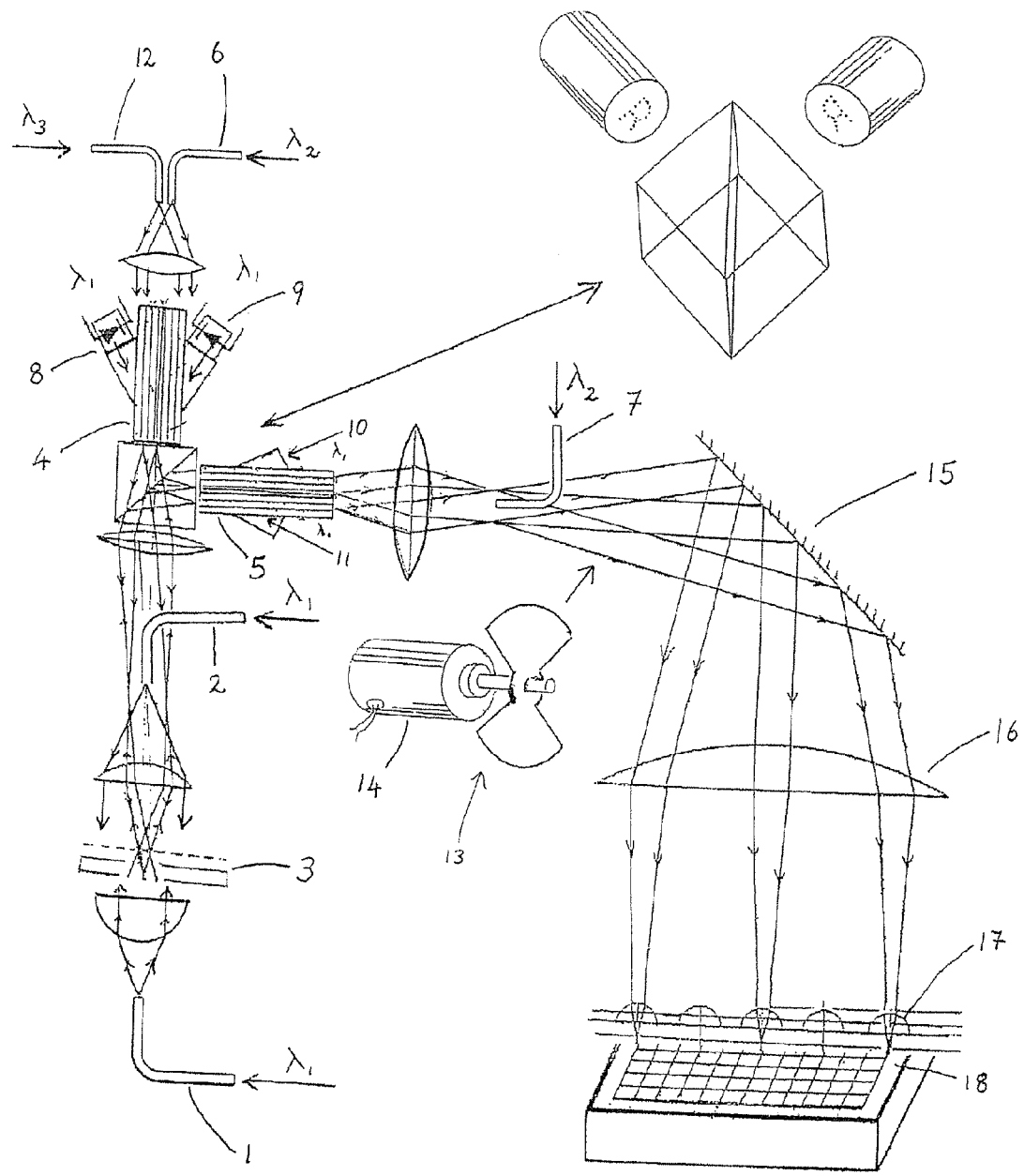
FIG. 57 is a schematic view of an embodiment of the present invention for optical microscopy with phototransformable optical labels.

FIG. 57 is a schematic view of an embodiment for optical microscopy with phototransformable optical labels. This embodiment employs three wavelengths, used in alternation. One wavelength is used to activate selected parts of the whole specimen, the second wavelength to deactivate the majority of the activated parts of the specimen and the third wavelength to excite fluorescence from the small areas or single molecules that remain. This provides the fluorescence to acquire the image. In this embodiment, a further light source emitting light at a de-activating wavelength is used to de-activate the entire field of the specimen.

Referring to FIG. 57, light of wavelength λ1 from a first light source (not shown) is delivered by either optical fibre 1 or 2, which shines the light uniformly on the specimen on a stage 3 to de-activate the fluorescent compound that has been used to label the structures that it is desired to visualise. Activating light of wavelength λ2 is then shone onto the specimen through the cores of bundle 4 or bundle 5. This light comes from a second light source (not shown) and delivered by optical fibre 6 or 7. This forms diffraction limited spot volumes of activated label within the specimen. De-activating wavelength light of wavelengths λ1 from sources 8 and 9 (or admitted at bundle 5 at 10 and 11) is coupled into the cladding of the bundles; this light also illuminates the specimen. It forms a network surrounding the diffraction limited activated spots and erodes them into smaller volumes. Thus the only fluorescence that can arise will be from these eroded volumes. Light of wavelength λ3 from an excitation source (not shown) is admitted via optical fibre 12 and then shone onto the specimen through the cores of the bundle 4. This light makes the eroded spots fluoresce. The blades 13 of an optical chopper 14 are moved to allow the beams of fluorescent light passing through the cores of bundle 5 to pass and to be reflected by a mirror 15 onto a field lens 16 and to an array of micro-lenses 17. The micro-lenses focus the beams onto the surface of the EMCCD array 18. After a period of time sufficient to expose the pixels, the shutter is moved to block the beam path 12. The EM CCD array and the specimen are both moved by an appropriate amount and the process above is repeated. The exposure on the EM CCD array is cumulative, and readout takes place after enough spots are sampled to satisfy the Nyquist criterion. The process could take place with reasonably rapidity.

Figure 58:
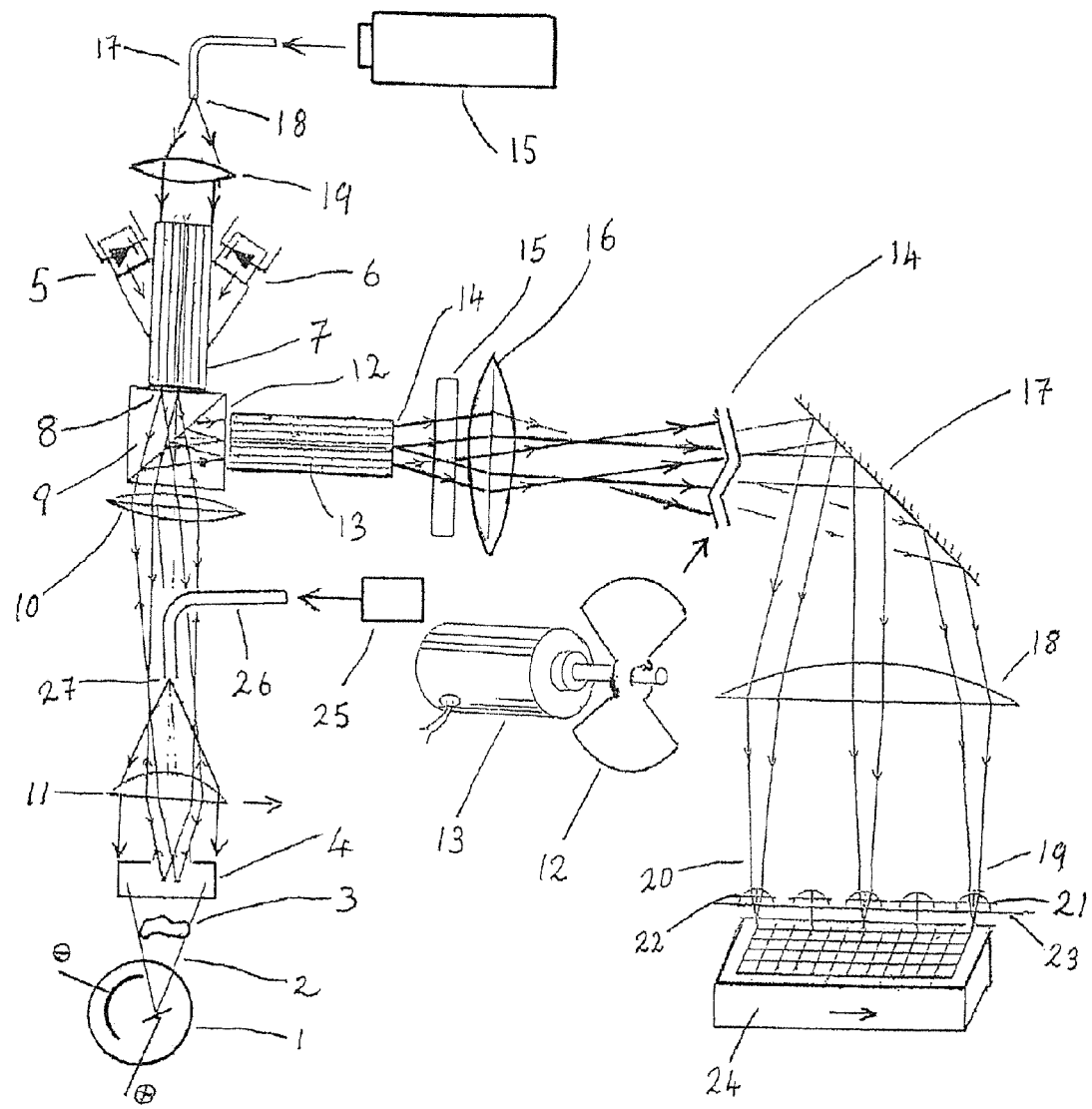
FIG. 58 is a schematic view of a microscope according to a further embodiment of the present invention, for use with x-rays.

FIG. 58 is a schematic view of a microscope according to a further embodiment that is comparable to that of FIG. 57, but for use with x-rays. This microscope does not image the x-rays directly but relies on visualising a repetitively activated latent image in an x-ray image plate material.

This microscope could be of use in the following application areas.

High-resolution x-ray images
3-D reconstruction of an x-ray intensity pattern (wave front)
Imaging the active areas, or defects causing the activation in the Eu:Ba F Br crystal.
Other high energy processes where repetitive excitations are caused.
In other synchrotron work.

Referring to FIG. 58, an x-ray source 1 emits pulses of x-rays 2 which pass through a specimen 3. The x-rays then pass into a block of (preferably monocrystalline) Eu:Ba F Br 4 producing a metastable high energy state of the europium dopant. Red light from light sources 5 and 6 passes into the cladding of optical fibre bundle 7. This light is emitted through the bundle tip 8 and passes through the dichroic beam splitter cube 9 and is focused by lenses 10 and 11 into the Eu:Ba F Br block 4. These deactivate the majority of the excited europium. The blade 12 of an optical chopper 13 is then removed from the beam path 14. Another source of red light 15 (such as a helium neon laser) is turned on and the 633 nm beam is focused into optical fibre 17. Light diverging from the core of the other end of the optical fibre bundle 18 is collimated by lens 19 and passes into the cores of optical fibre bundle 7. This light emerges from the other end of the bundle 8 and passes through the dichroic beam splitter and through lenses 10 and 11 to focus as a series of spots within the Eu:Ba F Br block. Stimulated emission causes the high energy metastable europium species within the spots to emit blue light. This blue light travels back to the dichroic beam splitter cube and is reflected to the matching mirror image tip 12 of bundle 13. The light passes through the cores to the other end of the bundle and emerges from the tips at 14 and passes through a red blocking filter 15. The light is collimated by lens 16 reflected by lens 17 and converged by field lens 18. The individual beam Gaussian waists 19 and 20 pass through micro-lenses 21 and 22 of the beam splitting plate 23. This brings the light to foci on an CCD array 24, forming an image.

The optical chopper blade 12 now moves back to block the beam at position 14 and a red light source 25 couples optical energy into an optical fibre 26. The beam of red light emerging from the other end of the fibre 27 is emitted on to lens 11 which collimates it to uniformly illuminate the Eu:Ba F Br block. This light discharges any remaining excited europium entities. Lens 11 and CCD array 24 are now moved by appropriate amounts and the process is repeated.

Figure 59A:
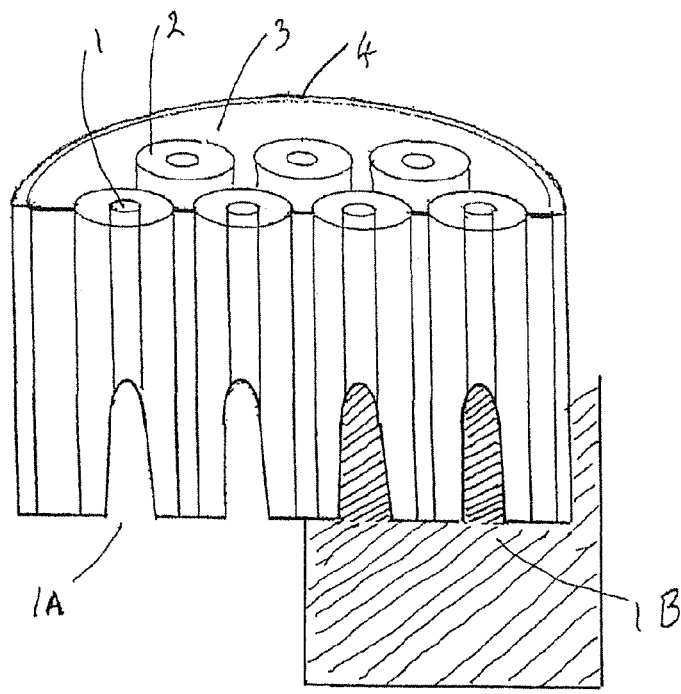
FIG. 59A relates to an embodiment of the invention that operates in NSOM mode using exciton enhanced tips, illustrating a technique for manufacturing a suitable bundle tip.
Figure 59B:
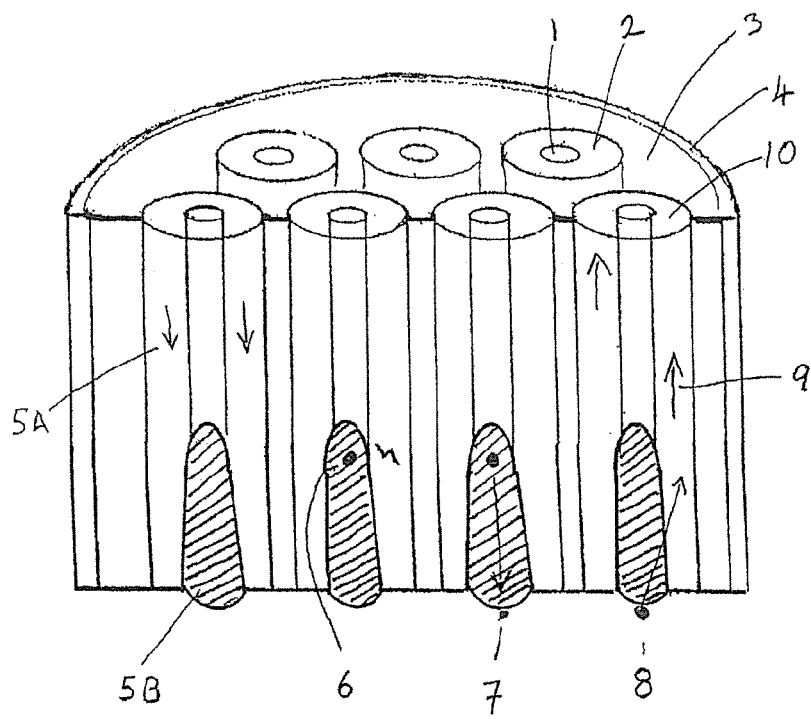
FIG. 59B illustrates the use of the bundle tip shown in FIG. 59B.

FIGS. 59A and 59B relate to an embodiment of the invention for use in NSOM mode using exciton enhanced tips. The enhancement of the signal obtained by the use of excitons generated in anthracene in a hollow tip scanning near field optical microscope has been demonstrated by Kopelman R. and Tan W. H. in *Near Field Optical Microscopy, Spectroscopy And Chemical Sensors*, Applied Spectroscopy Review 29 (1994) pp. 39 to 66.

In this embodiment for near field scanning optical microscopy NSOM, a process similar to fluorescence resonance energy transfer FRET is employed. In order to employee this method a special bundle tip is constructed, as shown in FIGS. 59A and 59B. Referring to FIG. 59A, this consists of a very thin sub core 1 surrounded by a normal core, which is embedded in a matrix of cladding 3. A layer of glass 4 surrounds the whole bundle. The thin sub core is of a soluble glass and can be etched out as shown at 1A. The tip of the bundle is immersed in molten anthracene or perylene or a similar compound. This is allowed to crystallise into the etched holes 1B. Referring to FIG. 59B, in use, light travels down the cores 5A into the anthracene 5B. This is absorbed to form an exciton 6 with energy in the crystal lattice. A fluorescent nano structure 7 in the specimen, embedded in an ice block, comes in contact with the anthracene. The energy is transferred to the fluorescent nano structure via an exciton in the anthracene crystal lattice. The nano particle shortly thereafter decays and emits Stokes shifted fluorescent light 9 that travels along the core of the fibre bundle 10 to a CCD. The apparatus required for this is the same as that illustrated in FIG. 47 except that the sub-core glass is mire siluble in the leachant.

The term 'mode conditioner' has been used herein. The control of the power of light coupled into the bundle and propagating at different angles (angular power distribution) may be important in some applications. The devices of FIGS. 60 and 61 can be used to control the modal power distribution.

Figure 60:
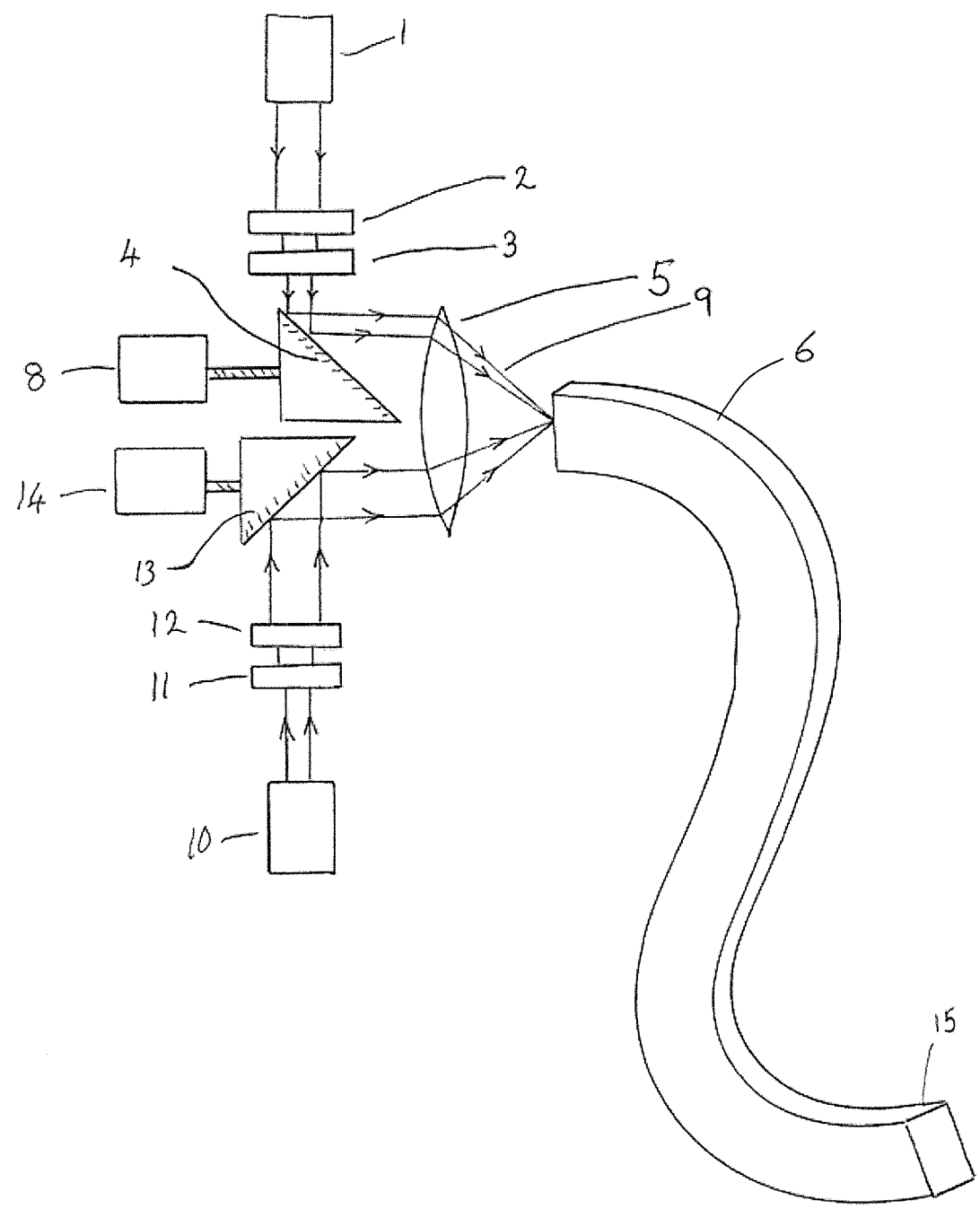
FIG. 60 is a schematic view of an apparatus according to an embodiment of the present invention for conducting mode conditioning.

For example, FIG. 60 illustrates an arrangement for controlling the light for the de-excitation beam. A beam of light from light source 1 passes through an anamorphic combination 2 and an afocal beam expander 3 stop the beam is then reflected from mirror 4 and passes through lens 5 which focuses it into the optic waveguide 6. A rectangular waveguide as illustrated may be preferable. The production of these may not be such a difficult fabrication problem since they may be cut from a thin flexible sheet. A motor 8 moves the mirror for and this changes the angle at which the beam 9 enters the waveguide. An additional light source may be coupled into the same waveguide as shown by the matching components 10, 11, 12, 13 and 14. The distal end 15 of waveguide 6 couples light to the fibre bundle.

Figure 61:
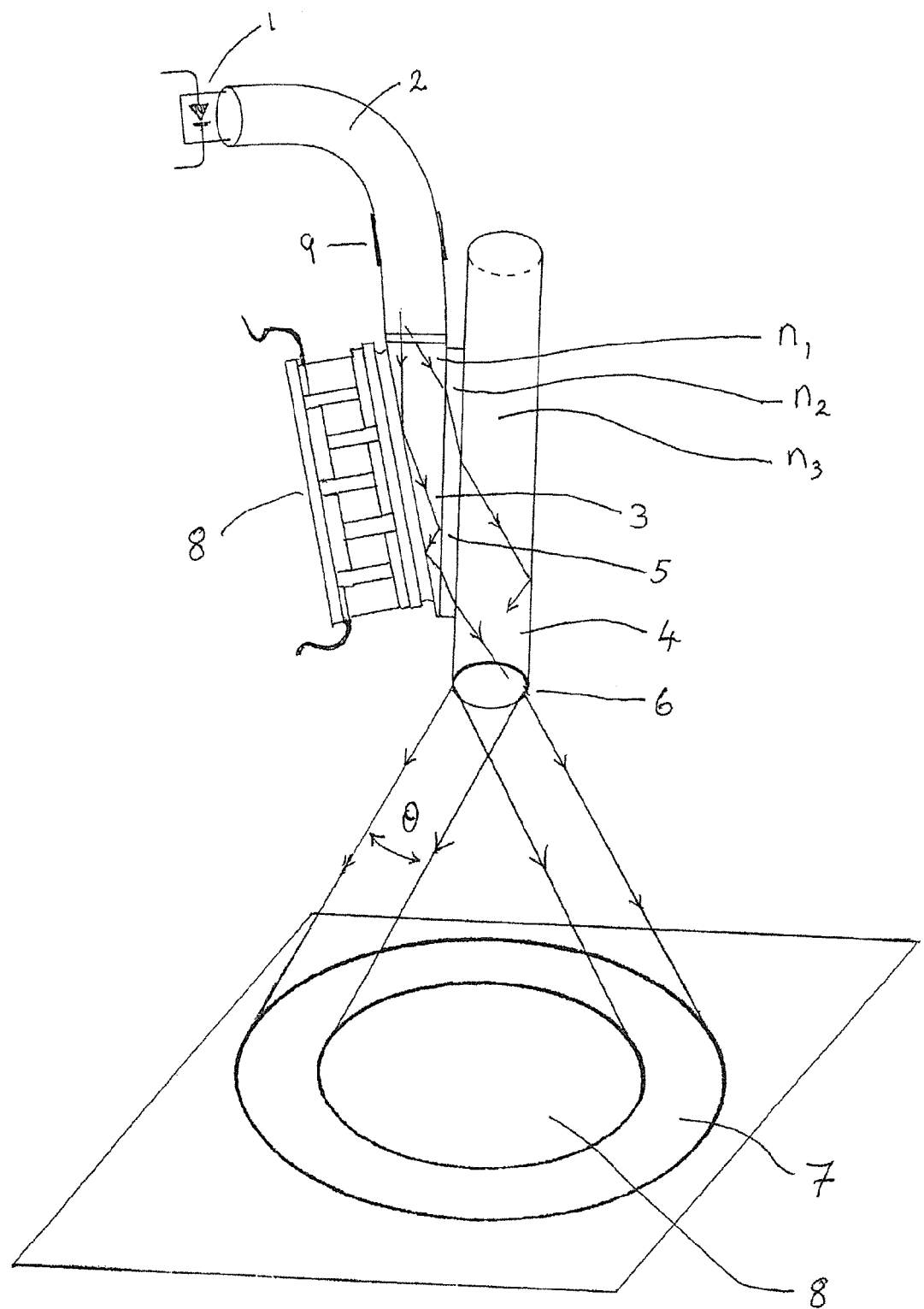
FIG. 61 is a schematic view of another apparatus according to an embodiment of the present invention for conducting mode conditioning.

Referring to FIG. 61, a light source 1 emits light which is conducted in multimode optic waveguide 2. The light enters a tapered waveguide section 3 which is coupled to the optical fibre bundle 4 by optical adhesive 5. The refractive index of the adhesive is lower than that of the material of the tapered structure or of the material of the cladding matrix of the bundle. The light emerges from the tip of the bundle 6 as a hollow cone 7. A Peltier effect device 8 can be used to alter the cone angle. The angle marked theta is double the angle of the delivery coupler taper. A higher order modes stripper 9 may be advantageous in some applications. The central region 10 of the light cone will be dark and relatively free from light from the source. (See U.S. Pat. No. 7,161,656 to Neil, Massoumian, Juskaitis and Wilson, incorporated herein by reference.)

Many other ways of controlling the mode mix distribution would be apparent to those skilled in the art.

Figure 62:
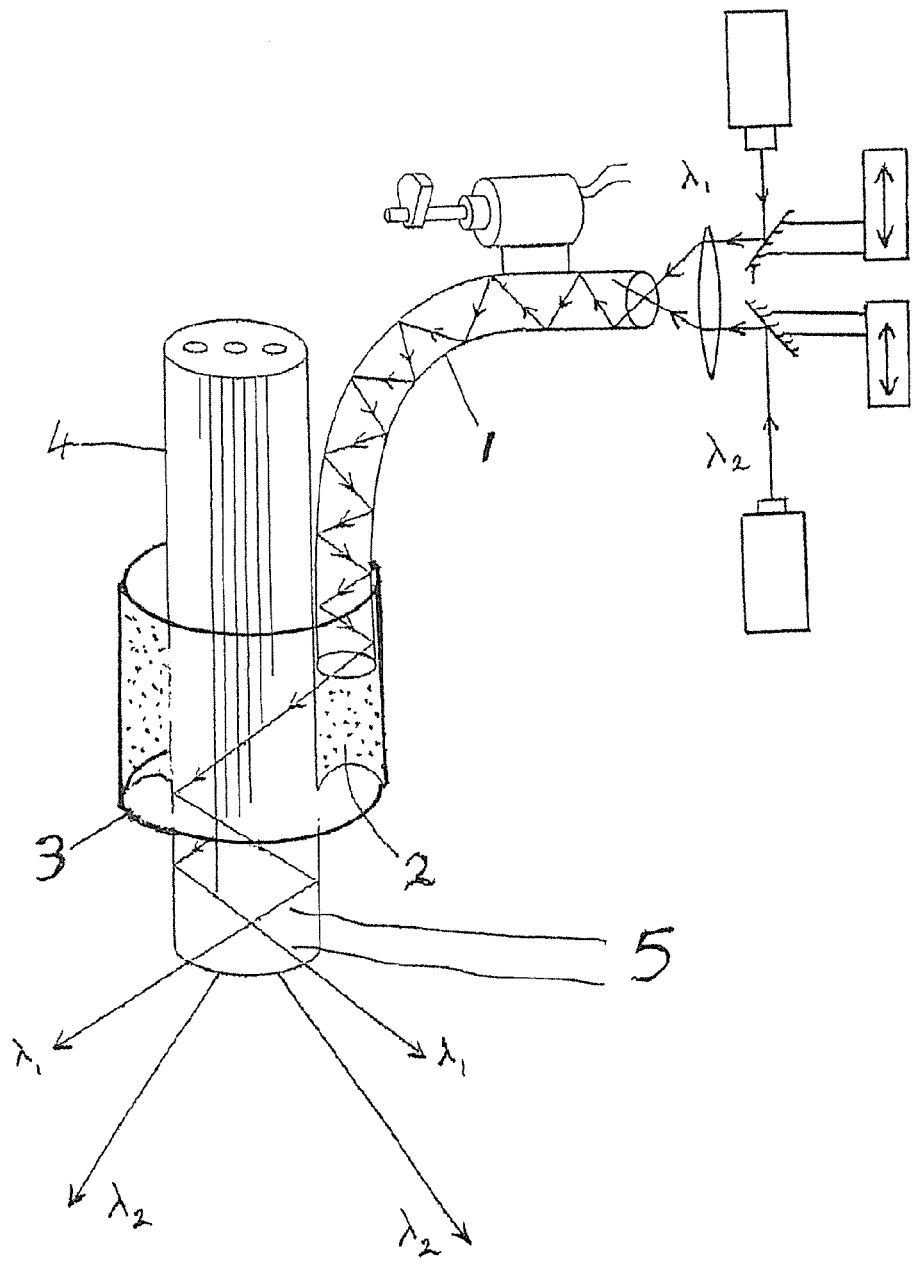
FIG. 62 is a schematic view of an arrangement for coupling bundle light to a rotating bundle according to an embodiment of the present invention.

Various mechanisms for coupling bundle light to a rotating bundle may be employed with the embodiments described herein, such as the optical slip ring. For example, FIG. 62 shows an arrangement in which laser light passes down multimode optical fibre 1 and emerges into the index matching liquid 2 (stippled), which is held in a cylinder 3. The rotating optical fibre bundle 4 passes through a reflective metal cylinder and the light is coupled from the liquid into the glass of the bundle and propagates as cladding modes 5.

Figure 63:
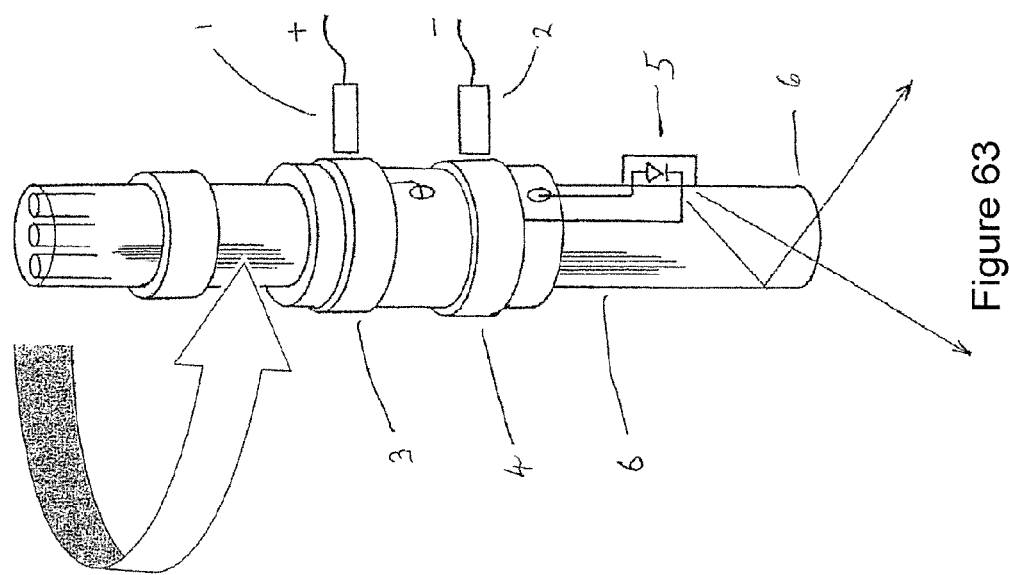
FIG. 63 is a schematic view of another arrangement for coupling bundle light to a rotating bundle according to an embodiment of the present invention.

FIG. 63 shows an arrangement in which brushes 1 and 2 are connected to electrical slip rings 3 and 4 and powering laser diode or LED 5 that produces light which is coupled into the optical fibre bundle 6.

Figure 64:
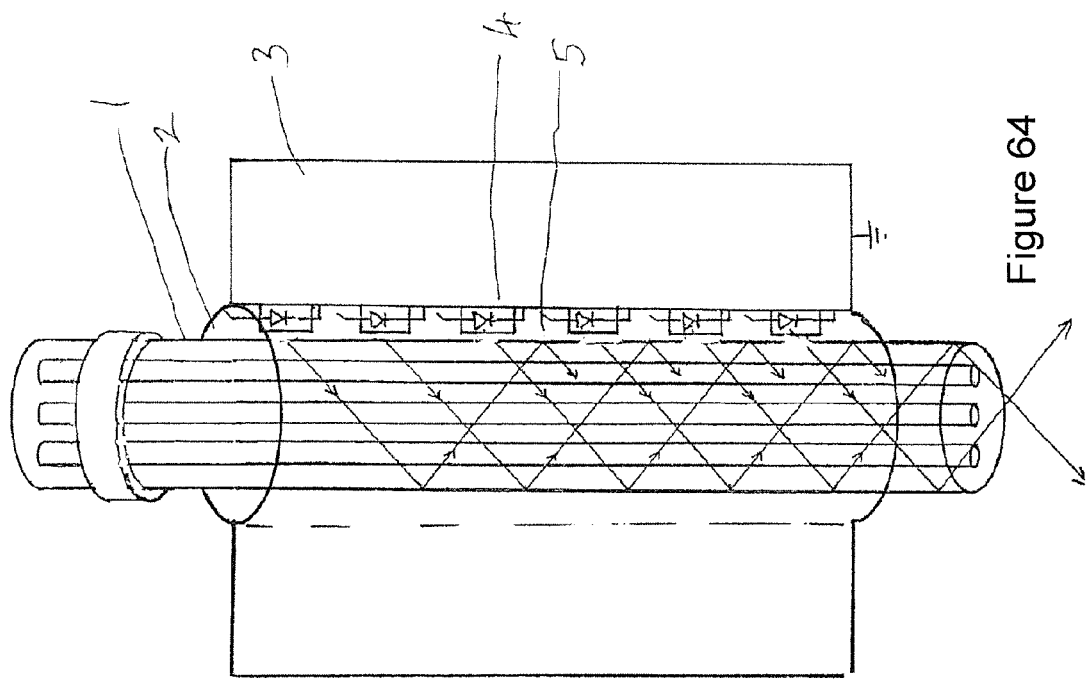
FIG. 64 is a schematic view of an apparatus for coupling bundle light to a rotating bundle according to an embodiment of the present invention.

FIG. 64 shows an arrangement in which a rotating optical fibre bundle 1 passes through a cylindrical hole in a stationary metal block 3, which acts as a heat-sink. Light emitting diodes or laser diodes 4 are attached to the inside of the heat sink. A liquid or index matching grease 5 fills the space between the metal block 3 and the bundle, and couples the light from the diodes into the rotating bundle 1.

Figure 65:
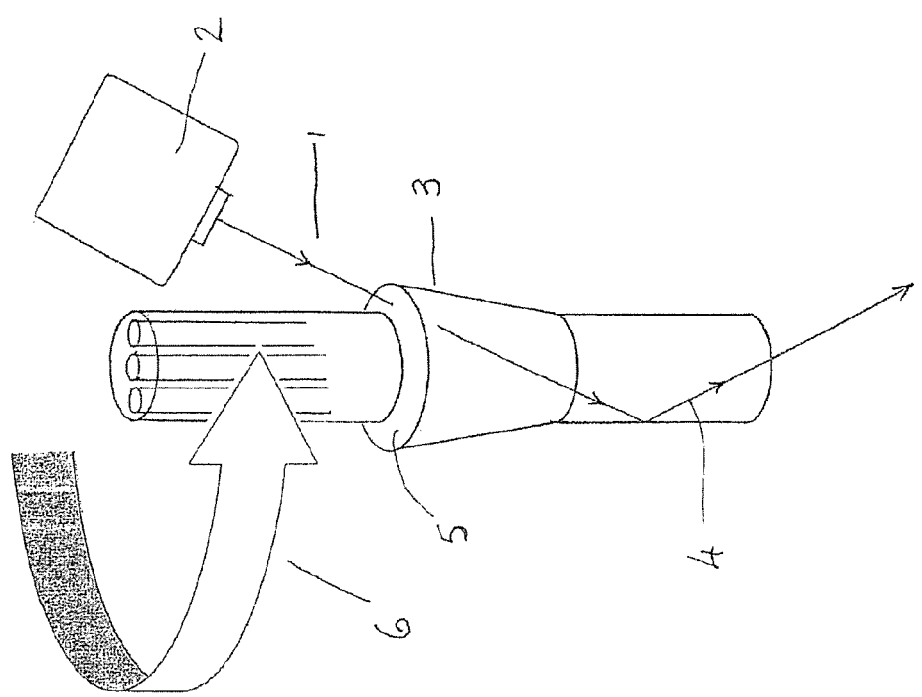
FIG. 65 is a schematic view of an arrangement for coupling bundle light to a rotating bundle according to an embodiment of the present invention.

FIG. 65 shows an arrangement in which a beam 1 from a laser source 2 passes into a collar 3 that is made from a transparent material and surrounds and optically contacts a fibre bundle 4. The face of the collar 5 accepts light from the laser source 2 as the bundle rotates. Rotation of the bundle is indicated by arrow 6.

Figure 66:
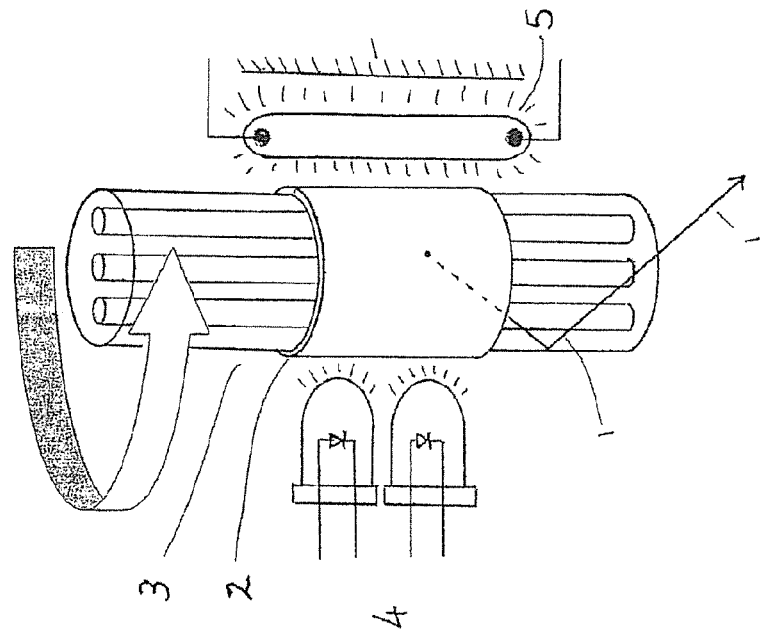
FIG. 66 is a schematic view of an arrangement for coupling bundle light to a rotating bundle according to an embodiment of the present invention.

FIG. 66 shows an arrangement in which a high intensity of light can be generated by causing fluorescence 1 within a suitable layer 2 closely adherent to the bundle 3. Excitation may be from LEDs 4 or from a mercury vapour source 5.

Figure 67:
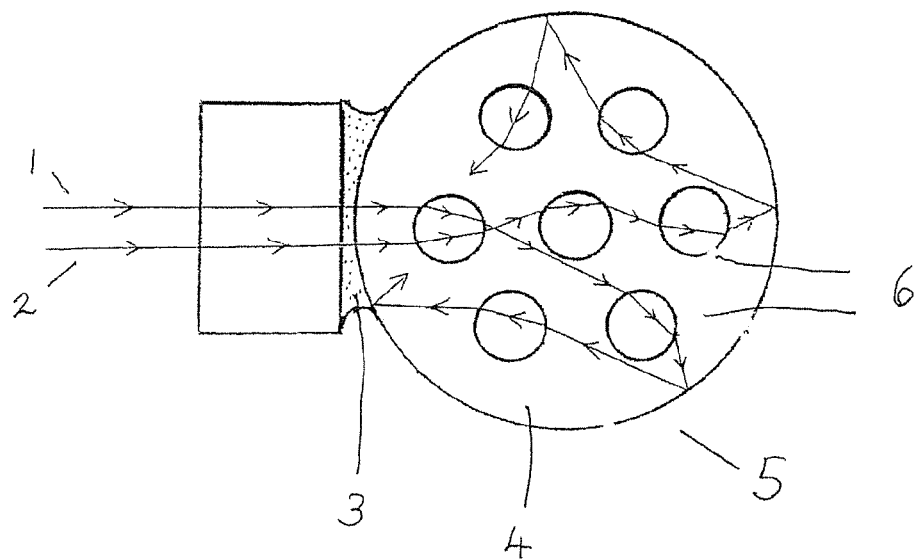
FIGS. 67 and 68 are schematic views of an optical fibre bundle, illustrating the propagation of light axially along the bundle.

FIG. 67 shows a cross section of an optical fibre bundle. Light rays 1 and 2 pass through the coupling prism and index matching gel 3 into the matrix of the bundle. The scattering of light beams occurs as the beams pass through from the cladding matrix glass into the core glass and out again. The rays are also proceeding axially along the bundle but this cannot be shown in the figure.

Figure 68:
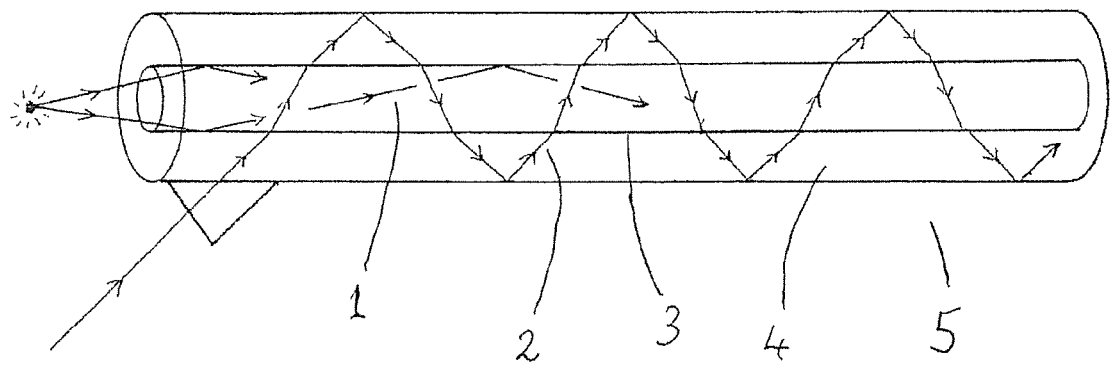

FIG. 68 shows a ray diagram schematically illustrating the paths of core modes 1 and cladding modes 2 as they pass respectively through the core 3 and the cladding 4 of optic fibre 5.

Figure 69:
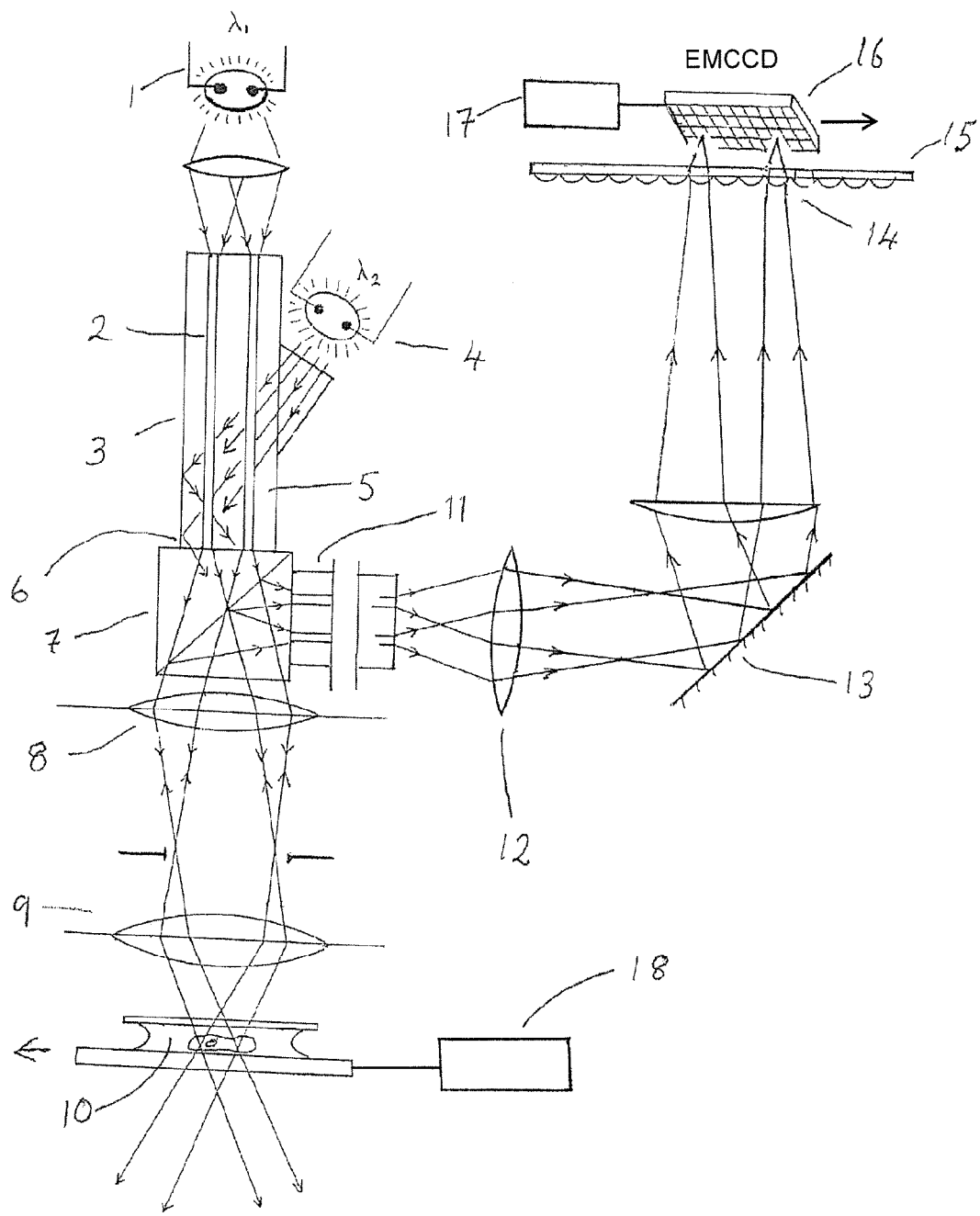
FIG. 69 is a schematic view of a microscope according to a further embodiment of the present invention.

FIG. 69 is a schematic view of a microscope according to an embodiment of the present invention, constituting a variation of certain embodiments described above. The excitation light source 1 illuminates the cores 2 of optical fibre bundle 3. The de-excitation light source 4 projects light into the cladding 5 of the bundle. Both wavelengths are emitted from end 6 which is connected to dichroic beams splitter cube 7 with optical cement. Both sets of light rays pass through lenses 8 and lens 9 and focus within the specimen 10. The core rays produce a pattern of spots, the cladding rays produce a network pattern completely surrounding these spots. Fluorescence from the central part of the excited spots is reflected by the dichroic beam splitter into the cores of a matching second bundle 11. The light that leaves the other end of the bundle is collimated by lens 12 and reflected by mirror 13. The light is then focused to Gaussian waists 14 centred on the lens elements of the micro-lens array 15. On the other side of the micro-lens array is a CCD array 16 which is moved by a linear motor 17. The motion of this is synchronised with the motion of the specimen and stage which is moved by linear motor 18.

Modifications within the scope of the invention may be readily effected by those skilled in the art. It is to be understood, therefore, that this invention is not limited to the particular embodiments described by way of example hereinabove. For example, the process of reading an x-ray imaging plate described above is amenable to an enhancement of resolution of the image using RESOLFT principles. This technique may reveal details within an x-ray image that are too small to be seen with a conventional pixelated detector these details may be extrinsic due to variation in intensity of the incident x-ray beam. Alternatively it may show the active sites or structures within the crystal.

Currently available image plate materials scatter light too much to be useful. The cubic Eu:Ba F Br is thus desirably optically homogeneous either monocrystalline, nano crystalline or embedded in a matrix of identical refractive index. A rapid shutter would be desirable to blank exposure of the EM CCD during the x-ray pulse and during the STED beam pulse.

Further, it will be appreciated that electron and other high energy particle beams produce fluorescence in many materials. A focused spot of electrons can converge to a dot that is a fraction the size of an optical beam focus; hence the light emitting source is of sub-optical-resolution dimensions. Visualisation of this would lend itself to the use of micro-lenses on a spinning plate as described earlier. If the electron generated fluorescence is emitted with a short half-life then a standard SEM with photomultiplier would suffice to obtain images but a long half-life might need multiple electron beam spots for faster imaging. In this case a micro-lens plate in a configuration similar to many of those described could be used.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in any country.

The invention claimed is:

1. A microscope or endoscope, comprising:
   a light condenser;
   an array of micro-lenses; and
   a specimen stage for supporting a specimen;
   wherein the micro-lenses are arranged spatially to correspond in enlarged form to respective sub-resolution objects or point observational fields on or within the specimen that are separated from one another by an optically resolvable distance and to receive light from the sub-resolution objects or point observational fields, and each of the micro-lenses is arranged to converge light from the respective corresponding sub-resolution object or point observational field to a diffraction limited spot at an image plane, and
   wherein the specimen stage is movable relative to excitation by a sub-resolution distance so that a new set of sub-resolvable sub-resolution objects or point observational fields is activated, the array of micro-lenses being maintained in a registration with the excited sub-resolution objects or point observational fields.

2. A microscope or endoscope as claimed in claim 1 wherein the array of micro-lenses is optically spaced from the light condenser at a sufficient distance that bundles of light transmitted from the sub-resolution objects or point observational fields to the respective micro-lenses do not overlap.

3. A microscope or endoscope as claimed in claim 1, configured to move the array of micro-lenses by a correspondingly enlarged distance in its plane relative to movement of the specimen stage to maintain a position of an image of the illuminated sub-resolution objects or point observational fields stationary relative to the array.

4. A microscope or endoscope as claimed in claim 1, comprising any one or more of:
   i) a lens to render parallel light bundles from the sub-resolution objects or point observational fields before the light bundles encounter the micro-lenses; and
   ii) a mechanism for producing an array of sub-resolution spots, objects or point observational fields.

5. A microscope or endoscope as claimed in claim 1, comprising a fused fibre optic bundle for delivering an excitation beam to the sub-resolution objects or point observational fields via cores of the fused fibre optic bundle, wherein the fibre optic bundle is arranged to receive the excitation beam and transmit de-excitation light to the specimen via cladding of the fused fibre optic bundle.

6. A microscope as claimed in claim 1, comprising a coherent fibre optic bundle of optical fibres, the bundle being located between the specimen and the light condenser and, in use, in contact with the specimen, and arranged to collect return light from the sub-resolution objects or point observational fields, wherein each of the optical fibres collects light from one of the respective sub-resolution objects or point observational fields and return light emitted by the bundle.

7. A microscope or endoscope as claimed in claim 1, comprising a meta-material lens to produce multiple sub-resolution sampling points or point observational fields within the specimen.

8. A near or far field GSD or STED microscope, comprising the microscope of claim 1.

9. A scanning near field optical microscope, comprising;
   the microscope of claim 1;
   an opaque web having a plurality of apertures; and
   a drive;
   wherein the sub-resolution objects or point observational fields are defined by the apertures, the opaque member is configured to be adjacent to the specimen in use, and the drive is configured to provide relative motion between the opaque web and the specimen.

10. A method of microscopy or endoscopy, comprising:
    supporting a specimen on a specimen stage;
    arranging a plurality of micro-lenses spatially to correspond in enlarged form to respective sub-resolution objects or point observational fields on or within the specimen, the sub-resolution objects or point observational fields being separated from one another by an optically resolvable distance;
    exciting the sub-resolution objects or specimen portions at the point observational fields; and
    receiving light from the sub-resolution objects or point observational fields with the plurality of micro-lenses, each of the micro-lenses converging light from the respective corresponding sub-resolution object or point observational field to a diffraction limited spot at an image plane,
    wherein the specimen stage is movable relative to excitation by a sub-resolution distance so that a new set of sub-resolvable sub-resolution objects or point observational fields is activated, the array of micro-lenses being maintained in a registration with the excited sub-resolution objects or point observational fields.

11. A microscope or endoscope, comprising:
    a light condenser; and
    an array of micro-lenses;
    wherein the micro-lenses are arranged spatially to correspond in enlarged form to respective sub-resolution objects or point observational fields on or within a specimen that are separated from one another by an optically resolvable distance and to receive light from the sub-resolution objects or point observational fields, and each of the micro-lenses is arranged to converge light from the respective corresponding sub-resolution object or point observational field to a diffraction limited spot at an image plane, and
    the microscope or endoscope is configured to move the array of micro-lenses by a correspondingly enlarged distance in its plane relative to movement of the specimen stage to maintain a position of an image of the illuminated sub-resolution objects or point observational fields stationary relative to the array.

12. A microscope or endoscope, comprising:
    a light condenser; and
    an array of micro-lenses;
    wherein the micro-lenses are arranged spatially to correspond in enlarged form to respective sub-resolution objects or point observational fields on or within a specimen that are separated from one another by an optically resolvable distance and to receive light from the sub-resolution objects or point observational fields, and each of the micro-lenses is arranged to converge light from the respective corresponding sub-resolution object or point observational field to a diffraction limited spot at an image plane, and the microscope or endoscope further comprises a coherent fibre optic bundle of optical fibres, the bundle being located between the specimen and the light condenser and, in use, in contact with the specimen, and arranged to collect return light from the sub-resolution objects or point observational fields, wherein each of the optical fibres collects light from one of the respective sub-resolution objects or point observational fields and return light emitted by the bundle.

13. A microscope or endoscope, comprising:

a light condenser; and an array of micro-lenses;

wherein the micro-lenses are arranged spatially to correspond in enlarged form to respective sub-resolution objects or point observational fields on or within a specimen that are separated from one another by an optically resolvable distance and to receive light from the sub-resolution objects or point observational fields, and each of the micro-lenses is arranged to converge light from the respective corresponding sub-resolution object or point observational field to a diffraction limited spot at an image plane, and the microscope or endoscope further comprises a metamaterial lens to produce multiple sub-resolution sampling points or point observational fields within the specimen.

* * * * *